(12) United States Patent
Noguchi et al.

(10) Patent No.: US 6,493,513 B1
(45) Date of Patent: Dec. 10, 2002

(54) EXPOSURE CONTROL DEVICE FOR CAMERA PREVENTING SHUTTER RELEASE BEFORE APERTURE CHANGEOVER

(75) Inventors: Osamu Noguchi, Kanagawa (JP); Hirokazu Yokoo, Kanagawa (JP); Takashi Imamura, Kanagawa (JP); Yuji Mikami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 31 days.

(21) Appl. No.: 09/699,465

(22) Filed: Oct. 31, 2000

(30) Foreign Application Priority Data

Nov. 1, 1999 (JP) .......................... 11-311353
Nov. 1, 1999 (JP) .......................... 11-311354
Nov. 2, 1999 (JP) .......................... 11-312996
Nov. 4, 1999 (JP) .......................... 11-313309
Nov. 18, 1999 (JP) .......................... 11-327705

(51) Int. Cl.[7] ............................................. G03B 7/085
(52) U.S. Cl. ...................... 396/257; 396/458; 396/460; 396/463; 396/506
(58) Field of Search ................................ 396/213, 235, 396/449, 257, 458, 459, 460, 463, 470, 506, 508

(56) References Cited

U.S. PATENT DOCUMENTS

| | | | |
|---|---|---|---|
| 4,515,457 A | * | 5/1985 | Harvey ..................... 396/235 |
| 5,337,110 A | * | 8/1994 | Dowe ....................... 396/449 |
| 5,634,163 A | | 5/1997 | Kamata |

* cited by examiner

*Primary Examiner*—Russell Adams
*Assistant Examiner*—Arthur A Smith
(74) *Attorney, Agent, or Firm*—Young & Thompson

(57) ABSTRACT

A shutter device for a camera includes a shutter blade for providing an exposure by opening/shutting a photographic light path, and a shutter drive lever for driving the shutter blade. The shutter device includes a shutter release button. A photometric switch is turned on in response to depression of the shutter release button. A photometric circuit is operated by turning on of the photometric switch, for measuring object brightness. An aperture stop changeover mechanism changes over an aperture stop of the photographic light path according to the photographic light path. A delay structure such as a delay lever detects completion of actuation of the aperture stop changeover mechanism and responsively moves the shutter drive lever.

29 Claims, 41 Drawing Sheets

EXPOSURE CONTROL DEVICE FOR CAMERA PREVENTING SHUTTER RELEASE BEFORE APERTURE CHANGEOVER

BACKGROUND OF THE INVENTION

1. Field of the Invention

The present invention relates to an exposure control device for a camera, and more particularly, to an exposure control device for a camera in which an aperture stop is changeable and which is capable of preventing influence of changing over the aperture stop to an exposing operation.

2. Description Related to the Prior Art

A lens-fitted photo film unit is known as a simple camera in which a taking lens and shutter mechanism are incorporated and which is pre-loaded with unexposed photo film. To lower the manufacturing cost, elements in the lens-fitted photo film unit are provided with simplified structures. For example, a single shutter blade constitutes the shutter mechanism, biased by a spring to a closed position, knocked quickly toward an open position to open and shutter the shutter device.

In the lens-fitted photo film unit, an aperture stop is fixed. An f-number of the taking lens is unchanged. It may be likely that an overexposed or underexposed frame is created under a certain condition of an exposure.

To raise the image quality by overcoming such problems, U.S. Pat. No. 5,634,163 (corresponding to JP-A 9-5817) discloses an automatic exposure control with a stop changeover plate and a photometric unit. A small-diameter opening is formed in the changeover plate. The photometric unit measures brightness of a photographic object. According to the brightness, the changeover plate is shifted to change over a diameter of the aperture stop. There is a photographic light path with reference to which the small-diameter opening is movable. When the changeover plate is in an insertion position, the small-diameter opening is set in the photographic light path. When the changeover plate is in a retracted position, the small-diameter opening is shifted out of the photographic light path. A coil spring biases the changeover plate to either one of the two end positions. A solenoid magnetically attracts the changeover plate and moves the same to change the aperture stop.

The solenoid is actuated according to a photometric value. A shutter release button is adapted to start photometry upon halfway depression. A user depresses the shutter release button halfway for photometry, waits for completion of a shift of the changeover plate, and then fully depresses the shutter release button to take an exposure. This is effective in adjusting the exposure with a simple structure.

However, the automatic exposure control has a shortcoming in that the user must keep the shutter release button halfway depressed while the changeover plate is changed over. The halfway depression should be maintained for at least 10 msec. It is inevitable for the user to continue the depression much longer than this minimum time for reliability of safe photometry. This causes a wasteful use of a battery incorporated in the lens-fitted photo film unit.

If the user puts the lens-fitted photo film unit in a bag and carries the same, it is likely that the shutter release button is accidentally depressed halfway by abutment of a certain rigid article to the shutter release button of the lens-fitted photo film unit. There occurs an unwanted operation of photometry. The solenoid is likely to be powered. Power of the battery is wastefully used, to result in failure in flash emission in the lens-fitted photo film unit of which the battery is not replaceable. Furthermore, overheating of the solenoid in an electromagnet may occur by powering for a long time, to cause spontaneous combustion. This is a serious problem in view of safety of the product.

Also, operation of keeping the shutter release button halfway depressed is complicated itself. This is because most of the users who will treat the lens-fitted photo film unit are unfamiliar to complex operation of the lens-fitted photo film unit of a combined structure.

It is also probable that the user depresses the shutter release button fully without halfway depression. The shutter blade is knocked for an exposure before completion of changing over the aperture stop. Light from the object to be photographed is blocked by the shutter blade at least partially. An extremely unexposed frame may be created with low image quality. Furthermore, no object light may be incident upon the photo film.

SUMMARY OF THE INVENTION

In view of the foregoing problems, an object of the present invention is to provide an exposure control device for a camera in which the aperture stop can be changeable reliably and also a wasteful use of the battery can be prevented.

Another object of the present invention is to provide an exposure control device for a camera capable of preventing influence of changing over the aperture stop to an exposing operation.

In order to achieve the above and other objects and advantages of this invention, an exposure control device for a camera includes a shutter blade for providing an exposure by opening/shutting a photographic light path, and a shutter drive member for driving the shutter blade. There is a shutter release button. A photometric switch is turned on in response to depression of the shutter release button. A photometric circuit is operated by turning on of the photometric switch, for measuring object brightness. An aperture stop changeover mechanism changes over an aperture stop of the photographic light path according to the photographic light path. A delay structure detects completion of actuation of the aperture stop changeover mechanism and for responsively moving the shutter drive member.

According to one preferred embodiment, the delay structure includes a delay lever, released from retention upon depression of the shutter release button, for rotating in retaining the shutter drive member in the charged position, and for releasing the shutter drive member from retention upon rotation to a predetermined position to allow the shutter drive member to move to the released position, wherein the photometric switch is turned on before the delay lever rotates to the predetermined position. A governor mechanism adjusts a rotational speed of the delay lever, to block rotation of the delay lever to the predetermined position until completion of a change of the aperture stop with the stop changeover mechanism after turning on the photometric switch.

According to another preferred embodiment, the shutter drive member opens/shuts a shutter blade upon a reach to a shutter driving position. The photometric switch is turned on upon a reach of the shutter drive member to a photometric position disposed short of the shutter driving position. The delay structure includes a governor mechanism for adjusting a moving speed of the shutter drive member between the photometric position and the shutter driving position, and for moving the shutter drive member to the shutter driving position after completion of a change of the stop changeover mechanism.

According to a further preferred embodiment, the shutter drive member opens/shuts a shutter blade upon a reach to a shutter driving position. The photometric switch is turned on upon a reach of the shutter drive member to a photometric position disposed short of the shutter driving position. The delay structure includes a retention lever for retaining the shutter drive member in the photometric position, and for releasing the shutter drive member from retention upon completion of a change of the aperture stop.

According to another preferred embodiment, the delay structure includes a stop lever movable between an engaged position and a disengaged position, the stop lever, when in the engaged position, retaining the shutter drive member in the charged position, and when in the disengaged position, allowing the shutter drive member to move to the released position. An enabling lever is driven upon depression of the shutter release button, for turning on the photometric switch, then for moving the stop lever toward the disengaged position, and for moving the stop lever to the disengaged position after completion of a change of the stop changeover mechanism.

According to still another preferred embodiment, the delay structure includes an electromagnetic retainer for retaining the shutter drive member in the charged position until completion of a change of the stop changeover mechanism after depression of the shutter release button. A control circuit is operated upon turning on of the photometric switch, for causing a delay by time required for the change of the stop changeover mechanism, and for decreasing force of retention of the electromagnetic retainer to release the shutter drive member from retention.

According to another preferred embodiment, an exposure control device for a camera includes a shutter drive member is moved forwards upon a shutter releasing operation, and is moved backwards by a spring. A transmission member is movable forwards and backwards upon movement of the shutter drive member, for moving forwards without knocking a shutter blade, and for moving backwards to knock the shutter blade. A photometric switch is turned on upon movement of the shutter drive member. A photometric circuit starts measuring object brightness upon turning on of the photometric switch. A stop changeover mechanism changes over an aperture stop according to a photometric signal from the photometric circuit before the transmission member starts knocking the shutter blade.

Furthermore, a torsion coil spring connects the shutter drive member with the transmission member, the torsion coil spring is charged by rotation of the shutter drive member, and biases and moves the transmission member.

By this construction, the aperture stop can be changeable reliably, and also a wasteful use of the battery can be prevented, because the completion of actuation of the aperture stop changeover mechanism can be detected before moving the shutter drive member responsively. Furthermore, the exposure control device is capable of preventing influence of changing over the aperture stop to an exposing operation.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
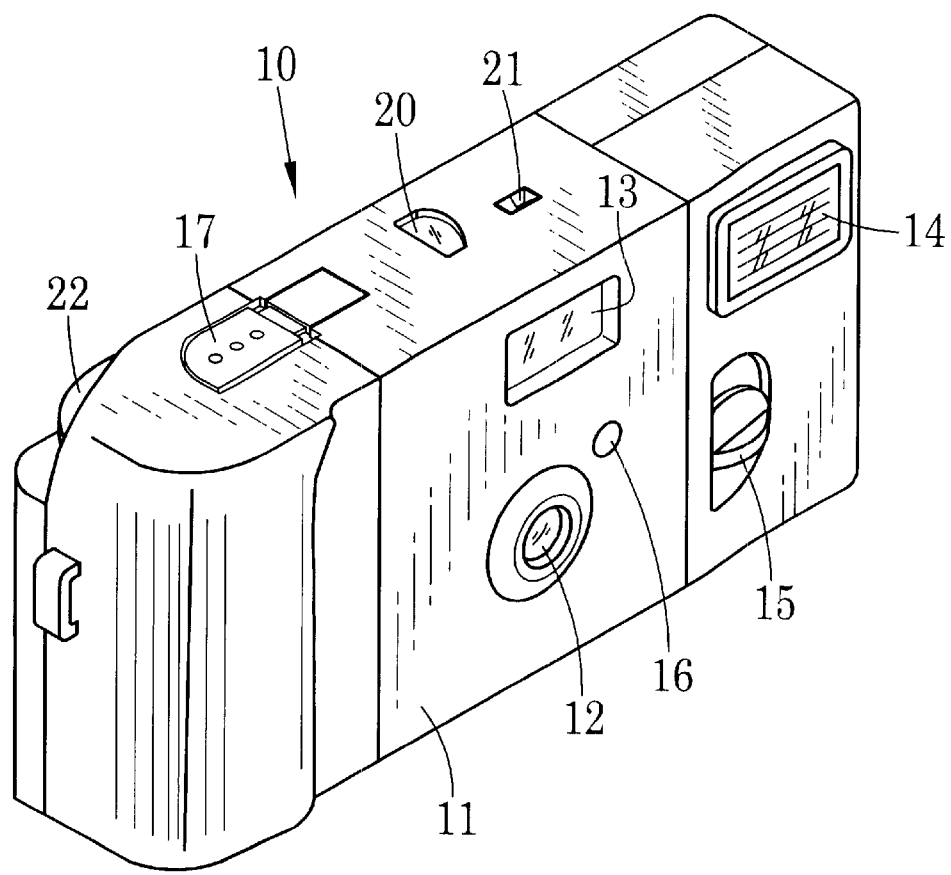
FIG. 1 is a perspective illustrating a lens-fitted photo film unit.

In FIG. 1, a lens-fitted photo film unit is illustrated, and includes a housing 10 and a packaging belt 11. The housing 10 is provided with various elements for taking an exposure, and a photo film cassette. The packaging belt 11 is wound about the housing 10. A front side of the housing 10 has a taking lens 12, a viewfinder 13, a flash emitter 14, a flash button 15 and a light receiver window 16. An upside of the housing 10 includes a shutter release button 17, a frame counter 20 and a charged state indicator window 21. A portion of a winder wheel 22 appears in a rear side of the housing 10.

Figure 2:
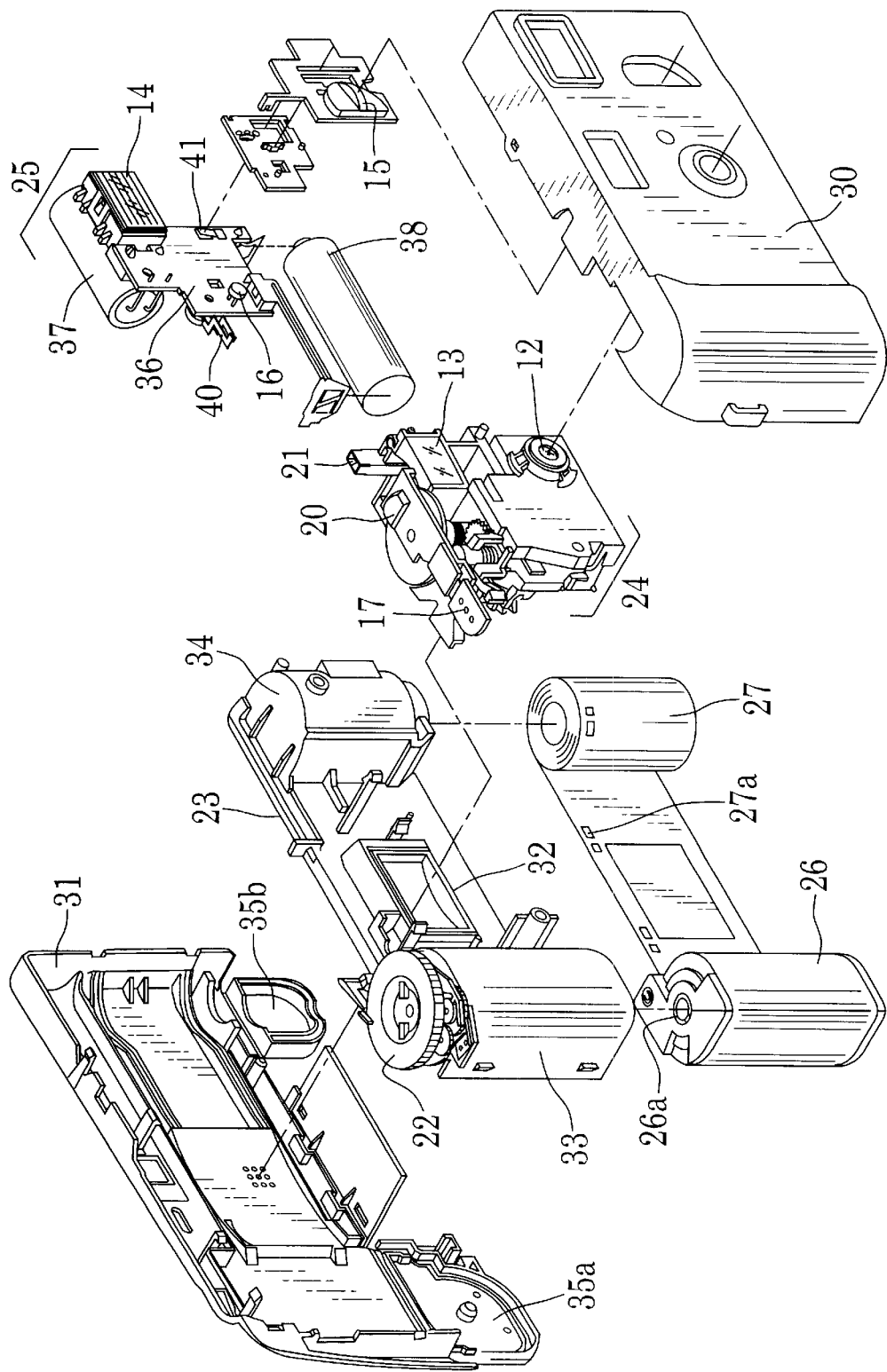
FIG. 2 is an exploded perspective illustrating the lens-fitted photo film unit.

In FIG. 2, an inner structure of the housing 10 is illustrated. The housing 10 is constituted by a main body 23, an exposure unit 24, an electronic flash unit 25, a cassette shell 26, photo film 27, a front cover 30 and a rear cover 31. The front cover 30 and the rear cover 31 cover those elements. The main body 23 includes an exposure aperture 32, a cassette holder chamber 33 and a roll holder chamber 34. The exposure aperture 32 defines a region in the photo film 27 to be exposed. The cassette holder chamber 33 contains the cassette shell 26. The roll holder chamber 34 contains a roll of the photo film 27 drawn from the cassette shell 26 and wound again. The photo film 27 may be the IX240 type and also may be the 135 type.

The winder wheel 22 is disposed on the upside of the cassette holder chamber 33 in a rotatable manner. A spool 26a is contained in the cassette shell 26, and engaged with a shaft of the winder wheel 22. Each time that the winder wheel 22 is rotated after one exposure, one exposed frame of the photo film 27 is moved toward the inside of the cassette shell 26.

A front portion of the front cover 30 includes various openings in which the taking lens 12 and the viewfinder 13 appear, and has the light receiver window 16. A top portion of the front cover 30 has an opening in which the shutter release button 17 appears. Lower lids 35a and 35b are formed with the rear cover 31 for covering lower ends of the cassette shell 26 and the photo film 27 light-tightly. The lower lid 35a will be opened before the cassette shell 26 is removed with the photo film 27 after exposures.

The flash unit 25 is a combination including a printed circuit board 36, the flash emitter 14, a main capacitor 37, a dry battery 38, a sync switch 40 and a charger switch 41. The flash emitter 14 is mounted on the printed circuit board 36. The printed circuit board 36 includes an electronic flash circuit in a well-known structure for controlling charge and discharge of the main capacitor 37. The flash button 15 is slidable on a front face of the printed circuit board 36, and slid to turn on the charger switch 41 for operating the flash circuit. The flash circuit is constituted by elements including a blocking oscillator well-known in the art, which converts voltage of the dry battery 38 to high voltage of approximately 300 volts to charge the main capacitor 37. Upon charging of the main capacitor 37, a light-emitting diode positioned inside the charged state indicator window 21 is driven to illuminate.

Figure 3:
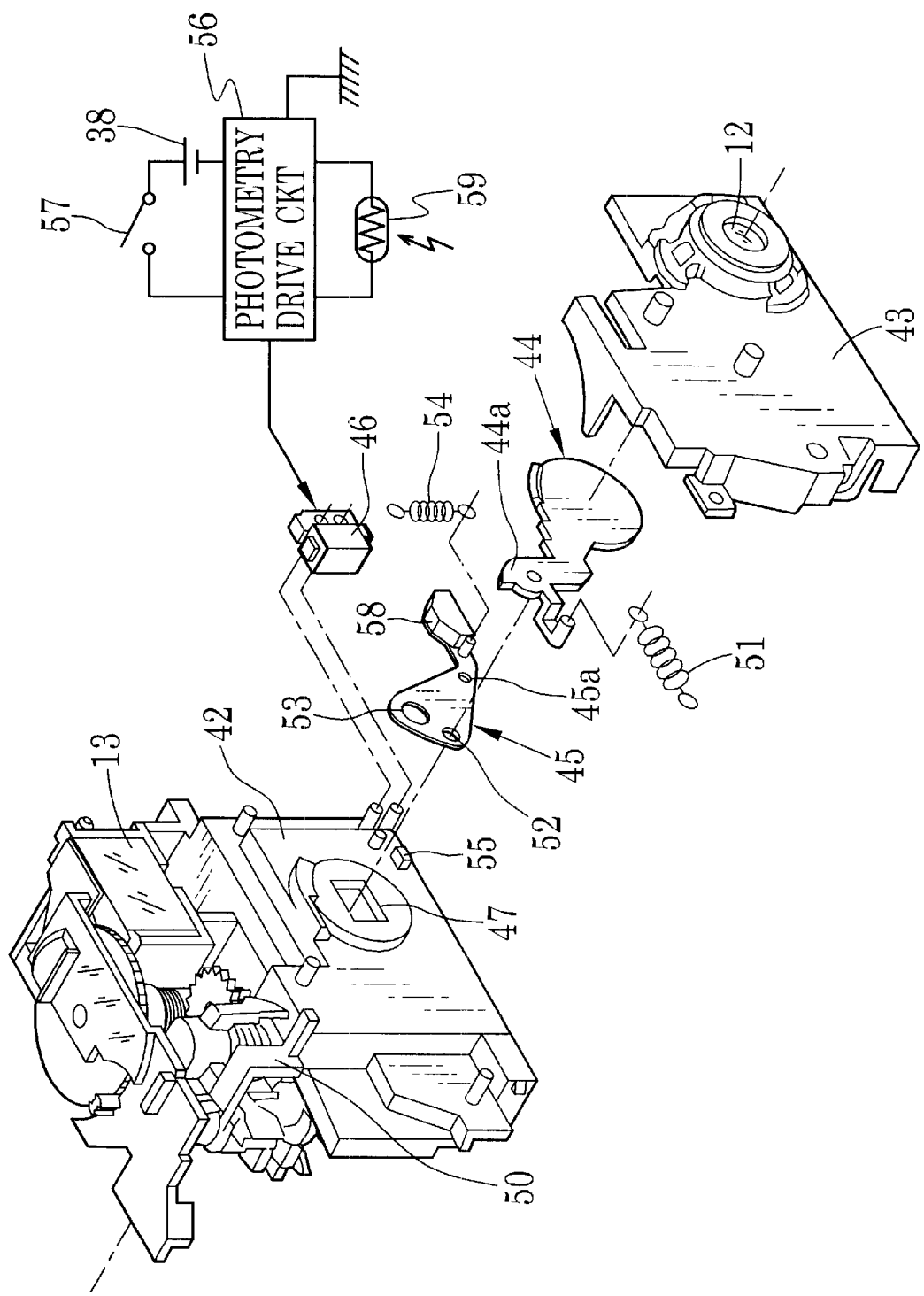
FIG. 3 is an exploded perspective illustrating a construction of an exposure unit.

In FIG. 3, the exposure unit 24 is a combination of elements including a light-shielded tunnel 42, a shutter over 43, a shutter blade 44, a stop changeover plate 45, a solenoid or electromagnet 46 and the like. A shutter opening 47 is formed in the center of the light-shielded tunnel 42 to introducing light from a photographic field to the inside of the exposure aperture 32. There is a shutter drive lever 50, which is driven by a shutter mechanism disposed on the top of the light-shielded tunnel 42.

The shutter blade 44 is rotatable on the light-shielded tunnel 42 about an axial hole formed in an end portion of the shutter blade 44. A tension spring 51 biases the shutter blade 44 to a position covering a light path. When the shutter release button 17 is depressed for shutter actuation, a driven projection 44a of the shutter blade 44 is knocked by the shutter drive lever 50 to open the shutter opening 47. An exposure is taken to the photo film 27 until the shutter blade 44 is returned to an initial position by the bias of the tension spring 51.

The stop changeover plate 45 is disposed between the light-shielded tunnel 42 and the shutter blade 44, and has an axial hole 45a about which the stop changeover plate 45 is rotatable. A small-diameter opening 52 and a large-diameter opening 53 are formed in the stop changeover plate 45. A tension spring 54 biases the stop changeover plate 45 to a first position where the large-diameter opening 53 is set in a photographic light path. A stopper 55 is formed with the light-shielded tunnel 42 for keeping the stop changeover plate 45 from shifting beyond the first position.

The solenoid 46 is secured to the light-shielded tunnel 42. A photometric circuit 56 or photometric drive circuit is connected with the solenoid 46. The printed circuit board 36 in FIG. 2 includes the photometric circuit 56 with the flash circuit. When a photometric switch 57 is turned on, the photometric circuit 56 is energized upon a flow of a current from the dry battery 38. Also, a photo receptor element 59 is connected with the photometric circuit 56. The photo receptor element 59 in the printed circuit board 36 in FIG. 2 is disposed inside the light receiver window 16. An example of the photo receptor element 59 is cadmium sulfide (CdS), and has resistance changeable in accordance with brightness of object light introduced through the light receiver window 16.

The photometric circuit 56 includes a transistor, of which a base-emitter voltage is changed by changes in the resistance of the photo receptor element 59. When the object brightness comes up to reference brightness, the base-emitter voltage comes up to a sufficient level to turn on the transistor. A current flows from the dry battery 38 into the solenoid 46, about which a magnetic field occurs.

Note that the photo receptor element 59 may consist of a photo diode, which can cause a current to flow photoelectrically according to the object brightness, in order to measure the object brightness.

An iron segment 58 is secured to an end of the stop changeover plate 45. When a current flows in the solenoid 46, magnetic attraction occurs between the iron segment 58 and the solenoid 46. The stop changeover plate 45 shifts to a second position where the small-diameter opening 52 is set in the light path. The iron segment 58 comes in contact with the solenoid 46.

Figure 4A:
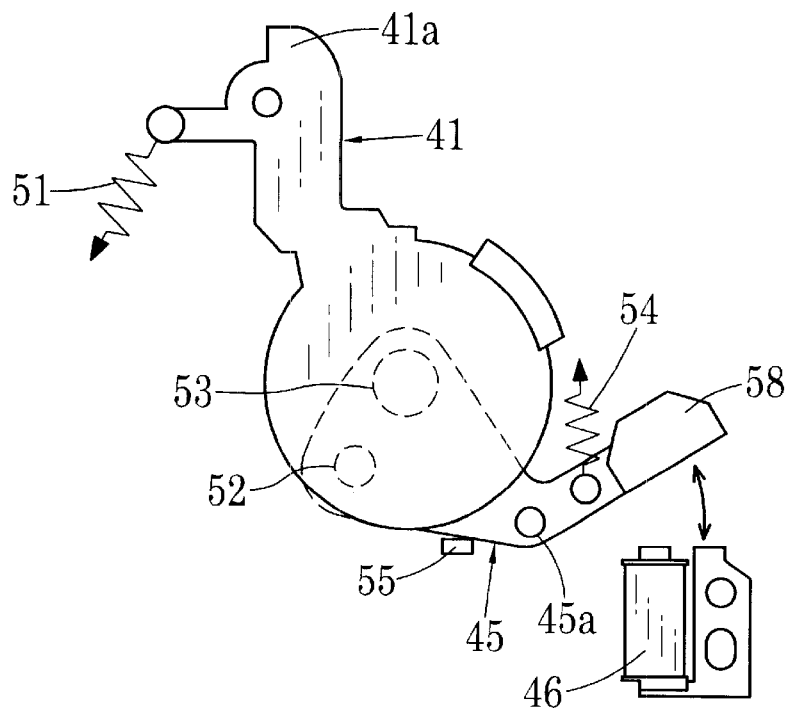
FIG. 4A is a front elevation illustrating a state of the exposure unit in which an aperture stop is set open widely.
Figure 4B:
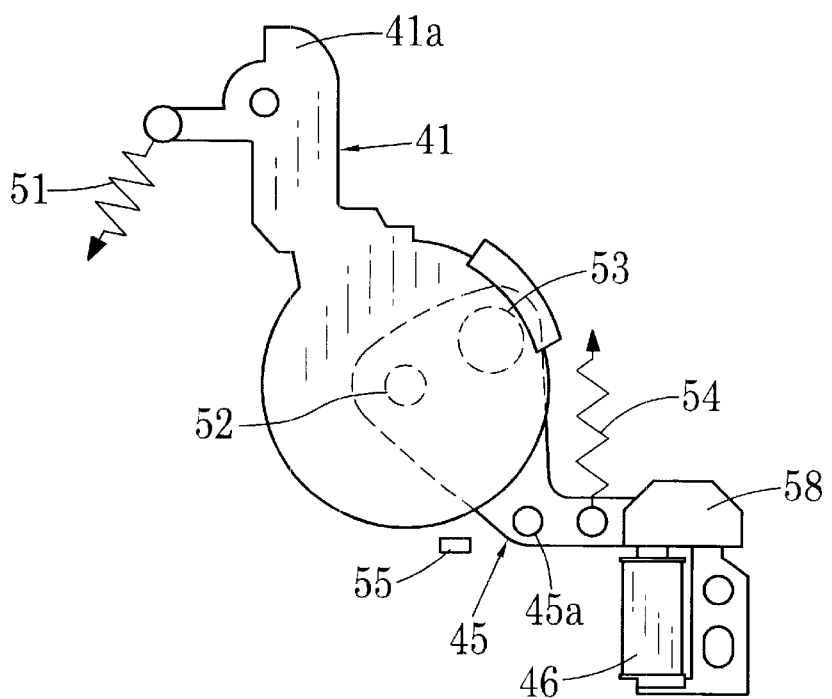
FIG. 4B is a front elevation illustrating a state of the exposure unit in which the aperture stop is stopped down.

In FIGS. 4A and 4B, positions in shifting of the stop changeover plate 45 according to the object brightness are illustrated. If the object brightness is still lower than reference brightness, no current flows in the solenoid 46. The tension spring 54 keeps the stop changeover plate 45 in the first position depicted in FIG. 4A, for an exposure to be taken through the large-diameter opening 53. If the object brightness is equal to or higher than the reference brightness, a current flows in the solenoid 46. Attraction of the solenoid 46 to the iron segment 58 shifts the stop changeover plate 45 to the second position depicted in FIG. 4B, for an exposure to be taken through the small-diameter opening 52.

The photometric circuit 56 has a construction in which the object brightness as a result of photometry is kept for a predetermined time, for example 100–200 msec. Once the stop changeover plate 45 is shifted to the second position upon detection of the object brightness equal to or higher than the reference brightness, the photometric circuit 56 keeps the stop changeover plate 45 in the second position even the object brightness decreases. Also, once the stop changeover plate 45 is set in the first position upon detection of the object brightness lower than the reference brightness, the photometric circuit 56 keeps the stop changeover plate 45 positioned even the object brightness increases. Thus, the stop changeover plate 45 is prevented from shifting during an exposure. It is possible to avoid occurrence of failure in the exposure.

Figure 5:
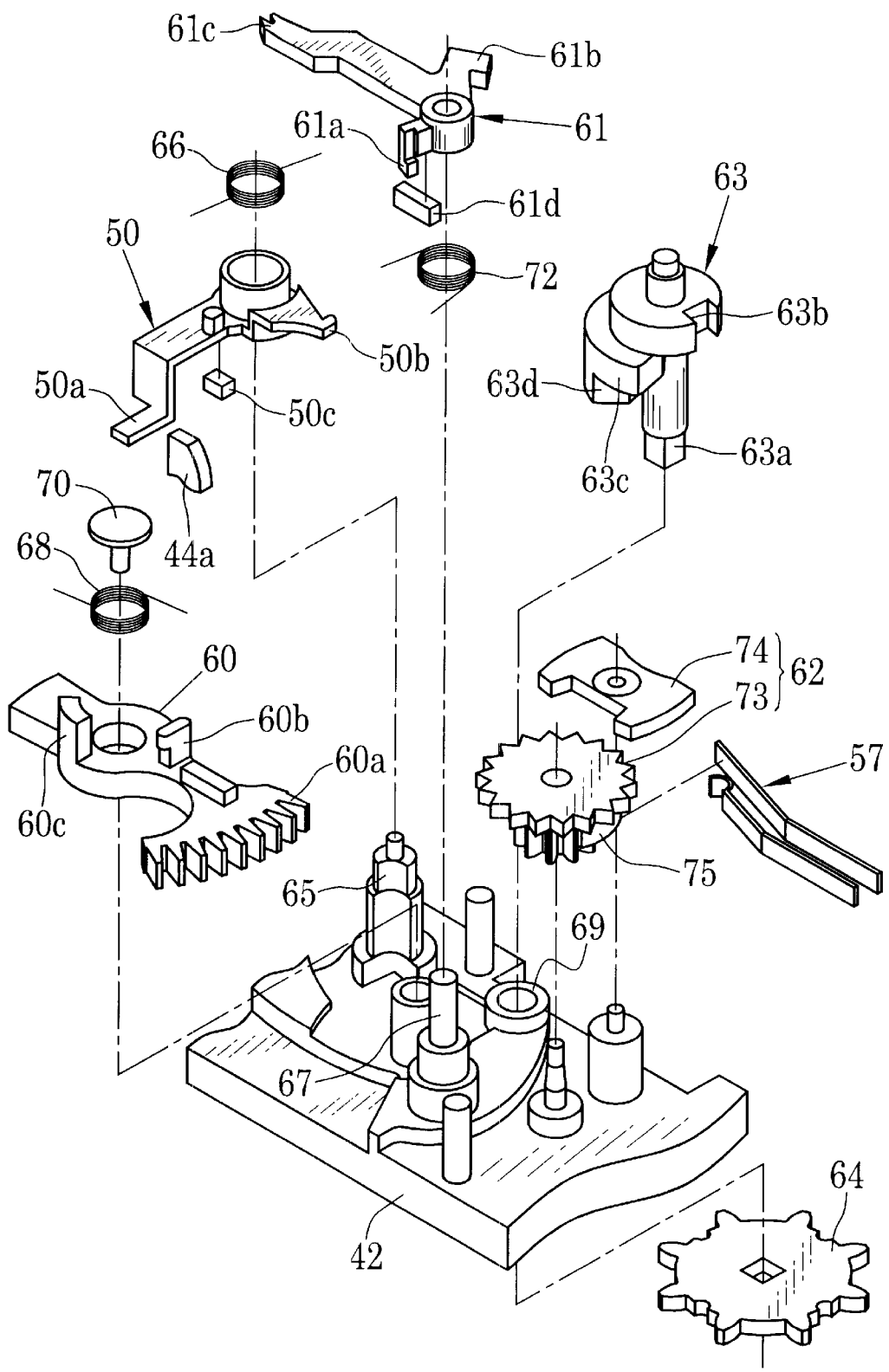
FIG. 5 is an exploded perspective illustrating a shutter device.

In FIG. 5, a construction of the shutter device is depicted. The shutter device is constituted by the shutter drive lever 50, a delay lever 60, a retention lever or release lever 61, a governor mechanism 62, a cam member 63 and a sprocket wheel 64.

A pivot 63a is provided in the cam member 63, which is rotatable thereabout on a top of the light-shielded tunnel 42. The cam member 63 includes a disk and a semi-circular cam. A lock notch 63b is formed in the disk for locking the retention lever 61. The semi-circular cam includes a first cam portion 63c and a second cam portion 63d. The first cam portion 63c contacts the shutter drive lever 50. The second cam portion 63d contacts the delay lever 60. A boss 69 is formed with the light-shielded tunnel 42, and has a hole through which an axial end of the pivot 63a is inserted, and secured to the sprocket wheel 64.

In FIG. 2, the photo film 27 has perforations 27a. Teeth of the sprocket wheel 64 are meshed with the perforations 27a. When the photo film 27 is moved by rotating the winder wheel 22, the sprocket wheel 64 and the cam member 63 rotate.

The shutter drive lever 50 is supported by a pivotal pin 65 in a rotatable manner on the light-shielded tunnel 42. A torsion coil spring 66 is disposed on a top of the shutter drive lever 50, and has one end secured to the shutter drive lever 50, and a remaining end secured to the light-shielded tunnel 42. The shutter drive lever 50 includes a knocker arm 50a, a cam follower hook 50b and a driven projection 50c. The knocker arm 50a knocks the driven projection 44a of the shutter blade 44. The cam follower hook 50b contacts the first cam portion 63c. The driven projection 50c contacts the delay lever 60. When the cam member 63 rotates in the counterclockwise direction, the cam follower hook 50b is pushed by the first cam portion 63c to rotate the shutter drive lever 50 against the torsion coil spring 66. Thus, the shutter device is charged.

The delay lever 60 is disposed in a rotatable manner on the light-shielded tunnel 42, to constitute a delay mechanism with the governor mechanism 62. The delay lever 60 is provided with a torsion coil spring 68 and a rivet or headed pin 70. A gear portion 60a is formed with one edge of the delay lever 60, and is meshed with an escapement wheel 73 which will be described later. A cam follower projection 60b of the delay lever 60 contacts the second cam portion 63d. A retention projection 60c of the delay lever 60 retains the retention lever 61. The torsion coil spring 68 has one end secured to the cam follower projection 60b of the delay lever 60, and a remaining end secured to the light-shielded tunnel 42. When the cam member 63 rotates, the cam follower projection 60b is pushed by the second cam portion 63d to rotate the delay lever 60 against the bias of the torsion coil spring 68.

The retention lever 61 has a combined shape and includes a driven projection 61a, a retention claw 61b, a blocking claw 61c and a receiving projection 61d. A pivotal pin 67 is formed with the light-shielded tunnel 42 and supports the retention lever 61 in a rotatable manner. A torsion coil spring 72 is disposed under the retention lever 61, and has one end secured to the driven projection 61a, and a remaining end secured to the light-shielded tunnel 42.

The receiving projection 61d of the retention lever 61 contacts the retention projection 60c of the delay lever 60. The retention claw 61b enters the lock notch 63b of the cam member 63 to retain the retention lever 61. The blocking claw 61c becomes engaged with teeth about the winder wheel 22 when the retention lever 61 rotates, to block rotation of the winder wheel 22. The driven projection 61a is pushed by an inner portion of the shutter release button 17 when the shutter release button 17 is depressed, and rotates the delay lever 60.

The governor mechanism 62 is constituted by the escapement wheel 73 and an anchor 74, and disposed on an upside of the light-shielded tunnel 42. A rotational speed of the escapement wheel 73 is adjusted by the anchor 74. As described heretofore, the escapement wheel 73 is meshed with the gear portion 60a of the delay lever 60, and rotates together with the delay lever 60. Therefore, the governor mechanism 62 operates to adjust the rotational speed of the delay lever 60. A switching ridge 75 in a sector shape is formed with the escapement wheel 73. The switching ridge 75 contacts, and turns on, the photometric switch 57 only while the escapement wheel 73 rotates.

Figure 6:
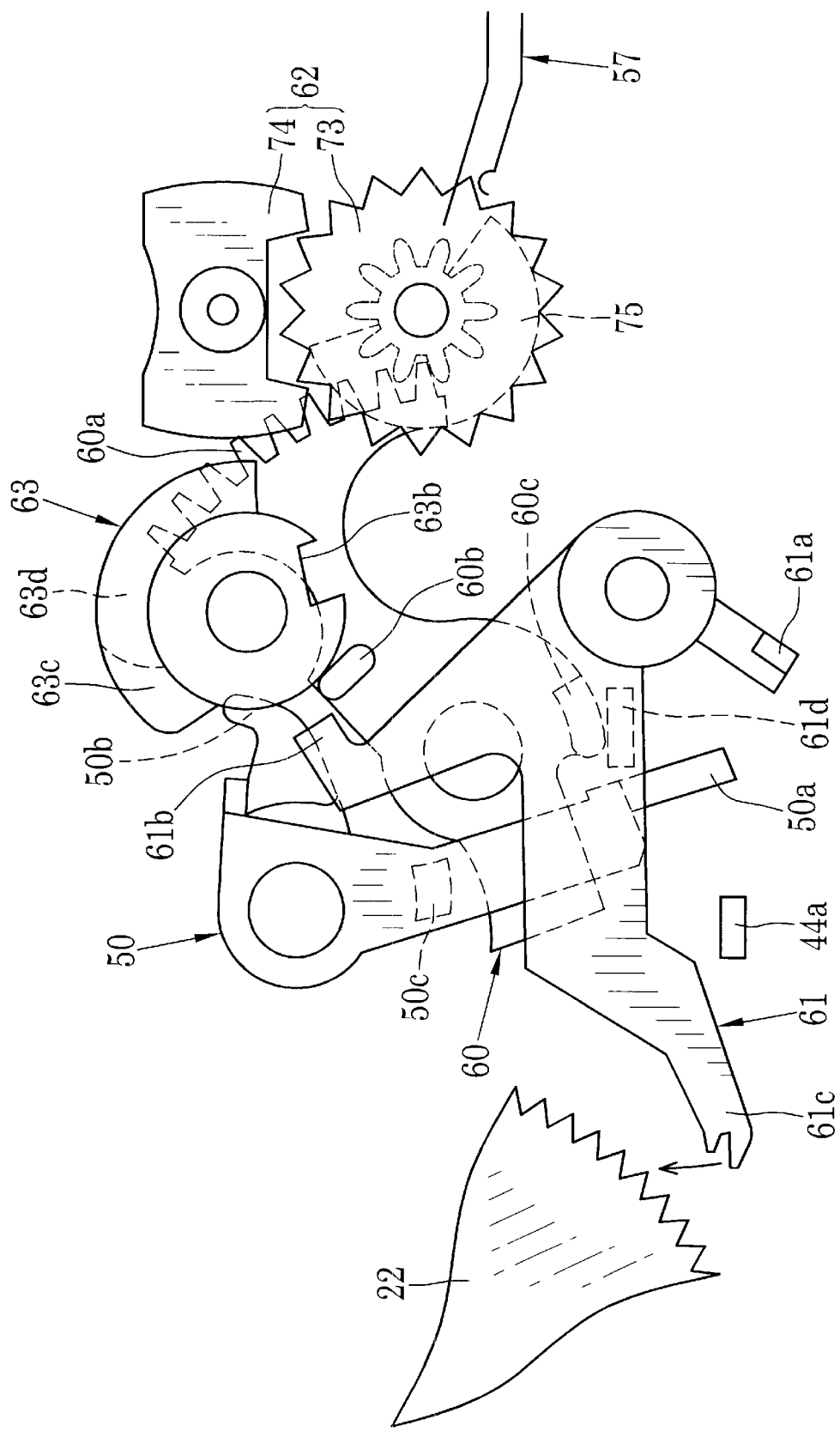
FIG. 6 is a top plan illustrating a state of the shutter device before a charging operation.

In FIG. 6, the delay lever 60 is kept by the bias of the torsion coil spring 68 in a position where one end of the gear portion 60a contacts is meshed with a smaller wheel portion of the escapement wheel 73. At the same time, the switching ridge 75 is away from the photometric switch 57, which does not become turned on. No photometry is effected.

The torsion coil spring 72 on the retention lever 61 receives such rotational load as to rotate the retention lever 61 in the clockwise direction. The torsion coil spring 72 has smaller force of bias that of the torsion coil spring 68 on the delay lever 60. In the retention lever 61, the receiving projection 61d is kept by the delay lever 60 in contact with the retention projection 60c of the delay lever 60.

Figure 7:
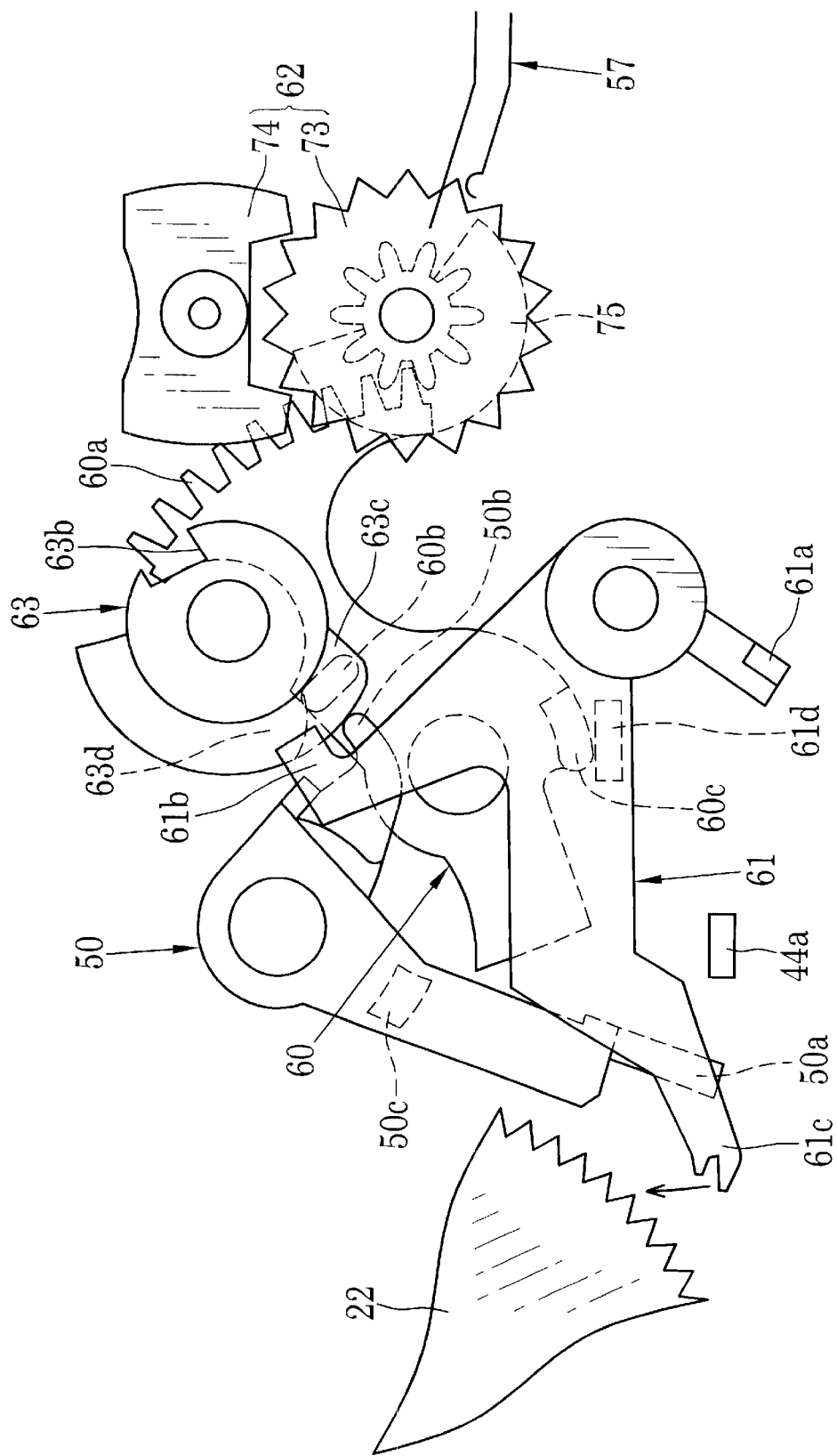
FIG. 7 is a top plan illustrating a state of the shutter device of which a shutter drive lever is charged.

When the winder wheel 22 rotates, the cam member 63 makes a counterclockwise rotation with the sprocket wheel 64. In FIG. 7, the first cam portion 63c pushes the cam follower hook 50b of the shutter drive lever 50, which rotates clockwise to the charged position.

Figure 8:
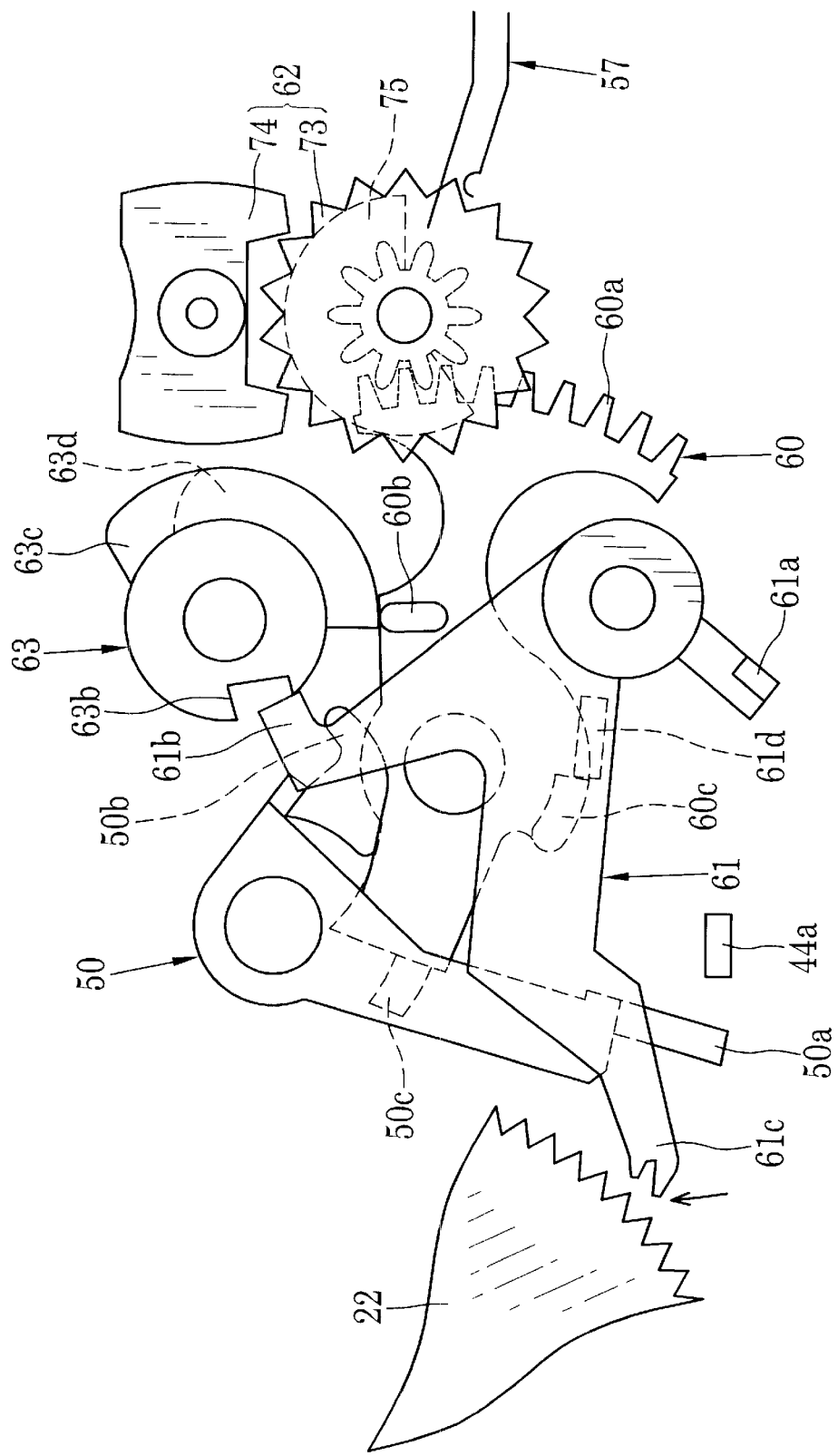
FIG. 8 is a top plan illustrating a state of the shutter device of which a delay lever is charged.

When the cam member 63 rotates, the second cam portion 63d pushes the cam follower projection 60b of the delay lever 60, which rotates in the clockwise direction. Upon rotation of the delay lever 60 by a predetermined amount, the retention projection 60c of the delay lever 60 is disengaged from the receiving projection 61d of the retention lever 61, which rotates in the clockwise direction in FIG. 8. Accordingly, the retention claw 61b comes in contact with the cam member 63.

In the shutter drive lever 50, the cam follower hook 50b is away from the first cam portion 63c. The shutter drive lever 50 receives force from the torsion coil spring 66 rotationally in a counterclockwise direction. However, the driven projection 50c of the shutter drive lever 50 has been pushed by the delay lever 60. The shutter drive lever 50 is kept in the charged position by the delay lever 60.

Figure 9:
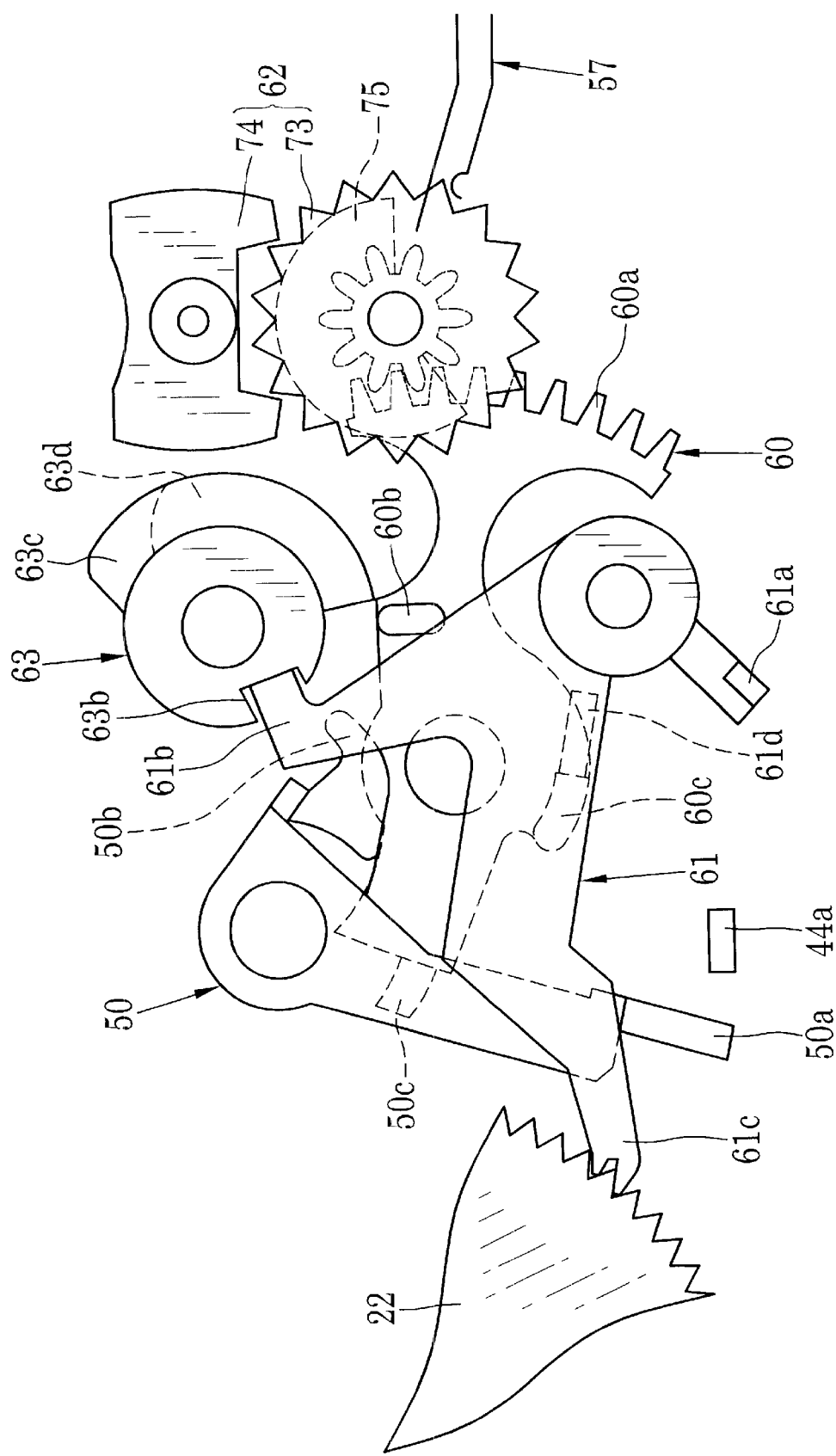
FIG. 9 is a top plan illustrating a state of the shutter device after the charging operation.

Rotation of the winder wheel 22 causes the cam member 63 to rotate further in the counterclockwise direction. In FIG. 9, the retention claw 61b enters the lock notch 63b when the photo film 27 is wound by one frame, so the retention lever 61 is retained. Then the retention lever 61 rotates in the clockwise direction to engage the blocking claw 61c with the teeth of the winder wheel 22, of which rotation is blocked. As the receiving projection 61d of the retention lever 61 enters a rotational orbit of the retention projection 60c, the delay lever 60 is retained by the retention lever 61 with the retention projection 60c contacted on the receiving projection 61d. Thus, the shutter device is charged or cocked.

Figure 10:
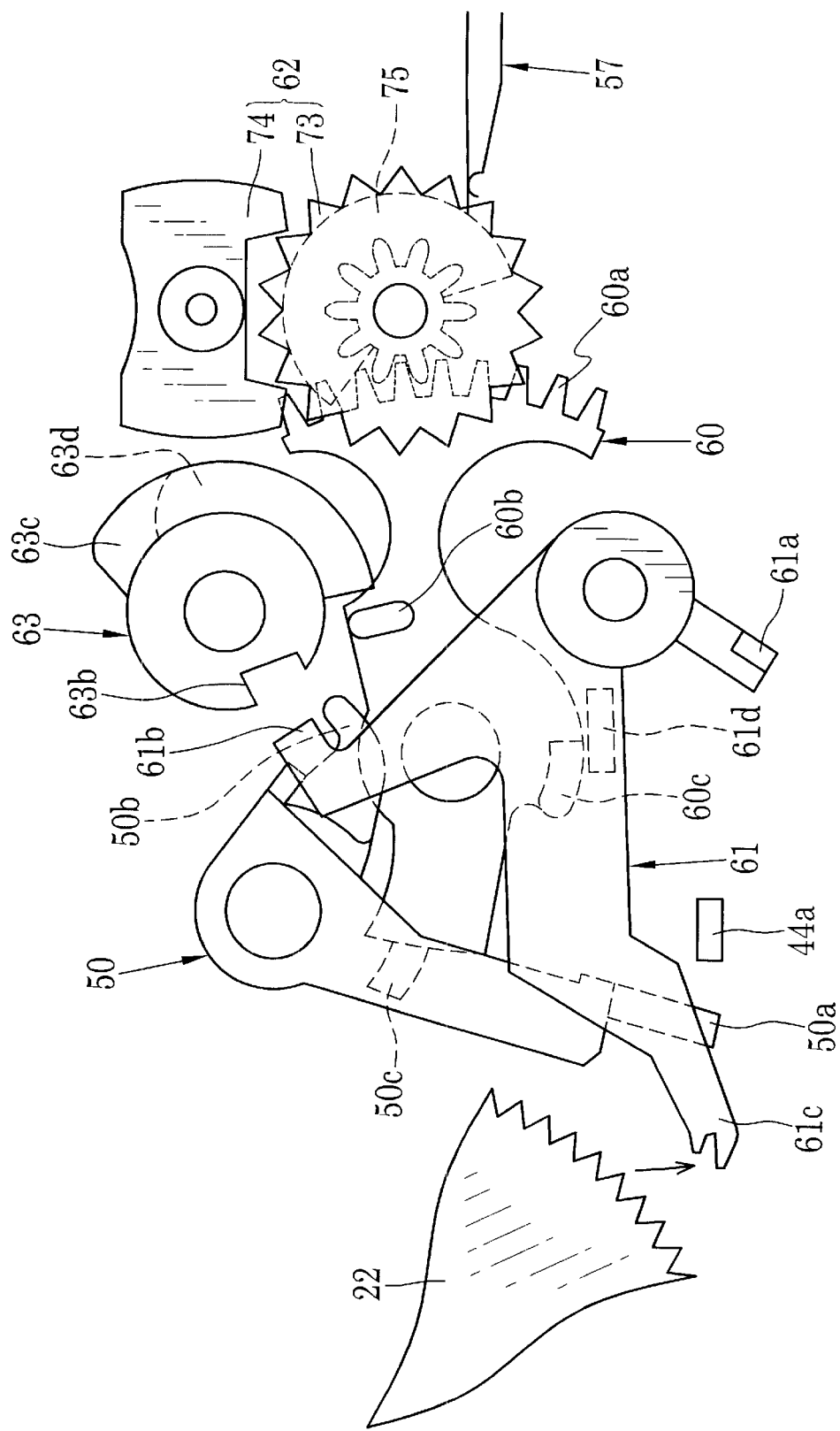
FIG. 10 is a top plan illustrating a state of the shutter device immediately after a releasing operation.

When the shutter release button 17 is depressed, the driven projection 61a is pushed by the shutter release button 17 as illustrated in FIG. 10. The retention lever 61 rotates in the counterclockwise direction against the torsion coil spring 72. In the retention lever 61, the receiving projection 61d comes out of the rotational orbit of the retention projection 60c of the delay lever 60, which is rotated in the counterclockwise direction. In response to this, the escapement wheel 73 rotates in the clockwise direction. The switching ridge 75 turns on the photometric switch 57. The photometric circuit 56 is operated to measure the object brightness. The aperture stop for the optical system is changed over according to the measured object brightness.

In the shutter drive lever 50, the driven projection 50c is still contacted by one end of the delay lever 60. The shutter drive lever 50 is kept in the charged state. The delay lever 60 rotates in receiving frictional force from the torsion coil spring 66 secured to the shutter drive lever 50. For the delay lever 60 to rotate with sufficient force overcoming the frictional force, the torsion coil spring 68 of the delay lever 60 has biasing force higher than that of the torsion coil spring 66 of the shutter drive lever 50.

Figure 11:
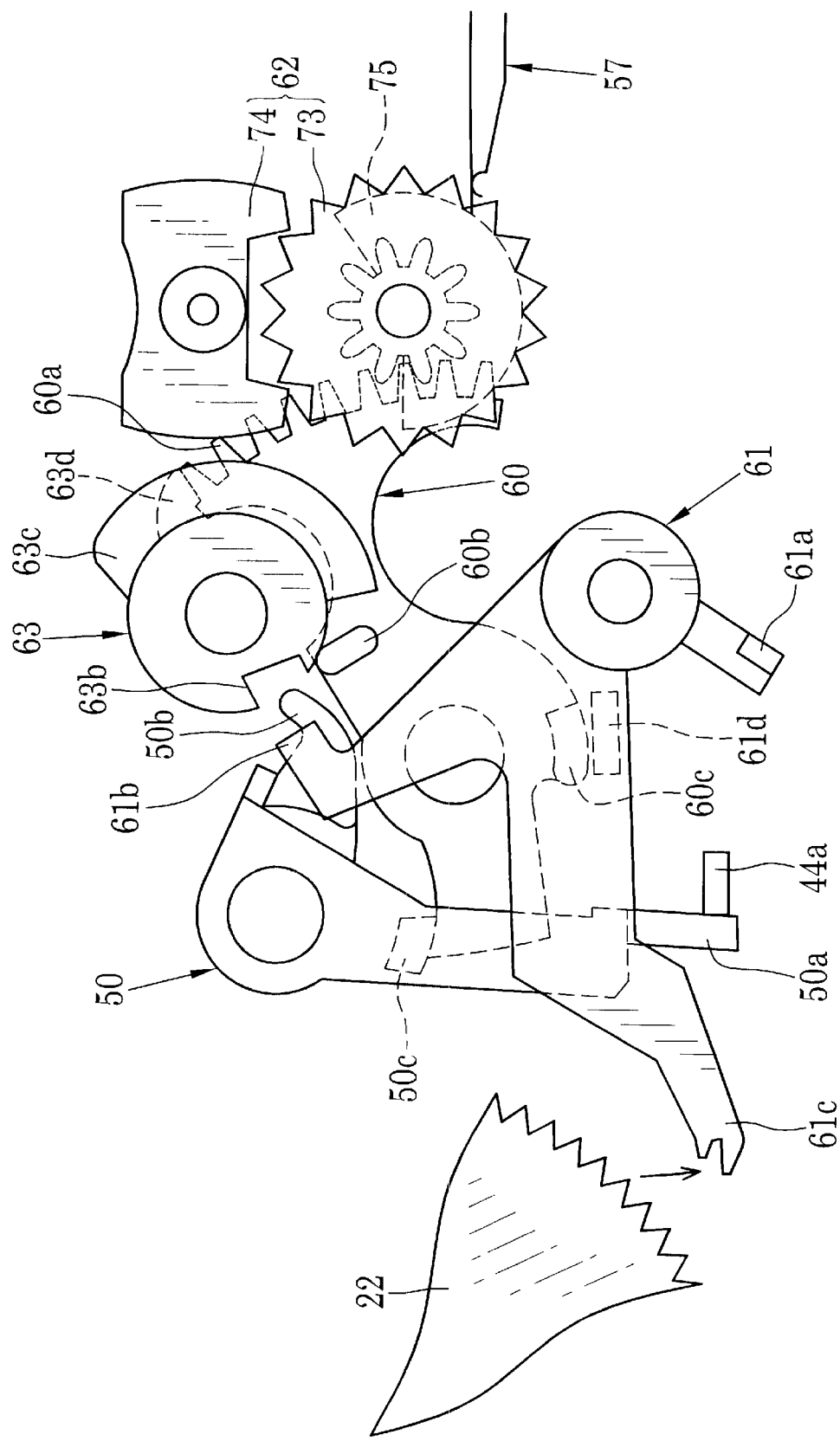
FIG. 11 is a top plan illustrating a state of the shutter device during an exposure.

When the delay lever 60 rotates by a predetermined amount, an end of the delay lever 60 comes out of the driven projection 50c as illustrated in FIG. 11. The shutter drive lever 50 rotates in the counterclockwise direction. The knocker arm 50a quickly knocks the driven projection 44a of the shutter blade 44 to open the shutter opening 47. The delay lever 60 still continues rotating. When the switching ridge 75 comes away from the photometric switch 57, the delay lever 60 stops. The shutter releasing operation is completed.

Figure 12:
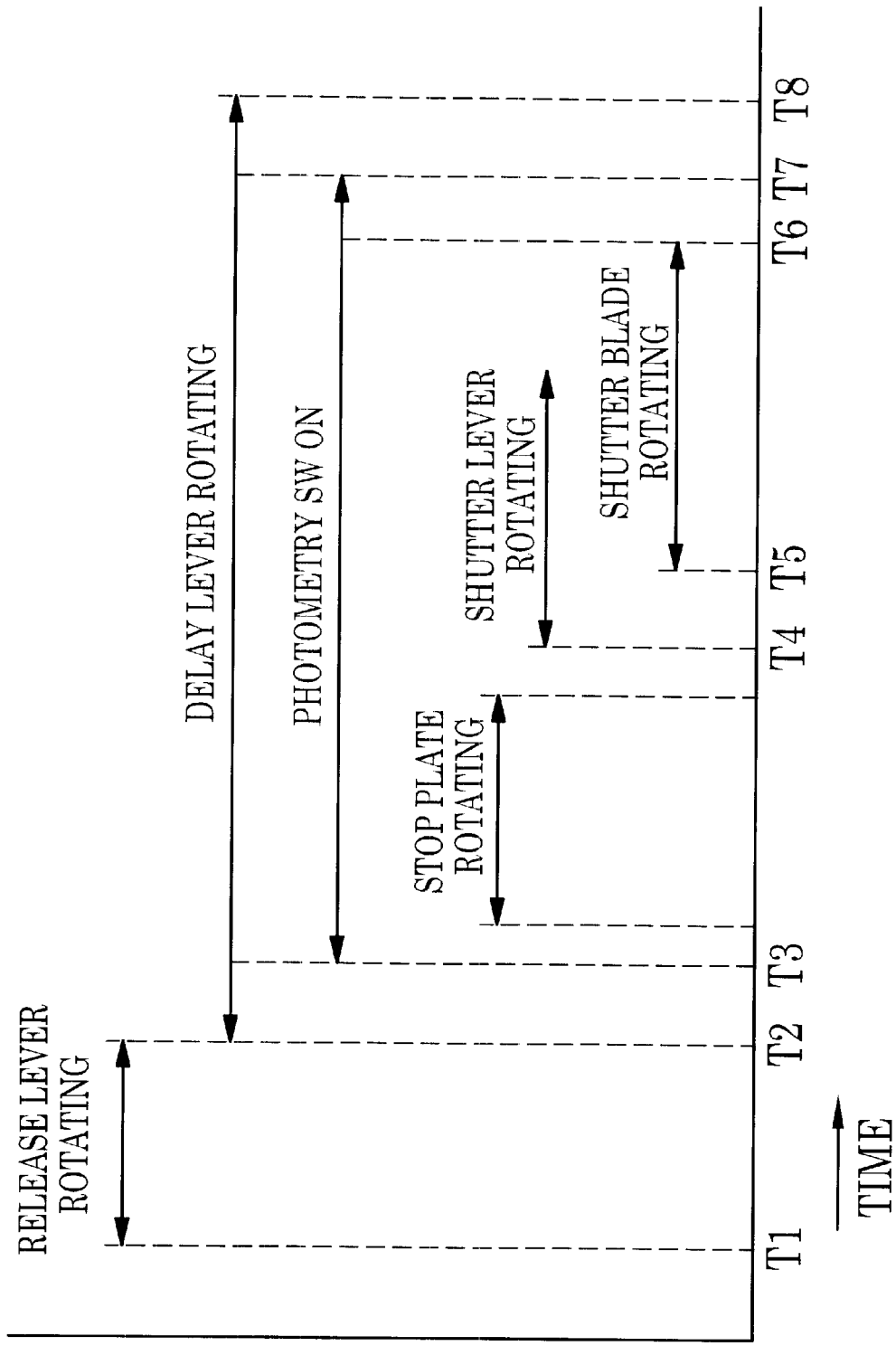
FIG. 12 is a timing chart illustrating the operation of the shutter device.

FIG. 12 is a timing chart of operation of the shutter device. Let the object brightness be sufficiently high in consideration of shifting of the stop changeover plate 45. The shutter release button 17 is depressed at the time T1. At first, only the retention lever 61 is moved. At the time T2, the retention lever 61 releases the delay lever 60 and stops. Then rotation of the delay lever 60 turns on the photometric switch 57 at the time T3. The photometric circuit 56 is operated to measure the object brightness. While the delay lever 60 rotates, the aperture stop is changed over. The shutter drive lever 50 is unlocked at the time T4. The shutter drive lever 50 rotates, and knocks and swings the shutter blade 44 at the time T5 to start an exposure to the photo film 27. The exposure is completed at the time T6. The photometric switch 57 is turned off at the time T7. The delay lever 60 stops rotating at the time T8, to complete the shutter releasing.

While the delay lever 60 rotates, its rotational speed is changeable by means of the governor mechanism 62. It is possible as desired to change an interval between the time T3 of starting the photometry and the time T4 of starting rotation of the shutter drive lever 50. A preferable example of the interval T4–T3 is in a range of 10–60 msec. This is effective in reliable control of an exposure, because the shutter blade 44 is opened after the exposure aperture is changed over.

In the present shutter device, the braking operation is effected only to the delay lever 60 by the governor mechanism 62. The shutter drive lever 50 is not braked. Thus, no influence occurs to the shutter speed.

The operation of the above construction is described now. A user rotates the winder wheel 22 to set an unexposed frame of the photo film 27 behind the exposure aperture 32. The rotation of the winder wheel 22 charges or cocks the shutter drive lever 50 and the delay lever 60. Upon winding of the photo film 27 by one frame, the retention lever 61 rotates to engage the blocking claw 61c with the winder wheel 22, of which rotation is blocked. While the shutter drive lever 50 is charged, the photometric switch 57 does not become turned on without depression of the shutter release button 17. Thus, wasteful use of power of the dry battery 38 is avoided.

A photographic field is framed by the user, who depresses the shutter release button 17. In response, the delay lever 60 is unlocked from the retention lever 61, and starts rotation. While the delay lever 60 rotates, the photometric switch 57 is turned on to operate the photometric circuit 56. Measurement of object brightness starts.

In indoor photography for a scene with a small amount of light, no current flows in the solenoid 46. The stop changeover plate 45 remains in the first position. An exposure is taken through the large-diameter opening 53, and thus can have a greater amount of light. A photograph can be obtained at an appropriate exposure without an underexposed state.

In outdoor photography for a scene with a very great amount of light, a current flows in the solenoid 46. The stop changeover plate 45 is shifted to the second position. An exposure is taken through the small-diameter opening 52, to reduce an exposure amount to an optimum amount. An overexposed state is prevented.

In flash photography, object brightness measured by photometry is very small. No current flows in the solenoid 46. The stop changeover plate 45 is kept in the first position. An exposure is taken through the large-diameter opening 53.

During measurement of the object brightness and shifting of the stop changeover plate 45, the shutter drive lever 50 is retained in the charged position by the delay lever 60. This is effective in avoiding an accidental exposure while the stop changeover plate 45 is shifted.

When the delay lever 60 rotates for a predetermined time, the shutter drive lever 50 is released from blocking of the delay lever 60, and starts moving. The shutter blade 44 is knocked and swung, to expose the photo film 27. After this, the photometric switch 57 is turned off to terminate the photometric operation. The delay lever 60 stops rotation. The photographing operation is completed.

In FIGS. 13–18, another preferred embodiment is illustrated, in which a single member is operated to turn on a photometric switch and to knock a shutter blade. Elements similar to those in the lens-fitted photo film unit of FIGS. 1 and 2 and the aperture stop changeover mechanism of FIG. 3 are designated with identical reference numerals.

Figure 13:
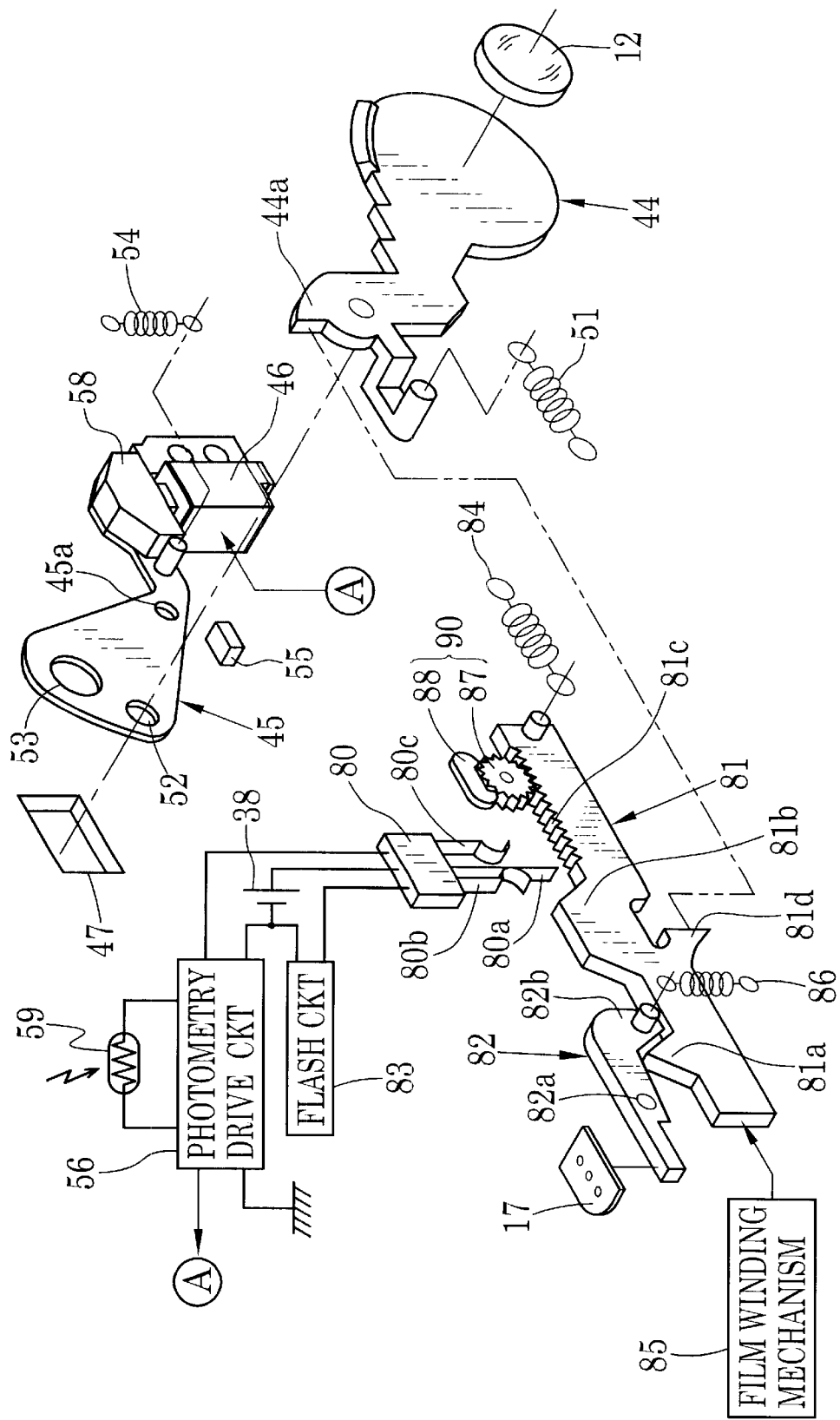
FIG. 13 is an exploded perspective illustrating another preferred shutter device in which a moving speed of a shutter drive member is adjusted.

In FIG. 13, an exposure unit is illustrated, and is constituted by an aperture stop changeover mechanism, the shutter blade 44, the photometric circuit 56, a two-way switch 80, a shutter drive plate 81 and a retention lever 82. The aperture stop changeover mechanism includes the stop changeover plate 45, the solenoid 46 and the iron segment 58.

Figure 14:
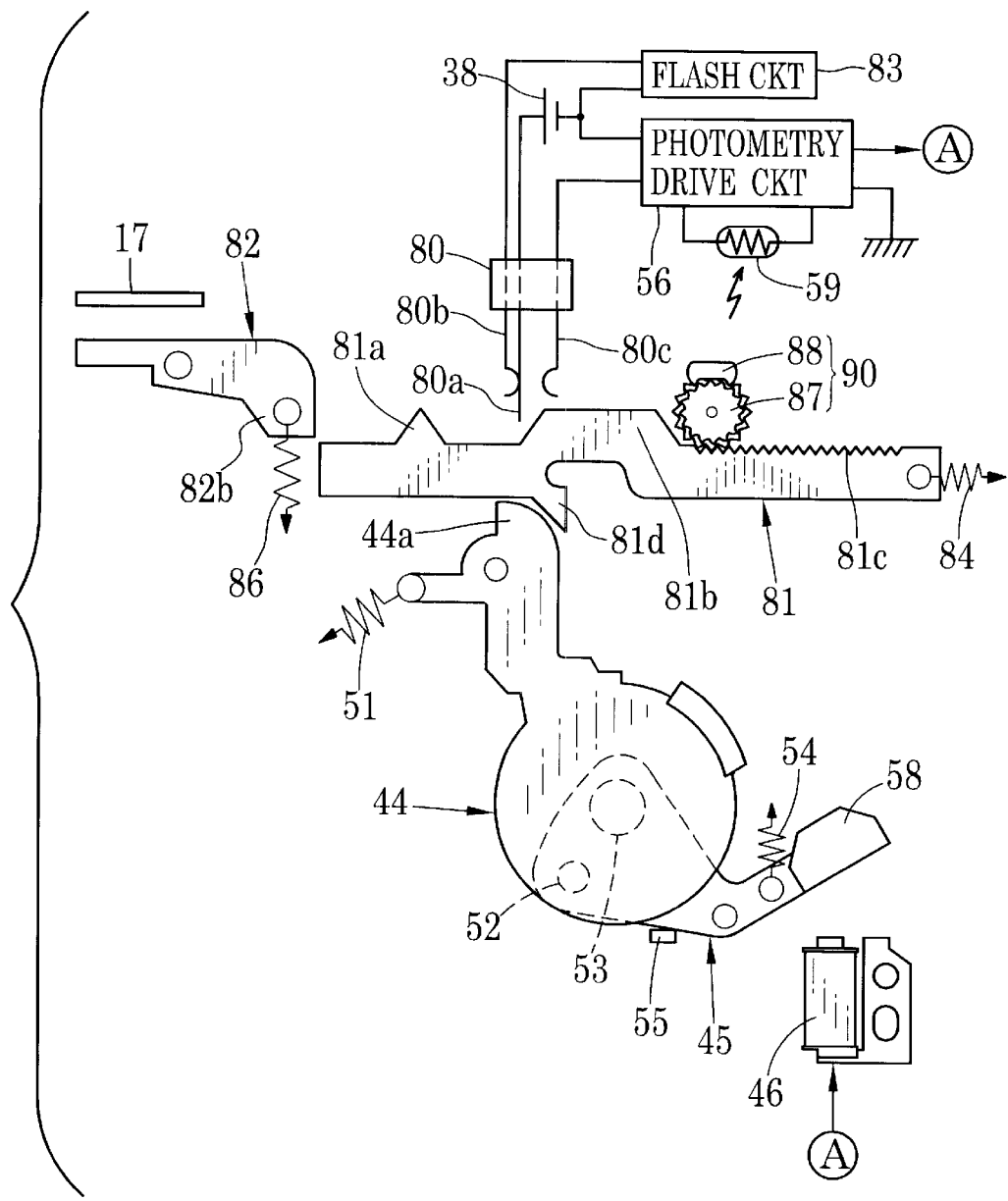
FIG. 14 is a front elevation illustrating a state of the shutter device before a charging operation.

In FIG. 14, a state before charging the shutter device is illustrated. The two-way switch 80 includes a switch segment 80a, a flash switch segment 80b and a photometric switch segment 80c. The switch segment 80a is connected with the dry battery 38, and disposed between the flash switch segment 80b and the photometric switch segment 80c. The flash switch segment 80b, on the left side in the drawing, is connected with a flash circuit 83. The photometric switch segment 80c on the right side is connected with the photometric circuit 56. A photometric switch is constituted by the switch segment 80a and the photometric switch segment 80c.

The switch segment 80a is disposed in such a position that, when in a free state, it contacts the flash switch segment 80b to keep the photometric switch turned off. The switch segment 80a is extended lower than the flash switch segment 80b and the photometric switch segment 80c, and when shifted to the right in the drawing, contacts the photometric switch segment 80c to turn on the photometric switch and power the photometric circuit 56.

The shutter drive plate 81 is disposed under the two-way switch 80. A tension spring 84 is secured to a projection at an end of the shutter drive plate 81. An upside of the shutter drive plate 81 has a lock claw 81a, a switching ridge 81b and a rack portion 81c. An underside of the shutter drive plate 81 has a knocker arm 81d for opening/shutting the shutter blade 44. A photo film winder mechanism 85 for winding the photo film 27 is connected with the shutter drive plate 81.

When rotation of the winder wheel 22 actuates the photo film winder mechanism 85, the shutter drive plate 81 is slid to the left against the tension spring 84, for charging the shutter device.

The retention lever 82 is disposed between the shutter drive plate 81 and the shutter release button 17. An axial hole 82a is formed in the retention lever 82, which is kept rotatable thereabout. A lock projection 82b at an end of the retention lever 82 maintains the shutter drive plate 81 in a charged state. A tension spring 86 is secured to the lock projection 82b, and biases the retention lever 82 in the clockwise direction. The shutter release button 17 is disposed above the retention lever 82, and when depressed, causes the retention lever 82 to rotate in the counterclockwise direction against the bias of the tension spring 86.

A governor mechanism 90 is disposed on the upside of the shutter drive plate 81, and is constituted by a rotatable escapement wheel 87 and an anchor 88. The anchor 88 adjusts a rotational speed of the escapement wheel 87. Also, the escapement wheel 87 is in mesh with the rack portion 81c of the shutter drive plate 81. The governor mechanism 90 operates to adjust the sliding speed of the shutter drive plate 81.

Before the shutter device is cocked or charged, the shutter drive plate 81 is kept by the tension spring 84 in the release position to the right as viewed in the drawing. No photometry is effected, because the switch segment 80a is away from the photometric switch segment 80c.

Figure 15:
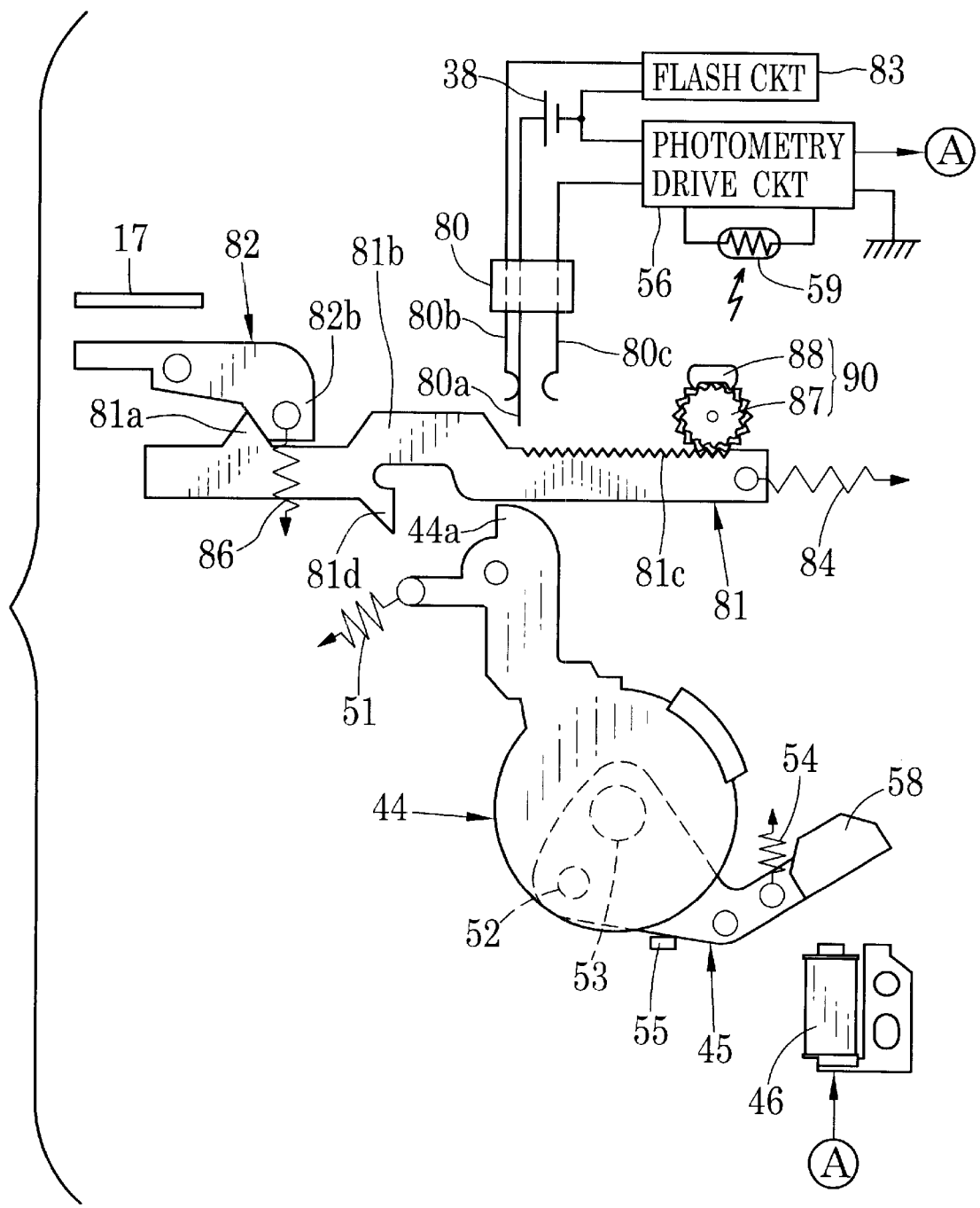
FIG. 15 is a front elevation illustrating a state of the shutter device after the charging operation.

When the photo film winder mechanism 85 is actuated, the shutter drive plate 81 slides to the left in the drawing against the bias of the tension spring 84. In FIG. 15, the shutter drive plate 81 is charged with the lock claw 81a kept engaged with the lock projection 82b of the retention lever 82. The switch segment 80a does not contact the shutter drive plate 81. So the photometric switch remains turned off. No photometry is effected.

Figure 16:
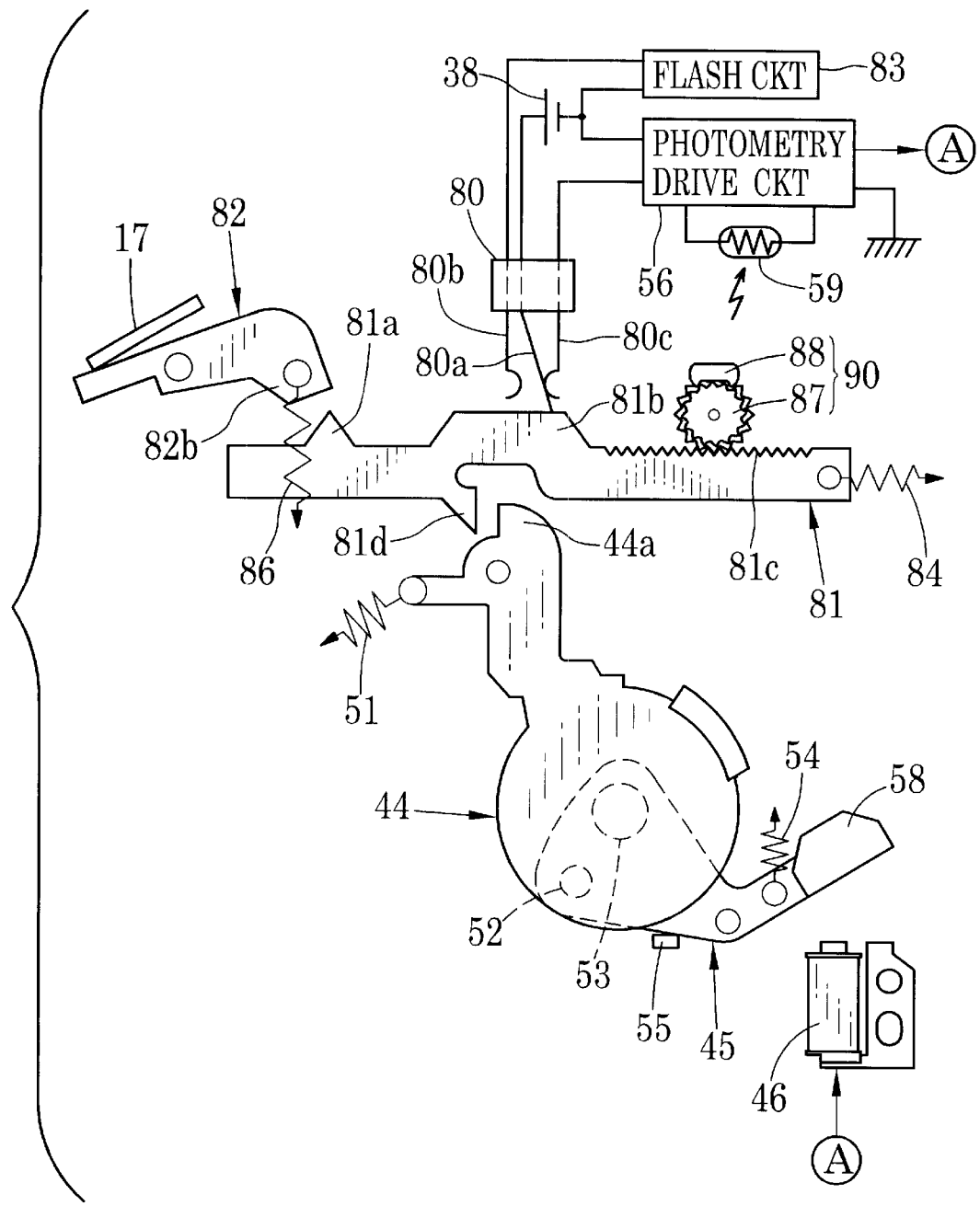
FIG. 16 is a front elevation illustrating a state of the shutter device after a releasing operation.

When the shutter release button 17 is depressed with the shutter drive plate 81 charged, the retention lever 82 is pushed by the inside of the shutter release button 17, and rotates in the counterclockwise direction against the tension spring 86. In FIG. 16, the shutter drive plate 81 is disengaged from the retention lever 82, and is slid by the tension spring 84 to the right in the drawing. Upon the start of sliding the shutter drive plate 81, the switch segment 80a is pushed by the switching ridge 81b and comes in contact with the photometric switch segment 80c. The photometric switch is turned on, to operate the photometric circuit 56.

The photometric circuit 56 being operated, the power in the dry battery 38 is supplied to the photometric circuit 56, which measures the object brightness with the photo receptor element 59. If the measured brightness is equal to or higher than the reference brightness, the solenoid 46 is energized. The stop changeover plate 45 is shifted to the second position against the bias of the tension spring 54. If the measured brightness is lower than the reference brightness, the stop changeover plate 45 is kept in the first position against without energizing the solenoid 46.

Figure 17:
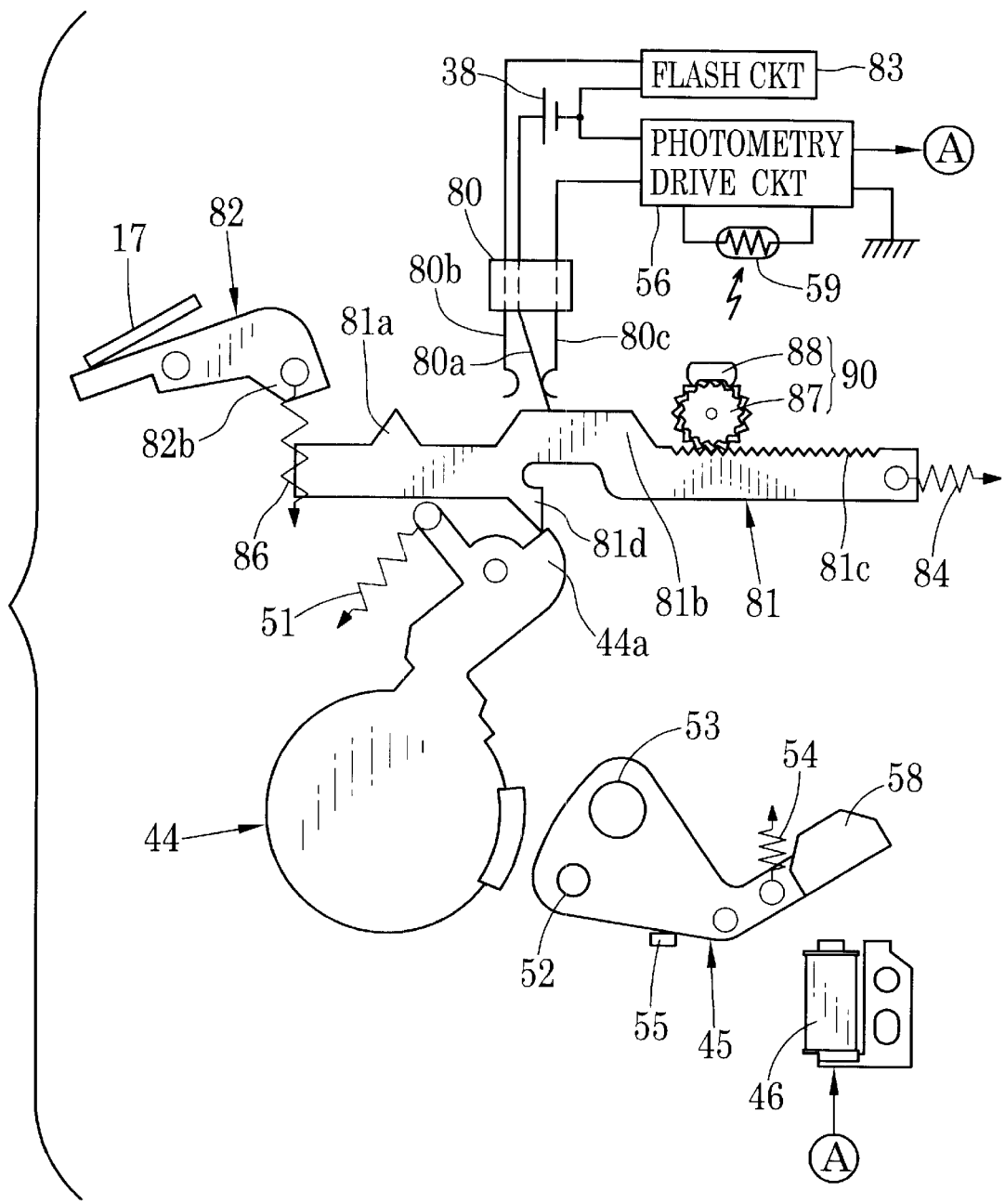
FIG. 17 is a front elevation illustrating a state of the shutter device during an exposure.

The shutter drive plate 81 further slides. In FIG. 17, the driven projection 44a of the shutter blade 44 is knocked by the shutter drive plate 81d. The shutter blade 44 rotates. The photo film 27 is exposed while the shutter blade 44 is open.

If the measured brightness is lower than the reference brightness, the exposure is through the large-diameter opening 53 with a higher exposure amount, because the stop changeover plate 45 is kept in the first position. If the measured brightness is equal to or higher than the reference brightness, the exposure is through the small-diameter opening 52 with a optimally reduced exposure amount, because the stop changeover plate 45 is set in the second position.

After the exposure is completed, the shutter drive plate 81 continues sliding to the right in the drawing. The switching ridge 81b comes away from the switch segment 80a to turn off the photometric circuit 56. Then the shutter drive plate 81 is slid back to the release position of FIG. 14, to complete the shutter operation.

Figure 18:
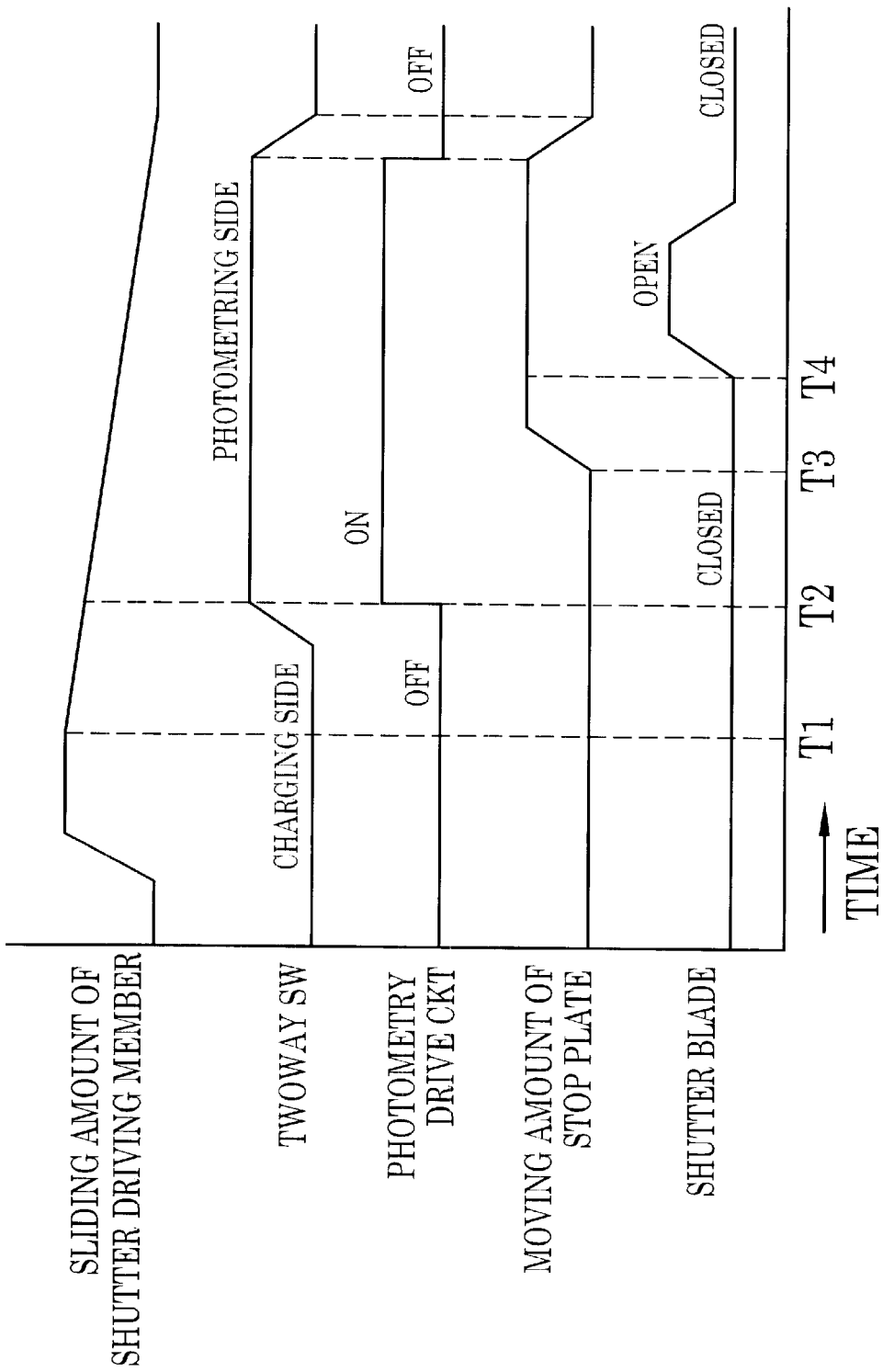
FIG. 18 is a timing chart illustrating the operation of the shutter device.

FIG. 18 is a timing chart of elements constituting the exposure unit, in a condition where the stop changeover plate 45 shifts to the second position. After the shutter drive plate 81 is charged, the shutter release button 17 is depressed at the time T1. Then the shutter drive plate 81 starts sliding. At the time T2, the two-way switch 80 is changed over for connection with the photometric circuit 56, which starts operation. In the present embodiment, there occurs a time lag in he interval T4–T3 between the start of shifting the stop changeover plate 45 and the exposure. The time lag is due to sliding of the shutter drive plate 81, but can be adjusted at any desired value by means of the governor mechanism 90. Preferably, the time lag is predetermined for example 10–20 msec as time required for shifting the stop changeover plate 45. This is effective in taking an exposure reliably after shifting the stop changeover plate 45.

Furthermore, wasteful use of the dry battery 38 can be avoided as the two-way switch 80 is set on the side of photometry only while the shutter drive plate 81 is slid. The photometric circuit 56 does not operate even when the shutter release button is halfway depressed.

In FIGS. 19–24, a preferred embodiment is illustrated, in which no governor mechanism is used. Elements similar to those in the lens-fitted photo film unit of FIGS. 1 and 2 are designated with identical reference numerals.

Figure 19:
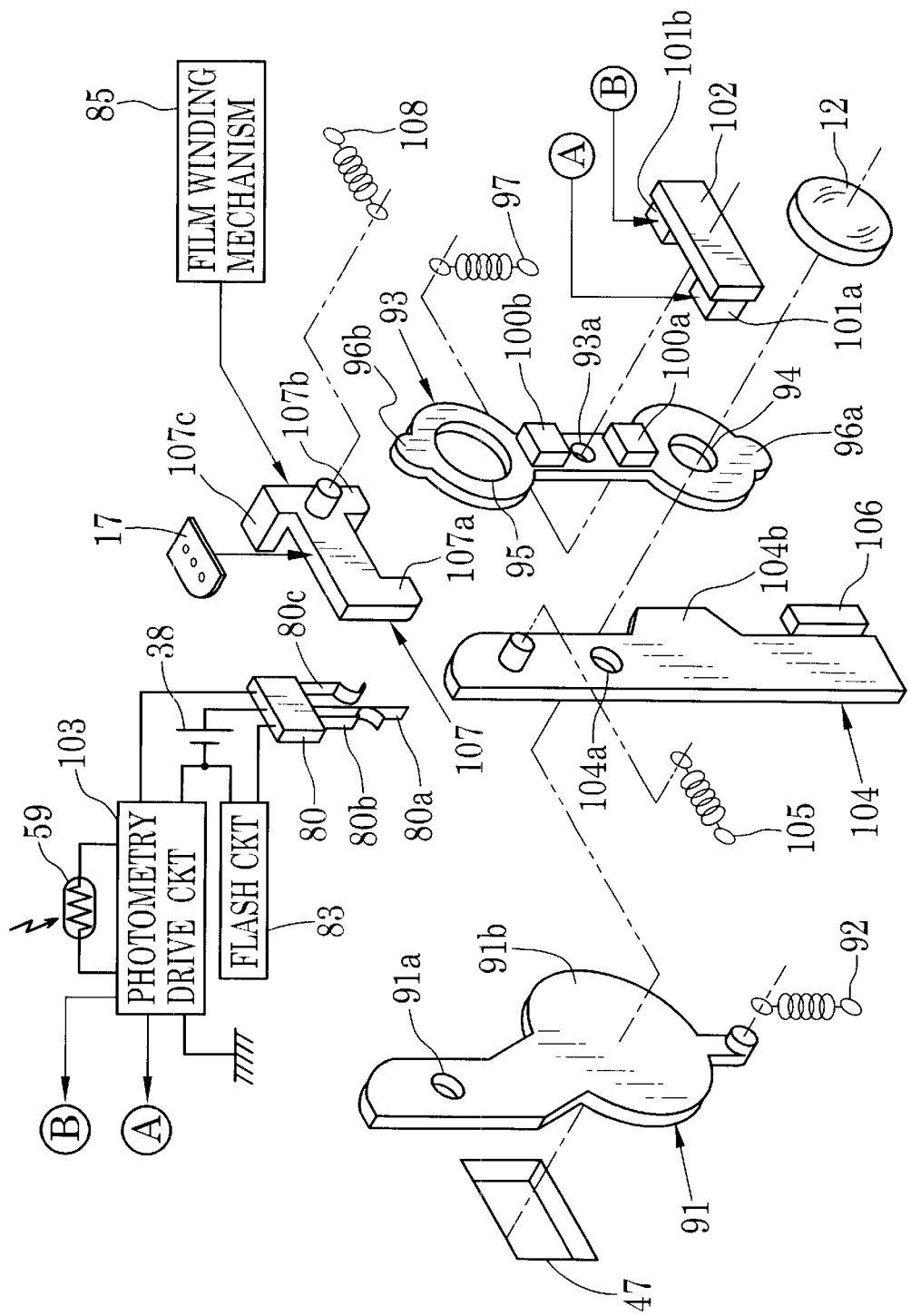
FIG. 19 is an exploded perspective illustrating another preferred shutter device in which, after a stop changeover plate is rotated, a shutter drive member is released from retention.

In FIG. 19, a shutter blade 91 is disposed in front of the shutter opening 47 in the light-shielded tunnel 42. An axial hole 91a in the shutter blade 91 is an axis about which the shutter blade 91 is rotatable. A tension spring 92 biases the shutter blade 91 in a position where a blade portion 91b closes the photographic light path. A stop changeover plate 93 is disposed in front of the shutter blade 91. An axial hole 93a in the stop changeover plate 93 is an axis about which the stop changeover plate 93 is rotatable. There are a small-diameter opening 94 and a large-diameter opening 95 formed in the stop changeover late 93 beside the axial hole 93a.

Drive projections 96a and 96b are formed with respectively ends of the stop changeover plate 93 for constituting parts of the shutter device. A pin (not shown) is disposed on the rear of the stop changeover plate 93. A coil spring 97 is secured to the pin, and biases the stop changeover plate 93 to an intermediate position illustrated in FIG. 20. Note that the spring 97 may be a tension spring, compression spring or any biasing element for biasing the stop changeover plate 93 to the intermediate position rotationally between first and second positions of FIGS. 23 and 24.

Two permanent magnets 100a and 100b are secured to a front face of the stop changeover plate 93, and are symmetrical with each other with reference to the axial hole 93a. Front poles of the permanent magnets 100a and 100b are different from one another. For example, a front pole of the permanent magnet 100a is an N pole and a front pole of the permanent magnet 100b is an S pole. Two plate shifting solenoids 101a and 101b are disposed in front of the stop changeover plate 93. A support plate 102 supports the plate shifting solenoids 101a and 101b in positions where the permanent magnets 100a and 100b come when the stop changeover plate 93 makes a ¼ rotation.

A photometric circuit 103 or photometric drive circuit is connected with both of the plate shifting solenoids 101a and 101b, and is constructed to energize a selected one of the plate shifting solenoids 101a and 101b according to the value of the object brightness being measured.

The present embodiment is herein described for the plate shifting solenoids 101a and 101b having an N pole opposed to the permanent magnets 100a and 100b, the front poles of the permanent magnets 100a and 100b being respectively the N pole and the S pole. Also, the plate shifting solenoids 101a and 101b may have polarity opposite to the present embodiment.

If the photometric circuit 103 detects that the object brightness is equal to or higher than the reference brightness, then the photometric circuit 103 energizes the plate shifting solenoid 101b. Repulsing force occurs between the plate shifting solenoid 101b and the permanent magnet 100a. Attracting force occurs between the plate shifting solenoid 101b and the permanent magnet 100b. Thus, the stop changeover plate 93 rotates against the coil spring 97 in the clockwise direction. When the stop changeover plate 93 has made a ¼ rotation, the attracting force becomes the maximum. The repulsing force becomes the minimum. The stop changeover plate 93 is kept in the first position where the small-diameter opening 94 is set in the light path.

In contrast, when the photometric circuit 103 detects that the object brightness is less than the reference brightness, the plate shifting solenoid 101a is energized. Repulsing force occurs between the plate shifting solenoid 101a and the permanent magnet 100a. Attracting force occurs between the plate shifting solenoid 101a and the permanent magnet 100b. Thus, the stop changeover plate 93 makes a ¼ rotation in the counterclockwise direction, and is kept in the second position where the large-diameter opening 95 is set in the light path.

A retention lever 104 is positioned opposite to the stop changeover plate 93 with reference to the optical axis. An axial hole 104a is formed in the retention lever 104, which is rotatable thereabout. A tension spring 105 is secured to one end of the retention lever 104. A stopper 106 is contacted by a remaining end of the retention lever 104. A driven ridge 104b is formed with the retention lever 104, and pushed by the drive projections 96a and 96b when the stop changeover plate 93 rotates.

A shutter drive plate 107 is disposed above the retention lever 104, and includes a retention projection 107a, a knocker arm 107b and a switching projection 107c. The retention projection 107a is engageable with the retention lever 104. The knocker arm 107b opens and shuts the shutter blade 91. The switching projection 107ccontacts the two-way switch 80.

Figure 20:
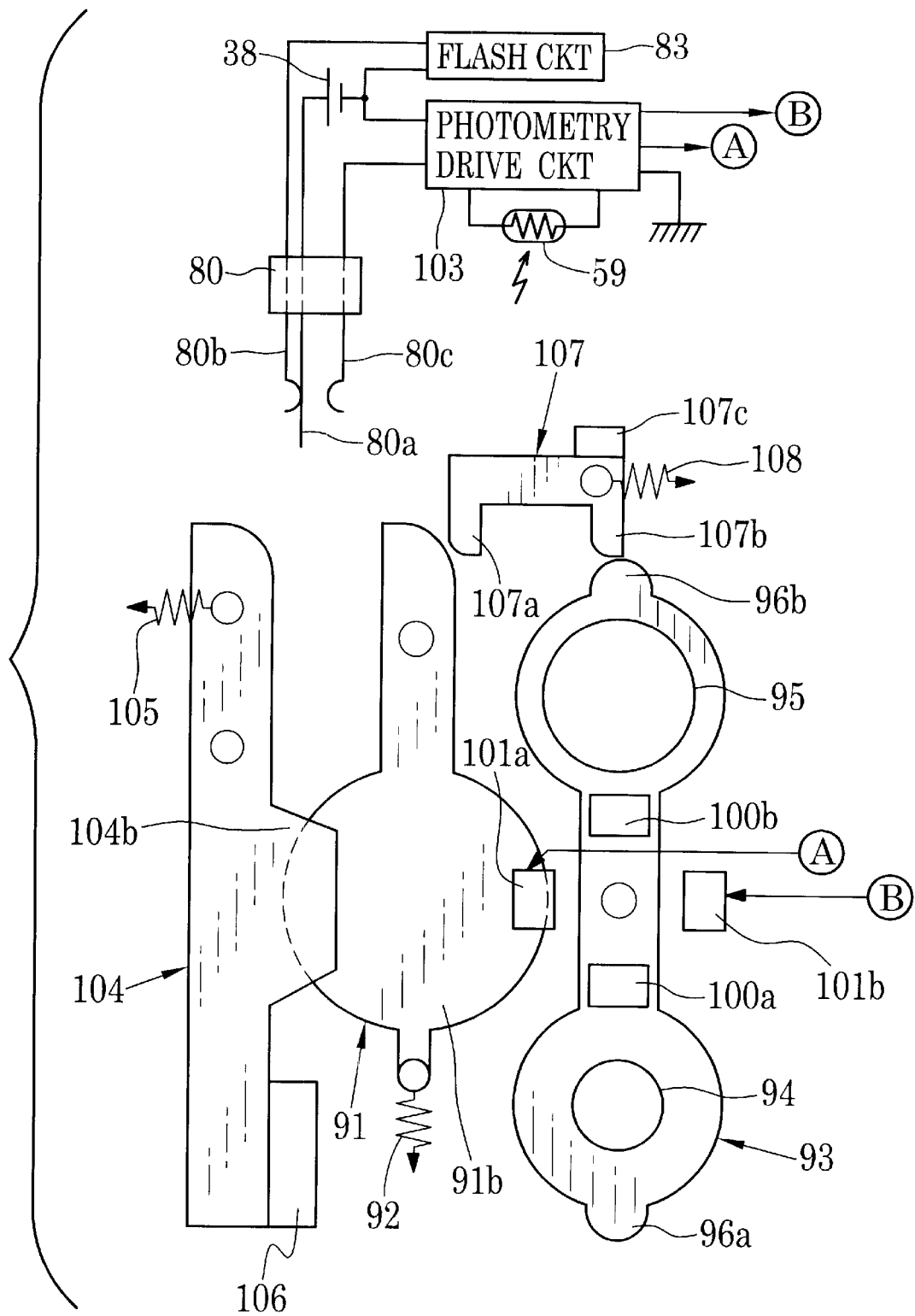
FIG. 20 is a front elevation illustrating a state of the shutter device of FIG. 19 before a charging operation.
Figure 21:
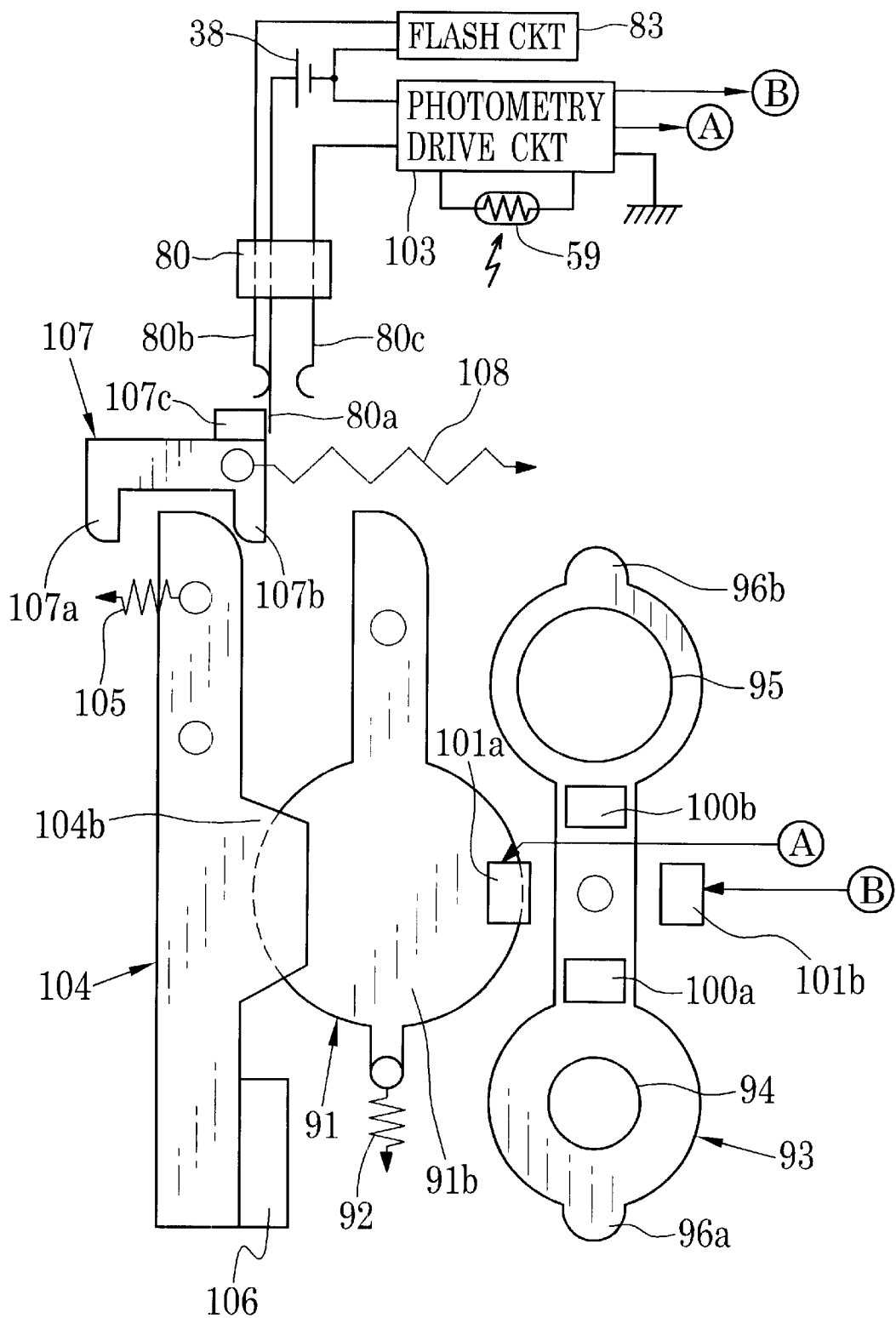
FIG. 21 is a front elevation illustrating a state of the shutter device of FIG. 19 after the charging operation.

In FIG. 20, a state before the shutter charging is illustrated. A tension spring 108 keeps the shutter drive plate 107 in a released position to the right of the governor mechanism 90. The stop changeover plate 93 is biased by the coil spring 97 and kept in the intermediate position where both the small-diameter opening 94 and the large-diameter opening 95 are away from the light path.

Figure 22:
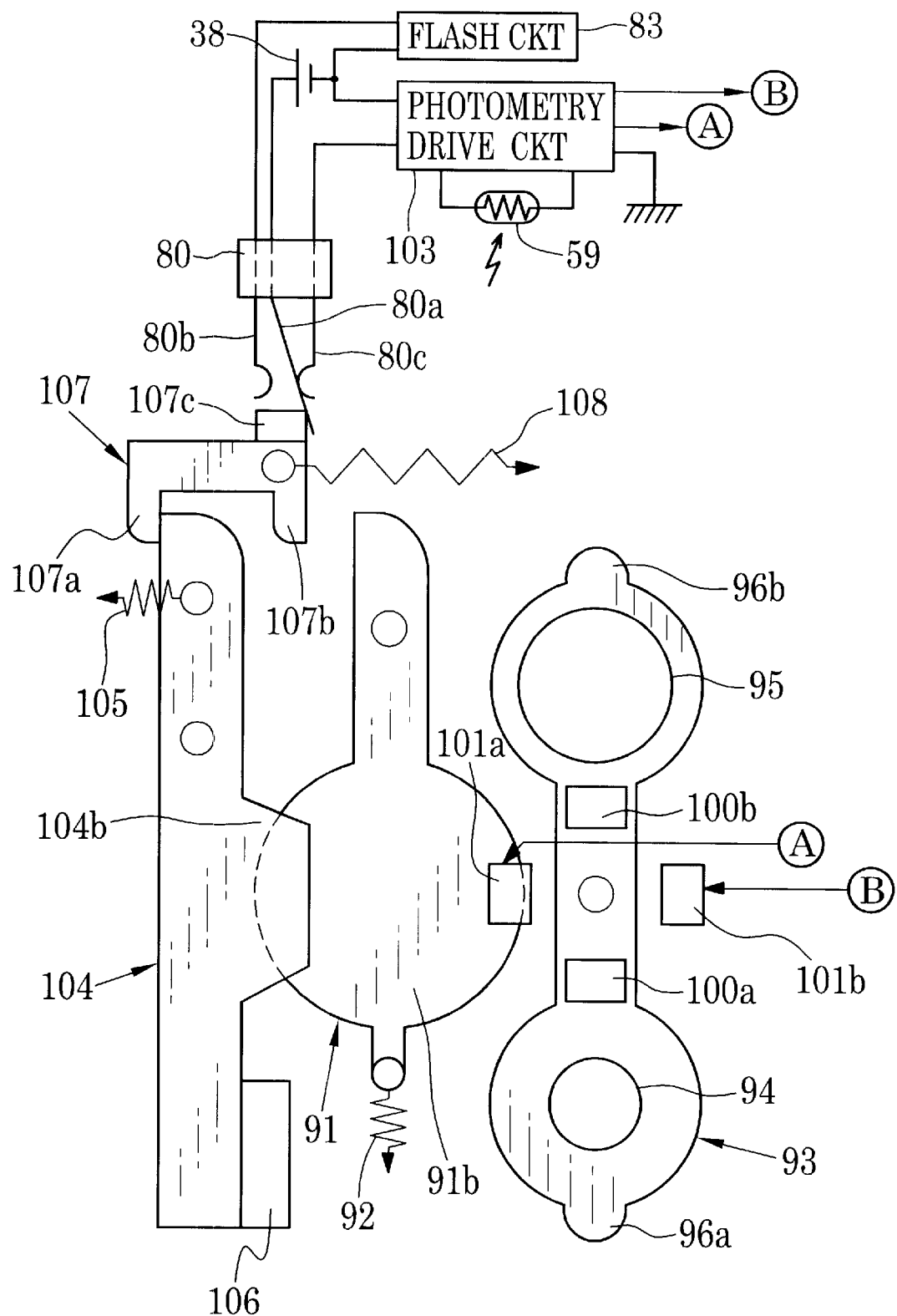
FIG. 22 is a front elevation illustrating a state of the shutter device of FIG. 19 after a releasing operation.

When the photo film winder mechanism 85 is actuated, the shutter drive plate 107 is slid to the left in the drawing against the tension spring 108. See FIG. 21. The switching projection 107c moves to a position left from the switch segment 80a of the two-way switch 80. The retention projection 107a is retained in the charged position left from the retention lever 104. When the shutter release button 17 is depressed, retention of the shutter drive plate 107 discontinues. The shutter drive plate 107 slides to the right. In FIG. 22, the shutter drive plate 107 is kept in the position where he retention projection 107a contacts the end of the retention lever 104. The switching projection 107c presses the switch segment 80a of the two-way switch 80. The switch segment 80a moves to the right and comes in contact with the photometric switch segment 80c. The photometric circuit 103 is turned on and operated.

When the photographic object has high brightness, the plate shifting solenoid 101b is energized. The stop changeover plate 93 makes a ¼ rotation in the clockwise direction to move to the second position. The small-diameter opening 94 is set in the light path. Then the drive projection 96a pushes the driven ridge 104b of the retention lever 104 to rotate the retention lever 104 in the clockwise direction. The shutter drive plate 107 is disengaged from the retention lever 104, and is caused by the tension spring 108 to slide to the right in the drawing.

Figure 23:
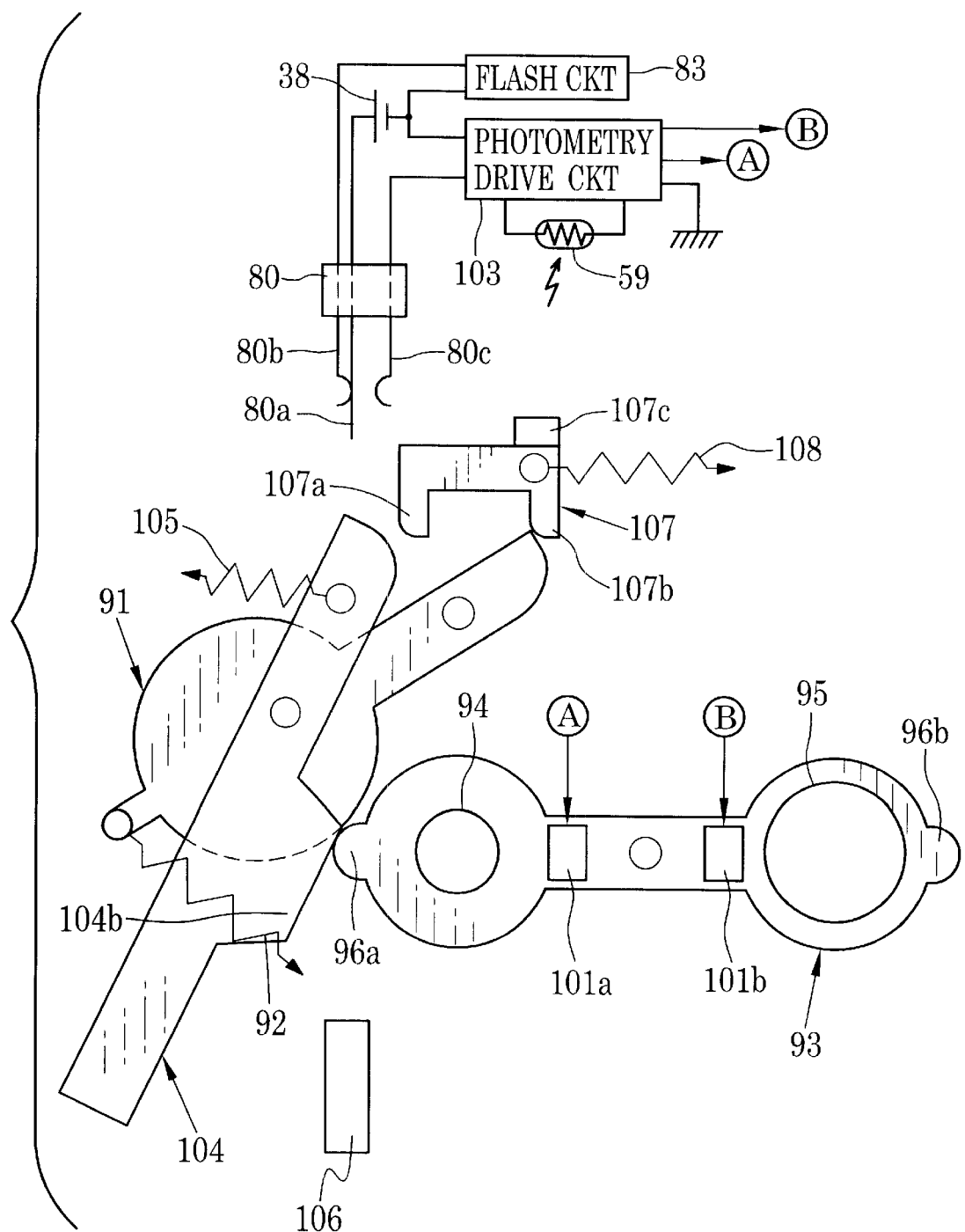
FIG. 23 is a front elevation illustrating a state of the shutter device in which an aperture stop is stopped down.
Figure 24:
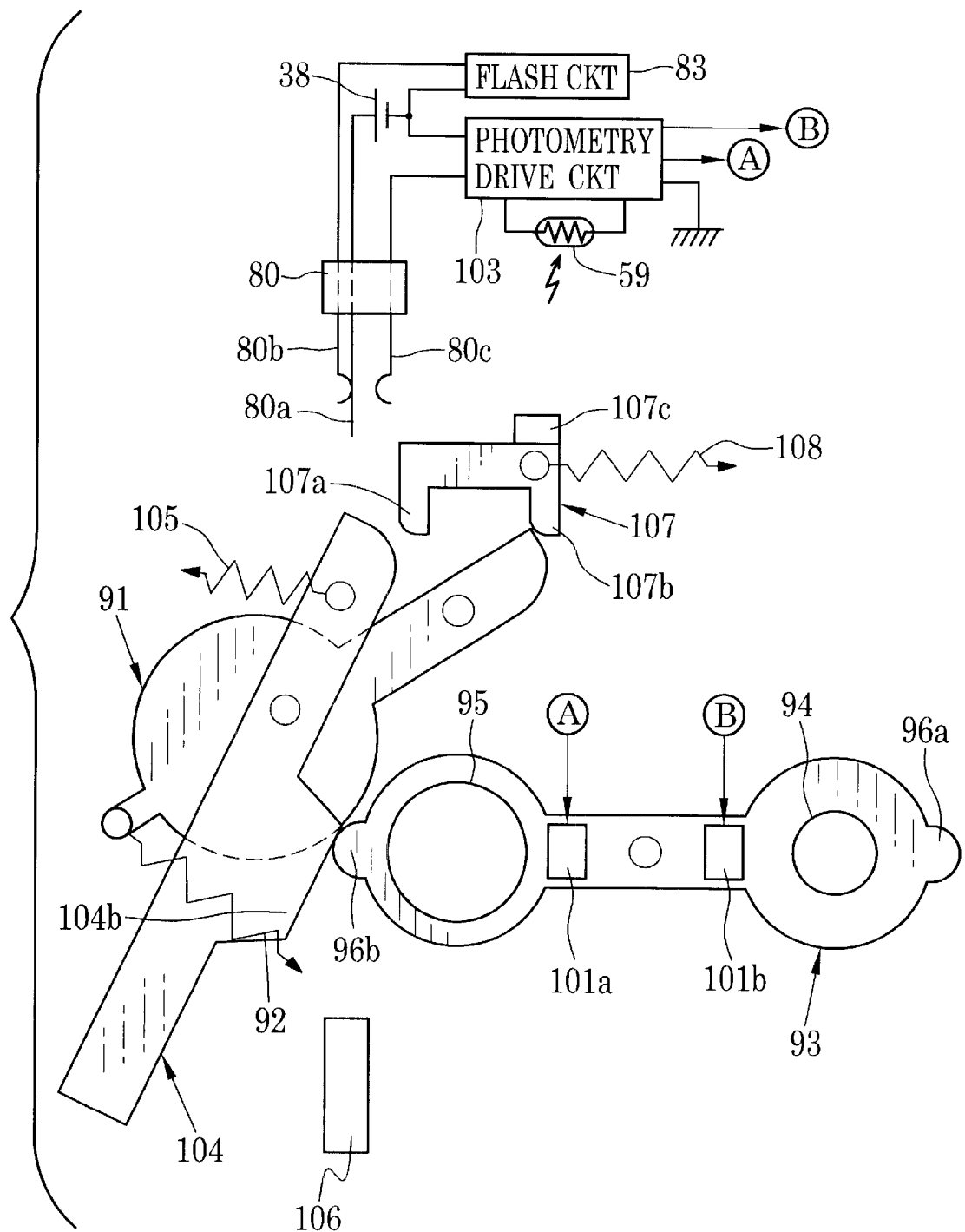
FIG. 24 is a front elevation illustrating a state of the shutter device in which the aperture stop is set open widely.

Then the knocker arm 107b knocks and swings the shutter blade 91 as illustrated in FIG. 23. An exposure is taken through the small-diameter opening 94. If the brightness of the object is low, the stop changeover plate 93 makes a ¼ rotation in the counterclockwise direction to the first position. Then the shutter blade 91 is knocked and swung in the manner similar to the operation of the high brightness. In FIG. 24, an exposure is taken through the large-diameter opening 95.

The photometric circuit 103 is constructed to keep each one solenoid or electromagnet energized for a prescribed time even after the switch segment 80a comes away from the photometric switch segment 80c. The stop changeover plate 93 is kept from moving during an exposure. In the present embodiment, the shutter drive plate 107 remains engaged with the retention lever 104 before the end of the shifting of the stop changeover plate 93. Accordingly, the stop changeover plate 93 can be shifted reliably.

In FIGS. 25–28, a preferred embodiment is depicted, in which a shutter drive plate rotates forwards and backwards. Elements similar to those in the lens-fitted photo film unit of FIGS. 1 and 2 are designated with identical reference numerals.

Figure 25:
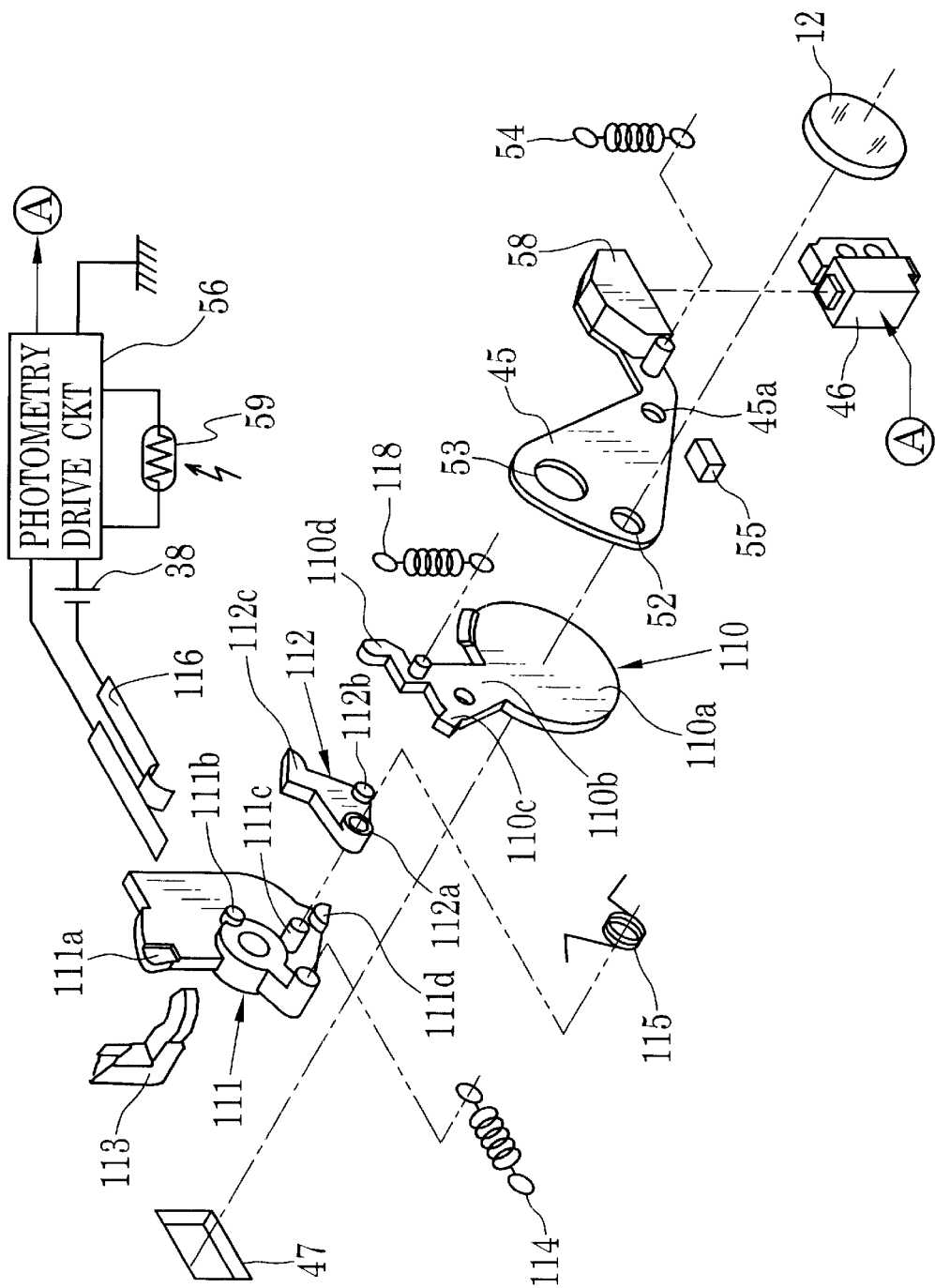
FIG. 25 is an exploded perspective illustrating another preferred shutter device in which a transmission member is connected to a shutter drive plate with a torsion coil spring.

In FIG. 25, the exposure unit is constituted by a shutter blade 110, a shutter drive plate 111, a transmission member 112, the stop changeover plate 45, the solenoid 46 and the like. There are a shutter lever 113, a shutter charging mechanism and a shutter releasing mechanism disposed on a top of the light-shielded tunnel 42. The shutter charging mechanism moves the shutter lever 113 to a charged position. The shutter releasing mechanism moves the shutter lever 113 to a released position.

The shutter blade 110 is constituted by a blade portion 110a and an axial portion 110b. An axial hole is formed in the axial portion 110b, about which the shutter blade 110 is rotatable. A driven projection 110c at an end of the axial portion 110b is knocked for an exposure. A switching projection 110d at an end of the axial portion 110b turns on the sync switch 40. The shutter blade 110 is biased by a tension spring 118 at the axial portion 110b, and set in the closed position where the blade portion 110a closes the light path.

The shutter drive plate 111 is disposed beside the shutter blade 110 and rotatable. A tension spring 114 biases the shutter drive plate 111 to keep a driven end 110a of the shutter drive plate 111 in a moving orbit of the shutter lever 113. When the shutter lever 113 moves, the driven end 110a is knocked by the shutter lever 113 to rotate the shutter drive plate 111 against the tension spring 114. The shutter drive plate 111 includes a pin 111b, a pivotal pin 111c and a stopper 111d. The pin 111b retains a torsion coil spring 115. The pivotal pin 111c is adapted to connection with the transmission member 112. The stopper hid limits movement of the transmission member 112.

The transmission member 112 is located between the shutter blade 110 and the shutter drive plate 111. A boss 112a in the transmission member 112 has a hole in which the pivotal pin 111c of the shutter drive plate 111 is inserted and supported in a rotatable manner. The torsion coil spring 115 is fitted about the boss 112a. In the transmission member 112, a pin 112b receives one end of the torsion coil spring 115, of which a remaining end is received by the pin 111b of the shutter drive plate 111. The bias of the torsion coil spring 115 keeps the transmission member 112 in contact with the stopper 111d. Also, a knocker arm 112c of the transmission member 112 knocks and swings the shutter blade 110.

The photometric circuit 56 is mounted on the printed circuit board 36 of FIG. 2 with the photo receptor element 59. A photometric switch 116 for turning on the photometric circuit 56 is disposed beside the shutter drive plate 111. When the shutter drive plate 111 rotates, a segment included in the photometric switch 116 is depressed to turn on the photometric switch 116. The photometric circuit 56 operates for measuring object brightness.

Figure 26:
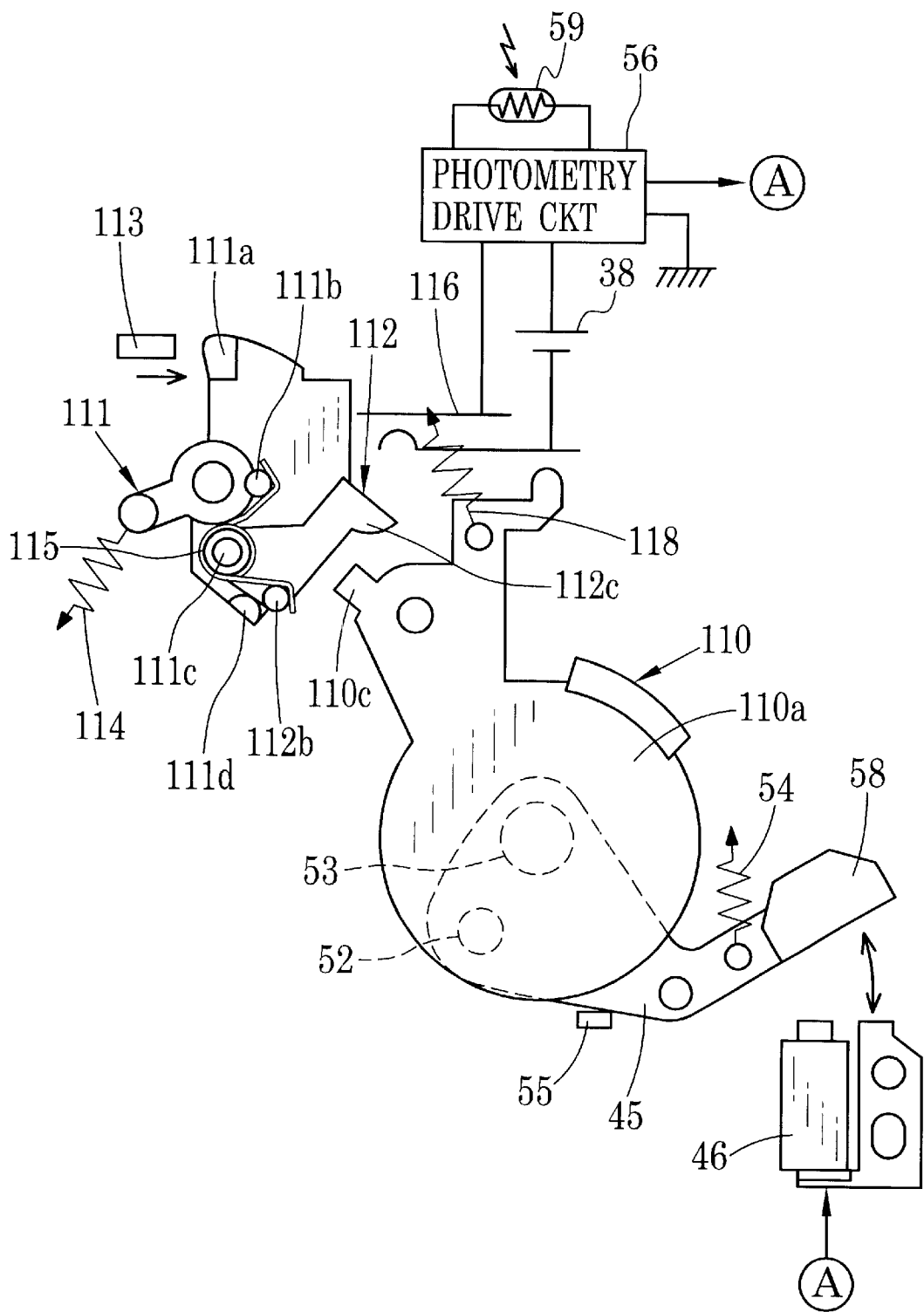
FIG. 26 is a front elevation illustrating a state of the shutter device in which the shutter drive plate rotates forwards.

FIG. 26 illustrates a state of the exposure unit at the time of shutter charging. In the shutter mechanism, the shutter lever 113 is retained in the charged position that lies to the left of the shutter drive plate 111. Also, the transmission member 112 is kept in contact with the stopper 111d by the bias of the torsion coil spring 115.

When the shutter release button 17 is depressed, the shutter mechanism is actuated to move the shutter lever 113. The shutter drive plate 111 is knocked by the shutter lever 113 and rotates forwards in the clockwise direction. This rotation charges the torsion coil spring 115, and causes the transmission member 112 to rotate clockwise together with the shutter drive plate 111.

When the transmission member 112 rotates, the knocker arm 112c comes in contact with the driven projection 110c of the shutter blade 110. The shutter blade 110 in the closed position cannot rotate in the counterclockwise direction as kept by a stopper of the light-shielded tunnel 42. The transmission member 112 rotates in the counterclockwise direction about the boss 112a to a small extent in a state with the knocker arm 112c engaged with the driven projection 110c. Rotation of the shutter drive plate 111 turns on the photometric switch 116 to operate the photometric circuit 56.

Figure 27:
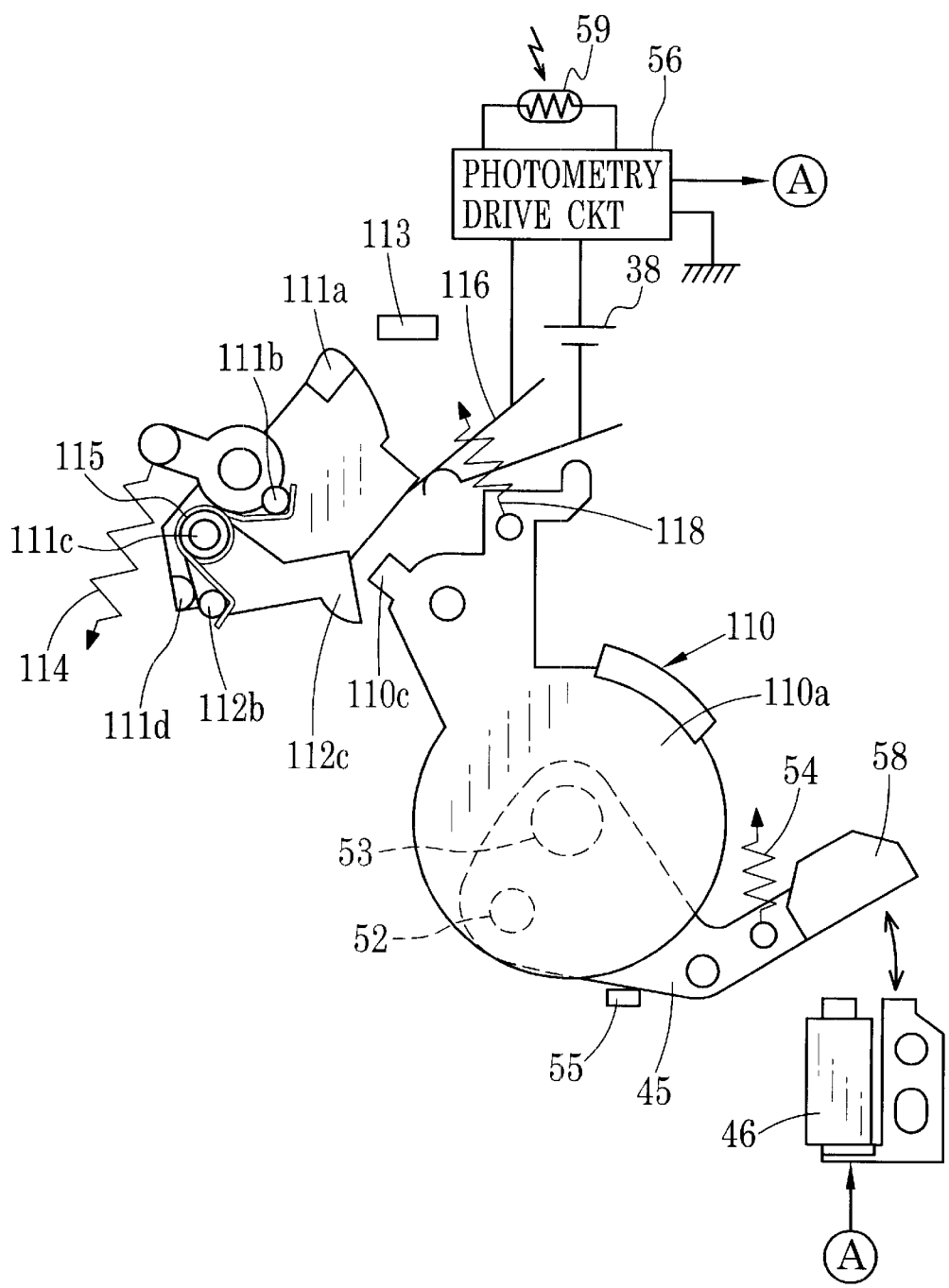
FIG. 27 is a front elevation illustrating a state of the shutter device at the end of the forward rotation of the shutter drive plate.

When the shutter drive plate 111 further rotates, the knocker arm 112c of the transmission member 112 becomes disengaged from the driven projection 110c of the shutter blade 110. The transmission member 112 is caused by the torsion coil spring 115 to rotate in the clockwise direction. In FIG. 27, the transmission member 112 is retained on the shutter drive plate 111 in contact with the stopper 111d.

Figure 28:
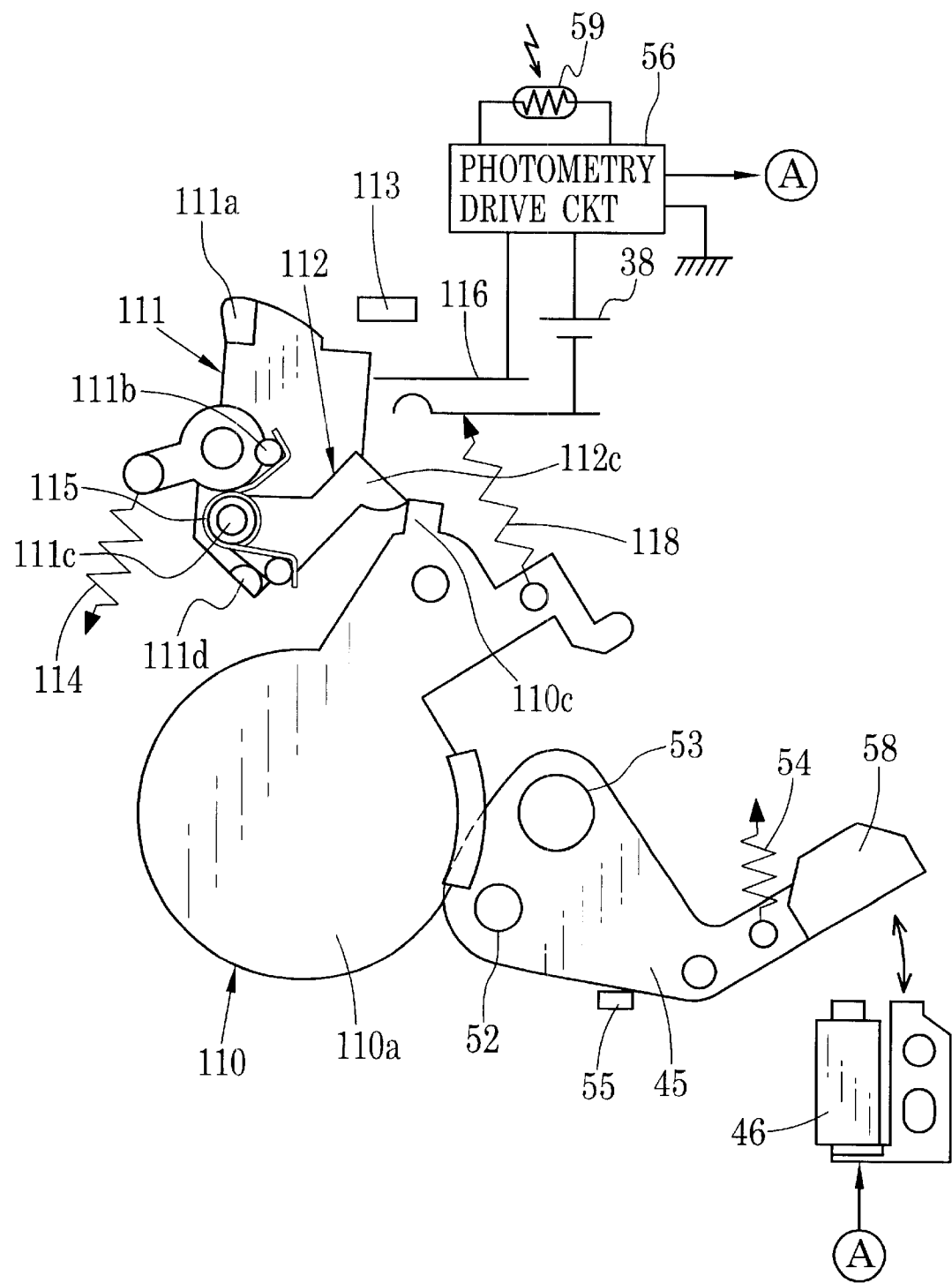
FIG. 28 is a front elevation illustrating a state of the shutter device during an exposure.

Upon rotation of the shutter drive plate 111 by a predetermined amount, the bias of the tension spring 114 becomes effective and stops rotation of the shutter drive plate 111. In FIG. 28, the shutter drive plate 111 is rotated back in the counterclockwise direction by the bias of the tension spring 114. At the same time, the transmission member 112 starts rotating back. In the back rotation, the knocker arm 112c knocks the driven projection 110c to rotate the shutter blade 110 in the clockwise direction.

If the object brightness is low, the photometric circuit 56 does not energize the solenoid 46. The stop changeover plate 45 is kept in the first position. An exposure is taken through the large-diameter opening 53 set in the photographic light path. If the object brightness is high, the photometric circuit 56 energizes the solenoid 46. The stop changeover plate 45 is set in the second position. An exposure is taken through the small-diameter opening 52 in the photographic light path.

After this, the shutter blade 110 is rotated by the tension spring 118 to the initial position, to complete one exposure. A shutter speed of the shutter device is fixed, for example is 1/60 sec.

Time of 10–20 msec is required before completion of changing the aperture stop after the photometric switch 116 is turned on. On the other hand, there is no knocking of the shutter blade 110 while the transmission member 112 moves back and forth. Thus, a time lag occurs with the back and forth movement of the transmission member 112 after the shutter releasing and before the start of an exposure. The time lag is adjusted and determined as required for shifting of the stop changeover plate 45 so as to take an exposure after completion of changing over the aperture stop.

In the present embodiment, the solenoid 46 is energized if the object brightness is high, to set the small-diameter opening 52 in the light path. Alternatively, the solenoid 46 may be constructed to be energized if the object brightness is low, to set the large-diameter opening 53 in the light path.

In the present embodiment, the stop changeover plate 45 with the small-diameter opening 52 and the large-diameter opening 53 is moved. Furthermore, it is possible for a stop changeover plate to have only the small-diameter opening 52. The aperture stop can be changed by setting the small-diameter opening 52 into or out of the light path.

In FIGS. 29–36, another preferred embodiment is depicted, in which a shutter drive lever is retained, and after changing the aperture stop, is enabled to move. Elements similar to those in the lens-fitted photo film unit of FIGS. 1 and 2 and the aperture stop changeover mechanism of FIG. 3 are designated with identical reference numerals.

Figure 29:
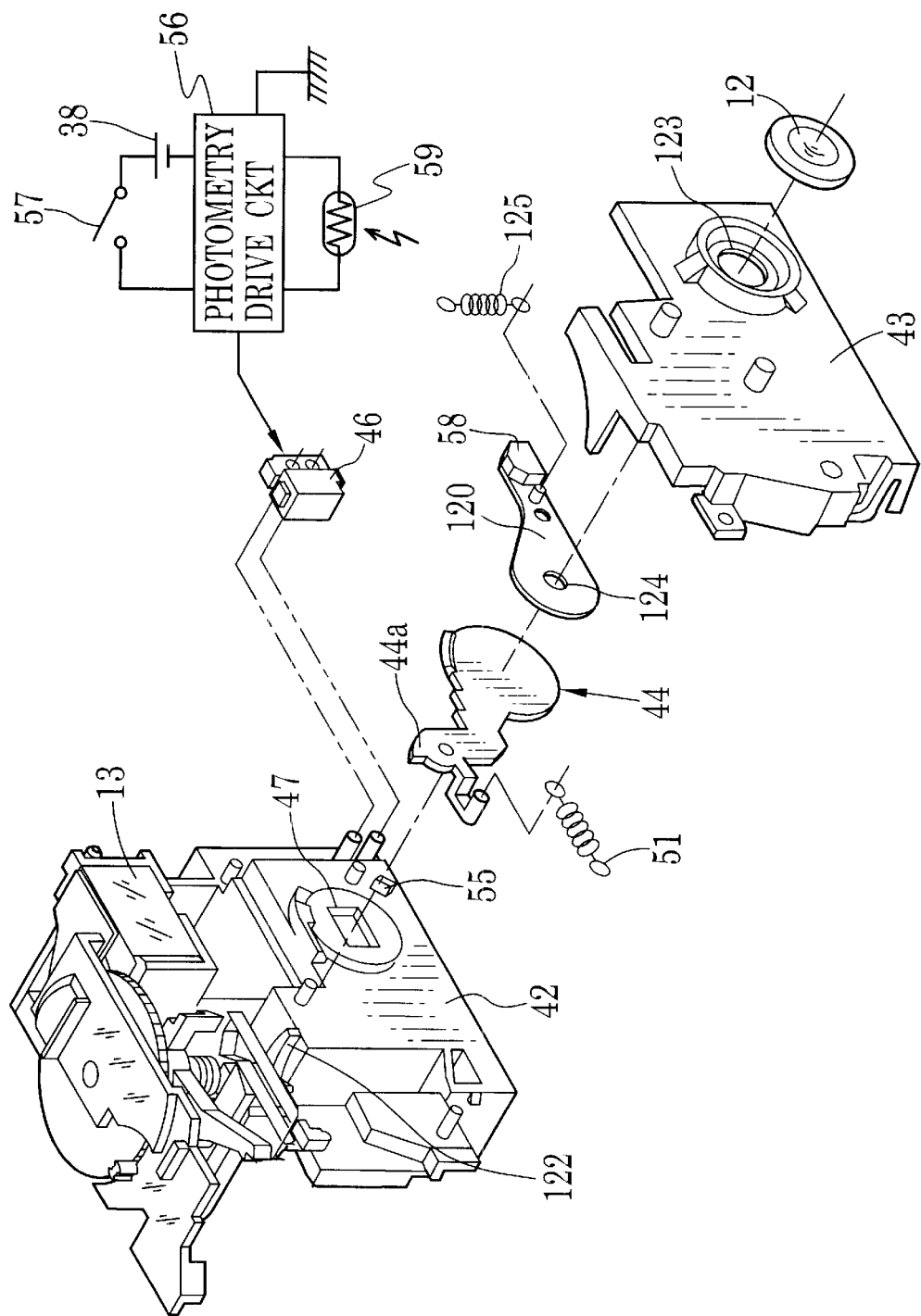
FIG. 29 is an exploded perspective illustrating another preferred exposure unit with a shutter device.

In FIG. 29, the exposure unit has the shutter blade 44, a stop changeover plate 120, the solenoid 46 and the shutter cover 43, all of which are supported on the light-shielded tunnel 42. The upside of the light-shielded tunnel 42 is provided with a shutter mechanism for charging a shutter drive lever 122, and the like. The shutter cover 43 has a lens barrel through which an exposure opening 123 is formed to define an aperture stop. The taking lens 12 is mounted in the lens barrel.

Figure 30A:
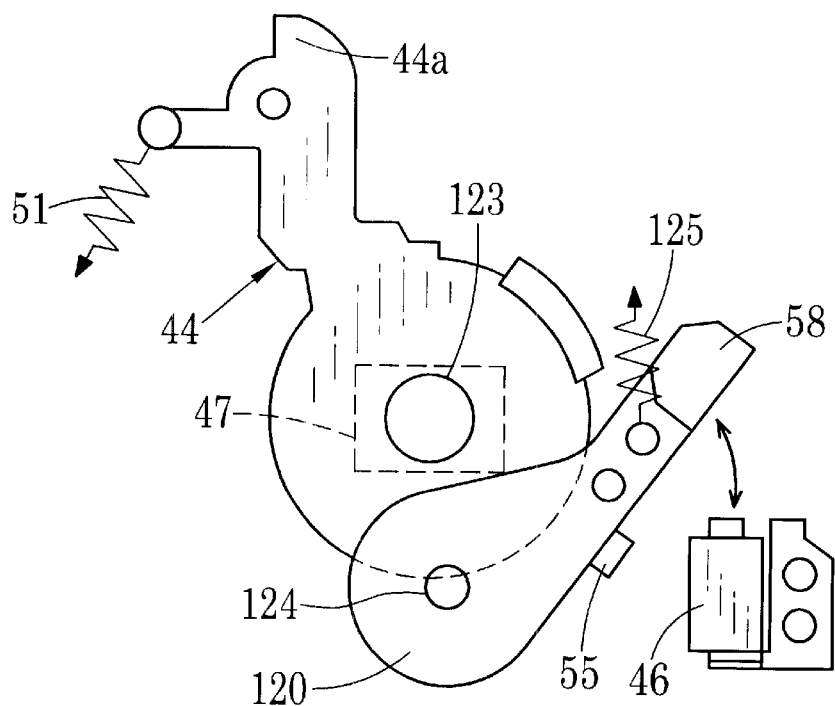
FIG. 30A is a front elevation illustrating a state of the exposure unit in which the aperture stop is fully open.
Figure 30B:
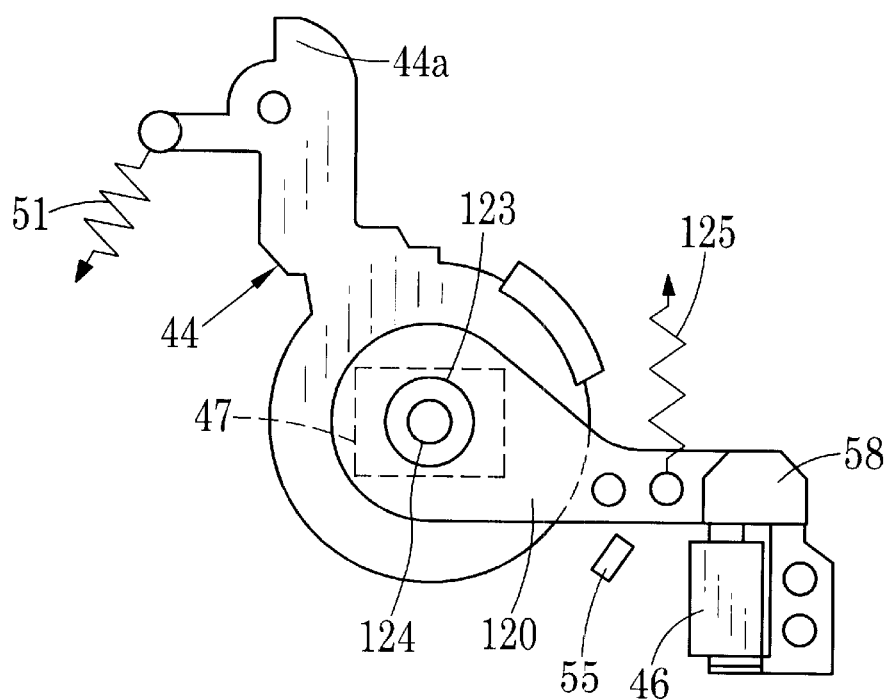
FIG. 30B is a front elevation illustrating a state of the exposure unit in which an aperture stop is stopped down.

The stop changeover plate 120 is disposed in front of the shutter blade 44, and kept rotatable by a pivotal pin projecting from the light-shielded tunnel 42. A small-diameter opening 124 is formed in the stop changeover plate 120, and has a smaller diameter than that of the exposure opening 123. In FIG. 30A, a tension spring 125 biases the stop changeover plate 120 to a first position away from the light path.

The photometric circuit 56 is connected with the solenoid 46 and measures light from a photographic object. The photometric circuit 56 is substantially the same as that depicted in FIG. 3. A photometric switch 126 is turned on to supply the photometric circuit 56 with power from the dry battery 38. If the object brightness is equal to or more than reference brightness, a current flows from the photometric circuit 56 to the solenoid 46. Attraction occurs between the solenoid 46 and the iron segment 58 to shift the stop changeover plate 120 to the second position illustrated in FIG. 30B. The small-diameter opening 124 is set in the light path, to reduce the light amount.

Figure 31:
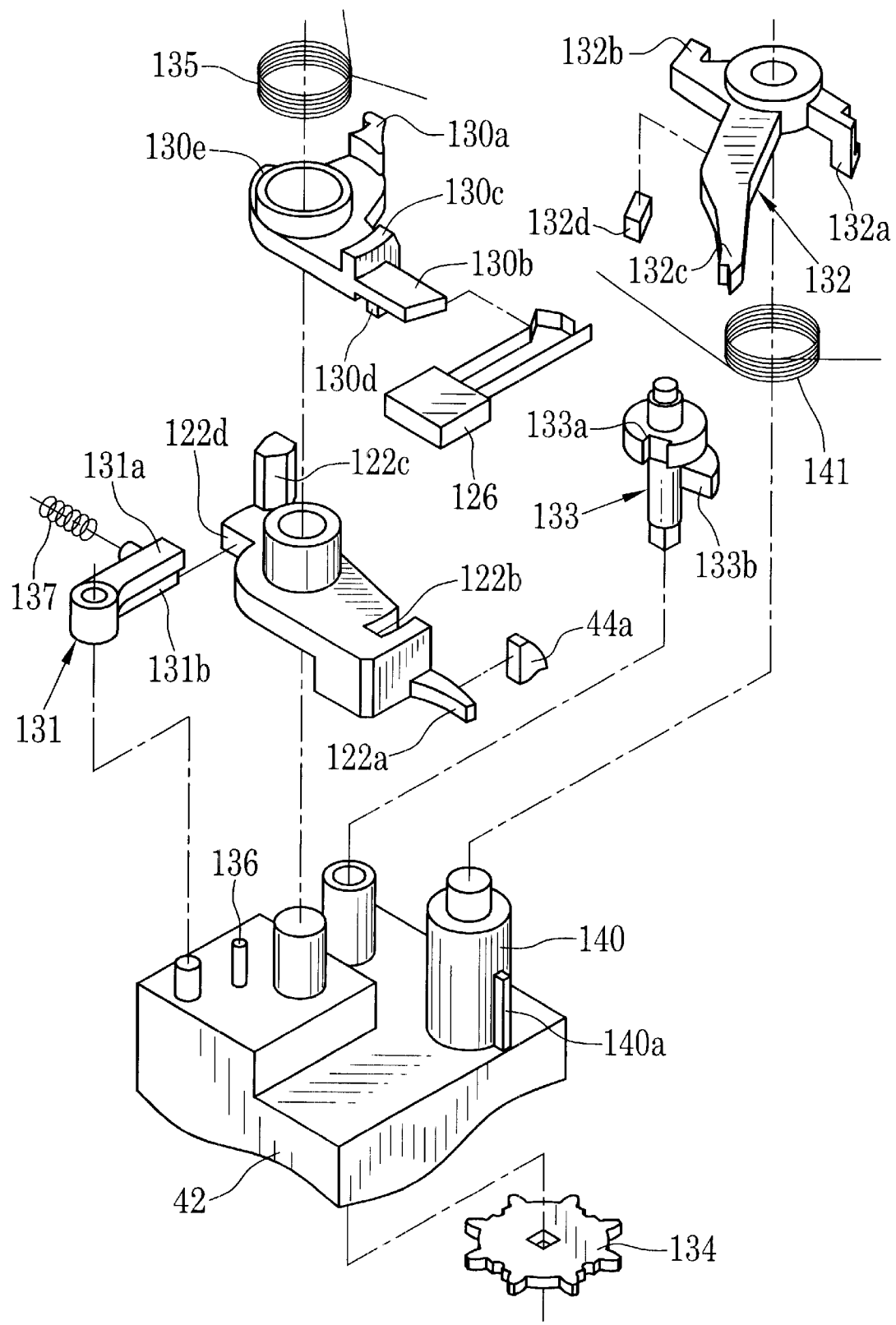
FIG. 31 is an exploded perspective illustrating a shutter device of the lens-fitted photo film unit of FIG. 29.

In FIG. 31, a shutter mechanism is illustrated, and includes the shutter drive lever 122, an enabling lever 130, a stop lever 131, a release lever or retention lever 132 and a cam member 133, all of which are disposed on the top of the light-shielded tunnel 42 in a rotatable manner.

The cam member 133 include a disk portion and a cam portion 133b. In the disk portion, a lock notch 133a is formed for locking the retention lever 132. The cam portion 133b has a sector shape and contacts the shutter drive lever 122. A sprocket wheel 134 is disposed inside the light-shielded tunnel 42, and connected with a pivotal pin of the cam member 133. As the perforations 27a in the photo film 27 (See FIG. 2) are meshed with teeth of the sprocket wheel 134, the cam member 133 and the sprocket wheel 134 are rotated by movement of the photo film 27 upon rotation of the winder wheel 22.

The shutter drive lever 122 is constituted by a knocker arm 122a, a cutout 122b, a pin 122c and a cam surface 122d. The knocker arm 122a knocks and swings the shutter blade 44. The cutout 122b is engageable with the enabling lever 130. The cam surface 122d contacts the stop lever 131. Torsion coil springs 135 and 141 include respective ends supported on the pin 122c. The shutter drive lever 122 is moved to the charged position by shutter charging operation, and to the released position by shutter releasing operation. In the rotational orbit of the knocker arm 122a, the driven projection 44a of the shutter blade 44 is disposed. The shutter blade 44 is knocked while the shutter drive lever 122 moves from the charged position to the released position.

The enabling lever 130 is constituted by a cam follower hook 130a, a switching projection 130b, an upper projection 130c, a lower projection 130d and an enabling ridge 130e, and is supported by a shaft common with the shutter drive lever 122. The torsion coil spring 135 is fitted on a top of the enabling lever 130, and has one end fitted on the cam follower hook 130a, and a remaining end fitted on the pin 122c of the shutter drive lever 122. The cam follower hook 130a contacts the cam portion 133b. When the cam member 133 rotates, the cam follower hook 130a is pushed by the cam portion 133b to rotate the enabling lever 130.

The lower projection 130d of the enabling lever 130 is under the switching projection 130b, and enters the cutout 122b in the shutter drive lever 122. One of two segments of the photometric switch 126 is located in a rotational orbit of the switching projection 130b. When the enabling lever 130 rotates, the switching projection 130b turns on the photometric switch 126 to power the photometric circuit 56. Also, a stopper 136 is formed with the light-shielded tunnel 42 to limit a rotational range of the enabling lever 130.

The stop lever 131 includes an upper lever portion 131a and a lower lever portion 131b. The upper lever portion 131a contacts the enabling ridge 130e of the enabling lever 130. The lower lever portion 131b contacts the cam surface 122d of the shutter drive lever 122. The stop lever 131 is rotatable between an engaged position and a disengaged position. When the stop lever 131 is in the engaged position, the lower lever portion 131b comes into a rotational orbit of the cam surface 122d of the shutter drive lever 122 to keep the shutter drive lever 122 in the charged position. When the stop lever 131 is in the disengaged position, the lower lever portion 131b comes out of the rotational orbit of the cam surface 122d to allow the shutter drive lever 122 to move toward the released position. A compression spring 137 is secured to an end of the stop lever 131, and biases the same toward the engaged position.

The retention lever 132 is a combination of elements including a driven claw 132a, a lock claw 132b, a blocking claw 132c and a retention projection 132d. A pivotal pin 140 projects from the light-shielded tunnel 42 and supports the retention lever 132. The torsion coil spring 141 is disposed under the retention lever 132. A support projection 140a is formed with the pivotal pin 140, and supports the torsion coil spring 141. The torsion coil spring 141 has one end fitted on the driven claw 132a and a remaining end fitted on the pin 122c of the shutter drive lever 122.

The lock claw 132b of the retention lever 132 enters the lock notch 133a at the time of shutter charging, and retained. The blocking claw 132c becomes engaged with teeth about the winder wheel 22, and blocks rotation of the winder wheel 22. The retention projection 132d is formed on an underside of the retention lever 132, becomes engaged with the upper projection 130c of the enabling lever 130 upon the shutter charging, and blocks rotation of the enabling lever 130.

Figure 32:
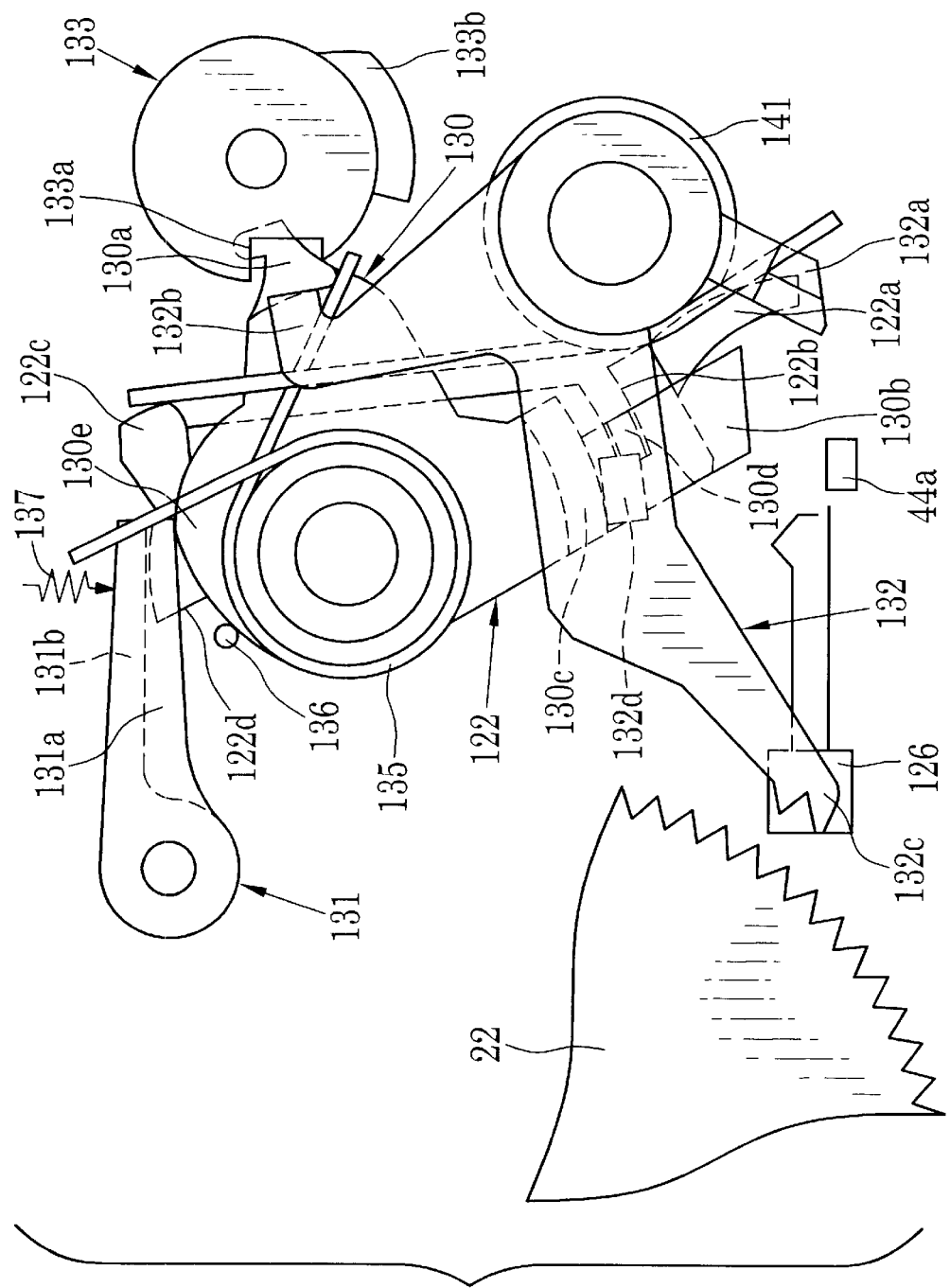
FIG. 32 is a top plan illustrating a state of the shutter device before a charging operation.

FIG. 32 illustrates the shutter device before the shutter charging. The enabling lever 130 is biased by the torsion coil spring 135 and retained in a state with the enabling ridge 130e contacted by the stopper 136. In the shutter drive lever 122, the lower projection 130d of the enabling lever 130 enters the cutout 122b. The enabling lever 130 retains the shutter drive lever 122. The retention lever 132 is retained with the retention projection 132d contacted by the upper projection 130c of the enabling lever 130. Also, the stop lever 131 is retained in the disengaged position with the upper lever portion 131a contacted by the enabling ridge 130e of the enabling lever 130.

Figure 33:
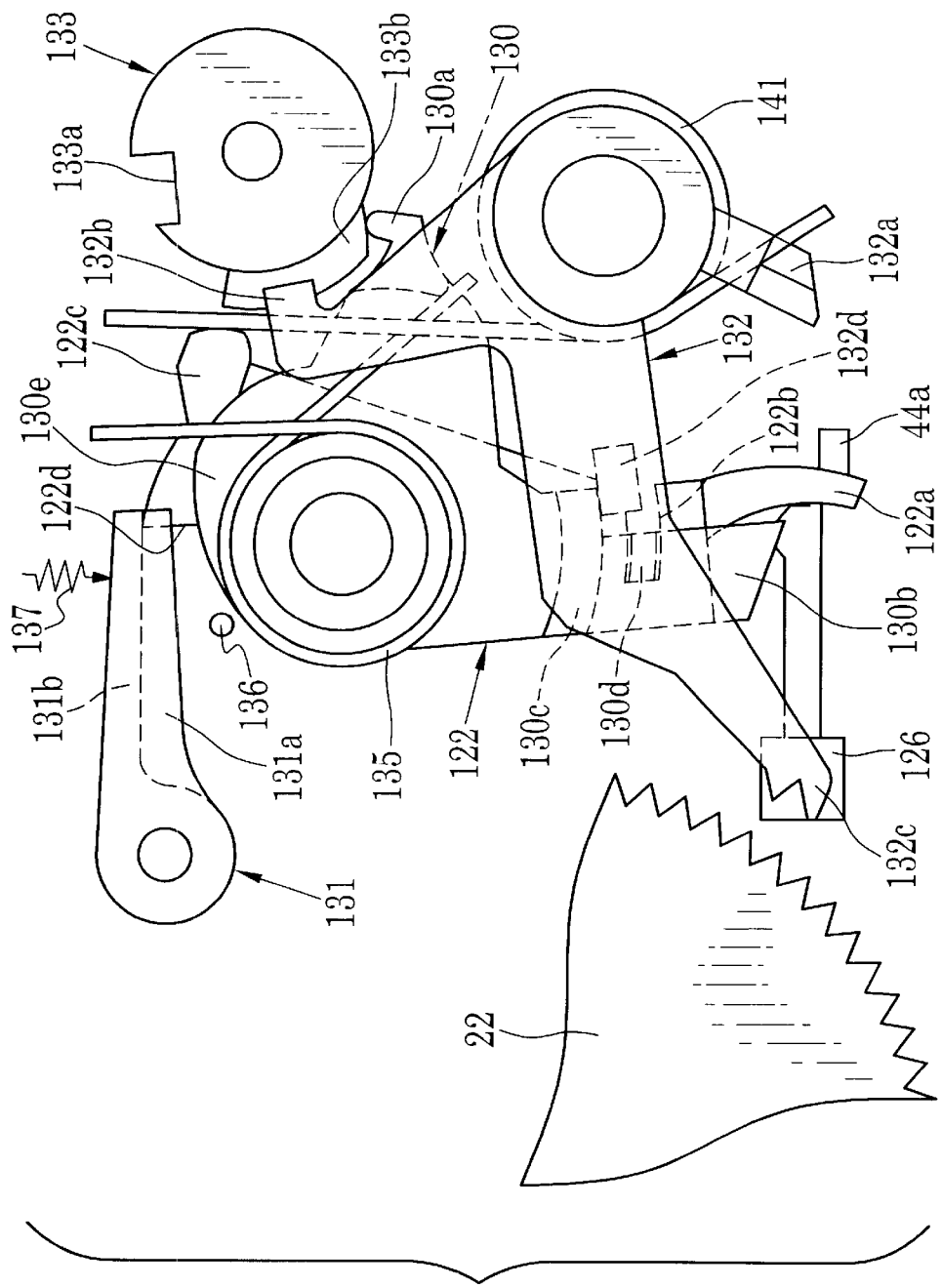
FIG. 33 is a top plan illustrating a state of the shutter device during the charging operation.

When the winder wheel 22 is rotated, the cam member 133 rotates in the counterclockwise direction with the sprocket wheel 134. In FIG. 33, the cam portion 133b comes in contact with the cam follower hook 130a of the enabling lever 130, which makes a clockwise rotation against the torsion coil spring 135. Furthermore, the lower projection 130d pushes the cutout 122b of the shutter drive lever 122, so the shutter drive lever 122 makes a clockwise rotation against the torsion coil spring 141. The retention lever 132 does not move, as the retention projection 132d is in contact with the upper projection 130c of the enabling lever 130.

Figure 34:
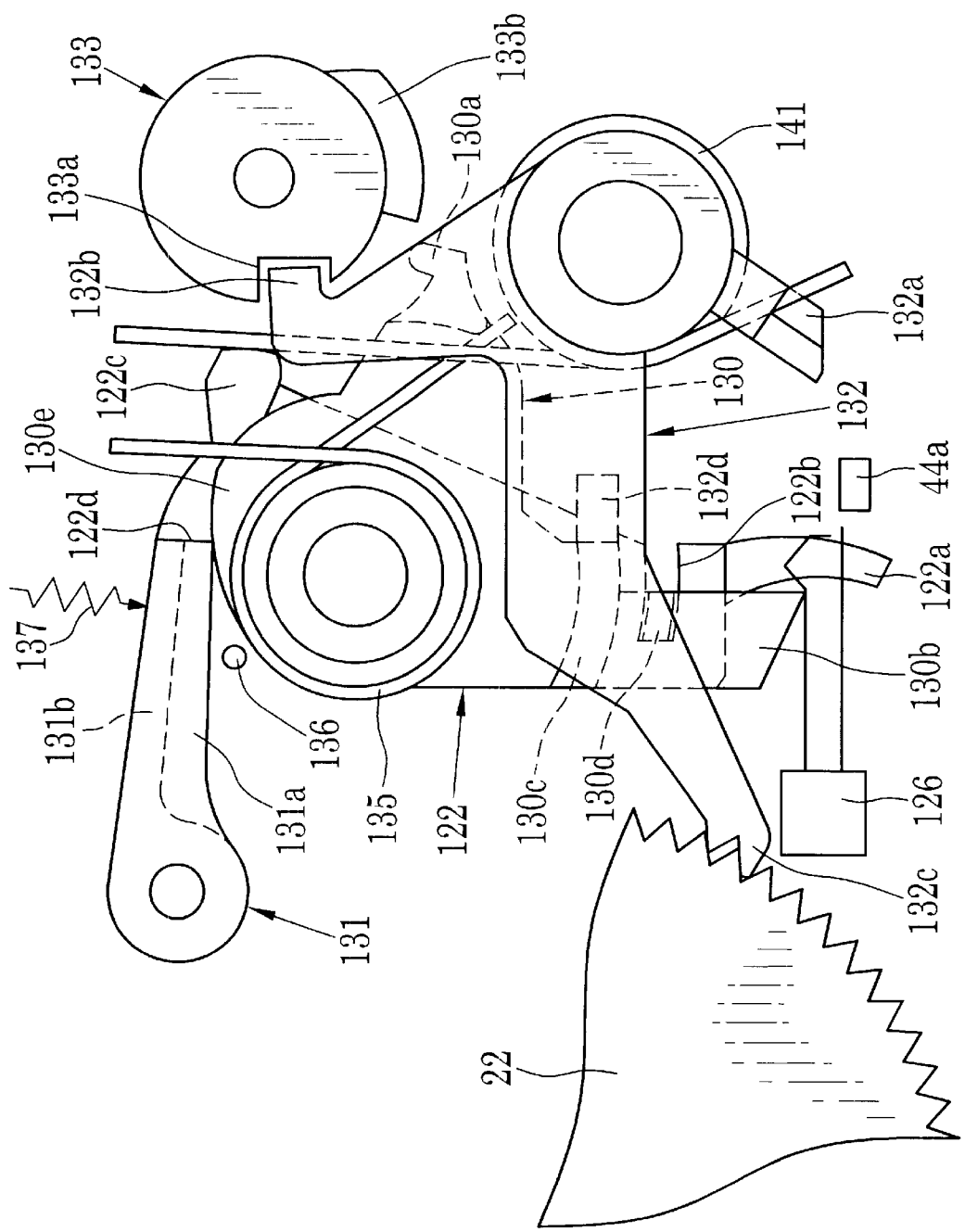
FIG. 34 is a top plan illustrating a state of the shutter device after the charging operation.

The winder wheel 22 further rotates, to move the shutter drive lever 122 to the charged position. The upper projection 130c of the enabling lever 130 comes away from a rotational orbit of the retention projection 132d of the retention lever 132, which is caused by the torsion coil spring 141 to make a clockwise rotation. In FIG. 34, the lock claw 132b of the retention lever 132 enters the lock notch 133a. The blocking claw 132c becomes engaged with teeth about the winder wheel 22. So the retention lever 132 becomes locked.

Then the stop lever 131 comes to the engaged position. The lower lever portion 131b comes in contact with the cam surface 122d, to block rotation of the shutter drive lever 122. As the retention lever 132 has rotated, the retention projection 132d comes in the rotational orbit of the upper projection 130c of the enabling lever 130 to block rotation of the enabling lever 130. Now the shutter device is charged completely in the state where the shutter drive lever 122 is kept in the charged position.

Figure 35:
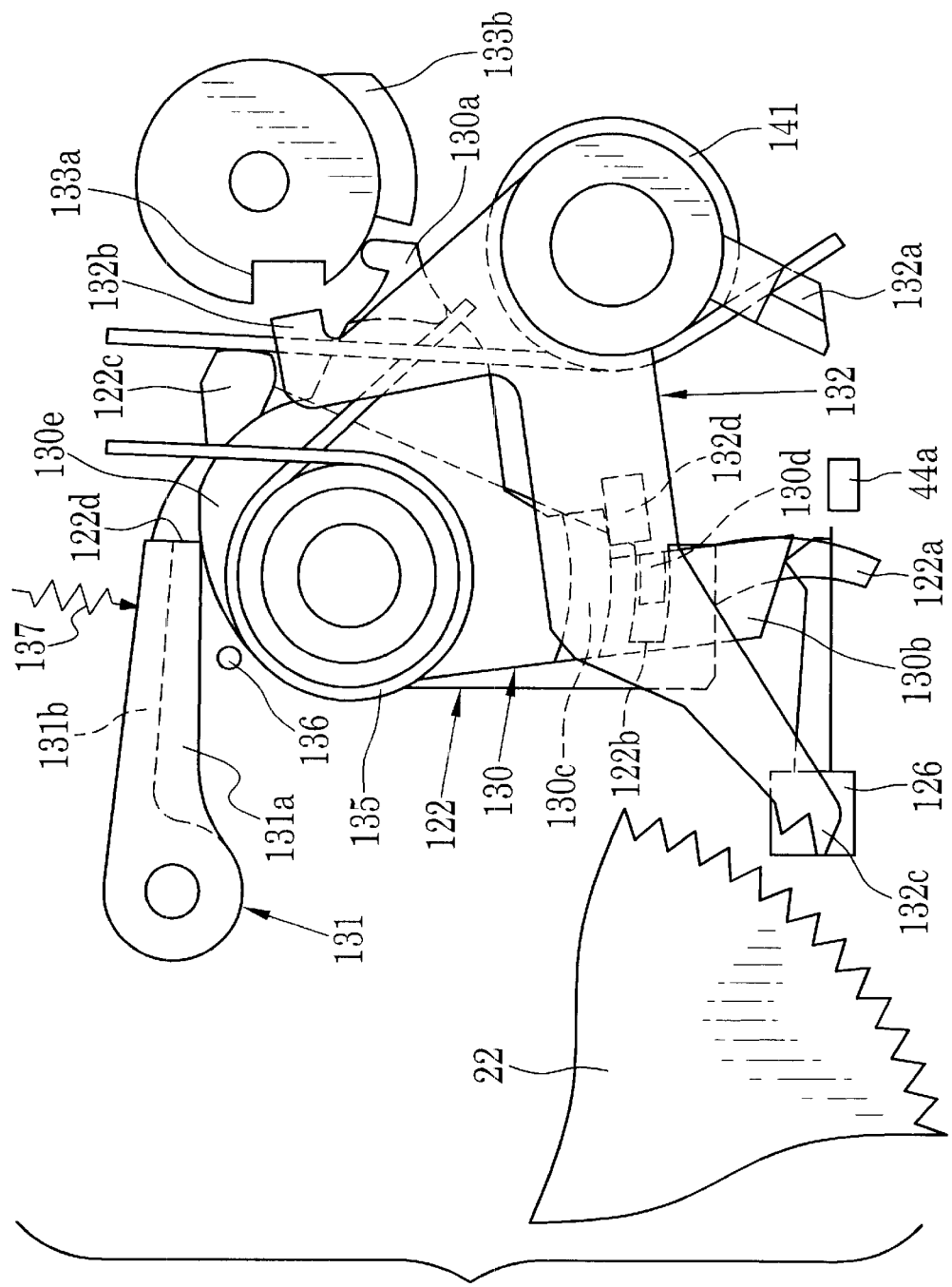
FIG. 35 is a top plan illustrating a state of the shutter device after the releasing operation.

When the shutter release button 17 is depressed in the state with the shutter mechanism charged, a projection (not shown) formed with the shutter release button 17 depresses the driven claw 132a of the retention lever 132. In FIG. 35, the retention lever 132 makes a counterclockwise rotation against the torsion coil spring 141. The retention projection 132d of the retention lever 132 is disengaged from the lower projection 130d of the enabling lever 130. The enabling lever 130 is caused by the torsion coil spring 135 to start a counterclockwise rotation.

When the enabling lever 130 rotates, the switching projection 130b pushes a segment of the photometric switch 126, which is turned on to operate the photometric circuit 56. As the enabling ridge 130e rotates in pushing the upper lever portion 131a, the stop lever 131 starts rotating from the engaged position to the disengaged position against the compression spring 137. The shutter drive lever 122 is kept in the charged position, as the cam surface 122d contacts the lower lever portion 131b of the stop lever 131.

Figure 36:
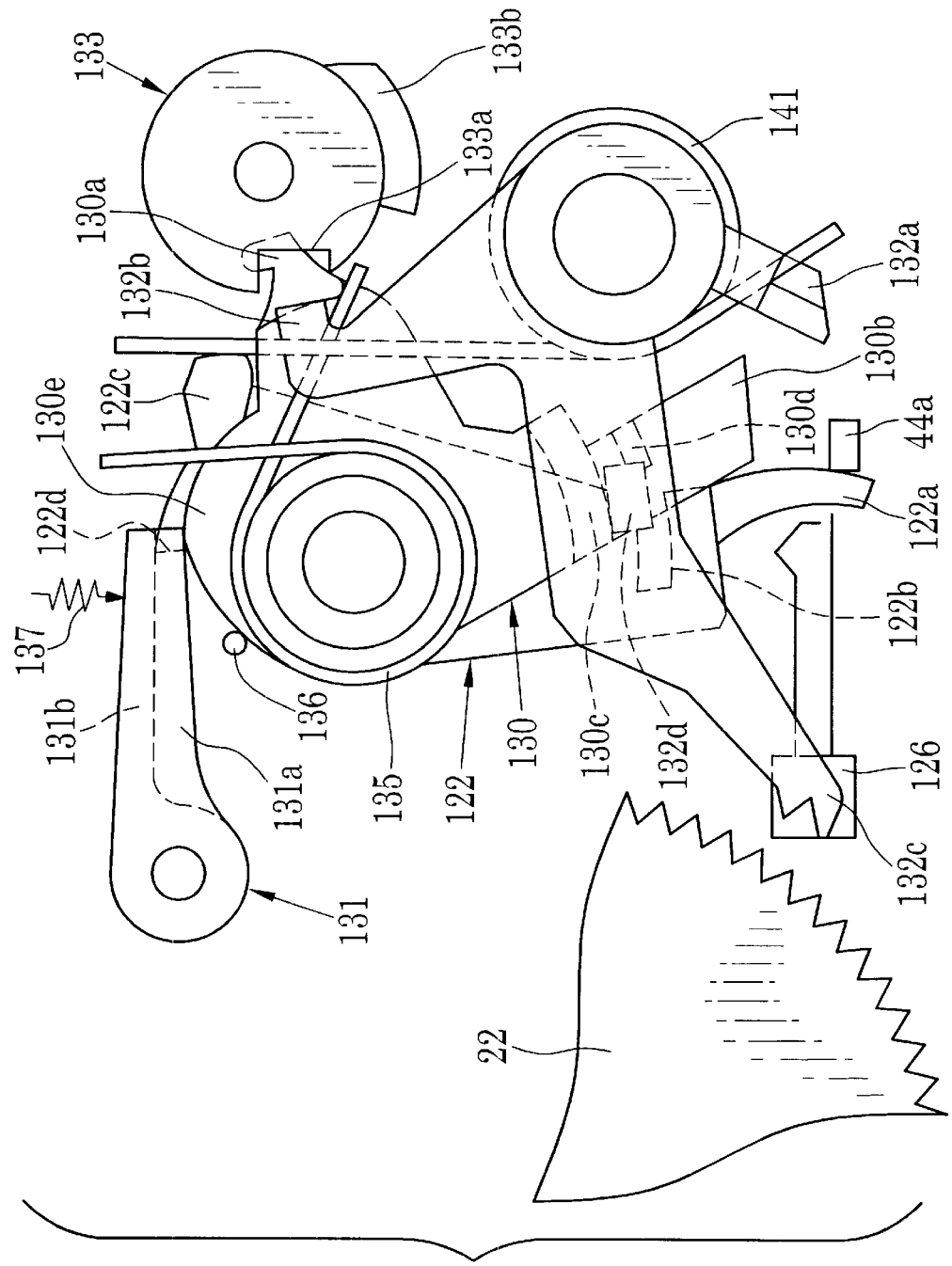
FIG. 36 is a top plan illustrating a state of the shutter device during an exposure.

When the enabling lever 130 rotates at a predetermined amount, the stop lever 131 comes to the disengaged position. The lower lever portion 131b is disengaged from the cam surface 122d of the shutter drive lever 122. It is to be noted that the torsion coil spring 141 has higher biasing force than that of the torsion coil spring 135. The shutter drive lever 122 is started by the torsion coil spring 141 to move from the charged position to the released position. In FIG. 36, the movement of the shutter drive lever 122 causes the knocker arm 122a to knock away the driven projection 44a of the shutter blade 44. An exposure is taken.

In the present embodiment, there occurs a time lag for rotation of the enabling lever 130 at a predetermined amount after turning on of the photometric switch 126 and before an exposure. Therefore, the strength and local shape of the torsion coil spring 135 can be optimized to determine the time lag as approximately 10 msec that is required for shifting of the stop changeover plate 45. This is effective in taking an exposure only after reliably changing over the aperture stop.

In the present embodiment, it is unnecessary to depress the shutter release button halfway. Thus, the aperture stop can be changed over without complicated operation. The photometric switch 126 is turned on only while the enabling lever 130 is moved. This is effective in preventing wasteful use of the battery.

In the present embodiment, the small-diameter opening 124 is set in the light path if the object brightness is high. Alternatively, the small-diameter opening 124 can be positioned in the light path (second position) while the shutter device is not actuated and may be set away from the light path if the object brightness is low. In the above embodiment, the stop changeover plate 120 has only the small-diameter opening 124. Furthermore, small-diameter and large-diameter openings may be formed in a stop changeover plate. The aperture stop can be changed over by setting either one of the openings in the light path according to the object brightness.

In FIGS. 37–41, another preferred embodiment is depicted, in which a shutter drive lever is kept in the charged position with an electromagnetic structure. Elements similar to those in the lens-fitted photo film unit of FIGS. 1 and 2 are designated with identical reference numerals.

Figure 37:
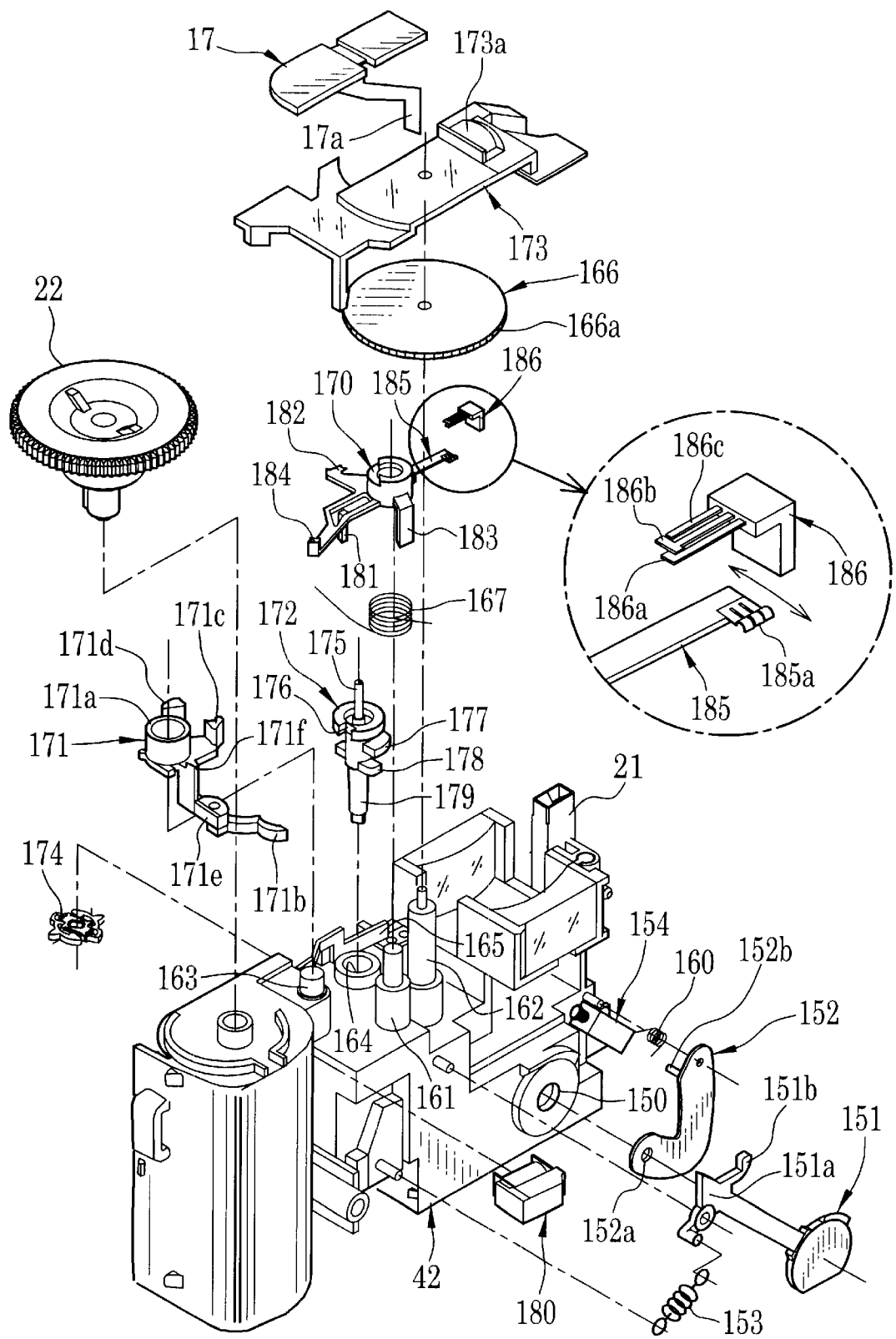
FIG. 37 is an exploded perspective illustrating another preferred shutter device in a lens-fitted photo film unit in which a shutter drive lever is retained electromagnetically.

In FIG. 37, an exposure unit is illustrated. A shutter opening 150 is formed in a front wall of the light-shielded tunnel 42. A shutter blade 151 and a stop changeover plate 152 are disposed in front of the shutter opening 150. The shutter cover 43 of FIG. 3 is secured to the front of the shutter blade 151, and contains the taking lens 12 and has the exposure opening 123 depicted in FIG. 29.

The shutter blade 151 is rotatable between a closed position to close the shutter opening 150 and an open position to open the same. A tension spring 153 biases the shutter blade 151 to the closed position. A switching projection 151b projects from the shutter blade 151, and pushes and turns on the sync switch 40 illustrated in FIG. 2.

A small-diameter opening 152a is formed in the stop changeover plate 152 and has a diameter smaller than that of the exposure opening 123. The stop changeover plate 152 is rotatable, and when in the insertion position, sets the small-diameter opening 152a in the light path, and when in the retracted position, sets the small-diameter opening 152a away from the light path. A plate shifting solenoid 154 drives the stop changeover plate 152.

Figure 38A:
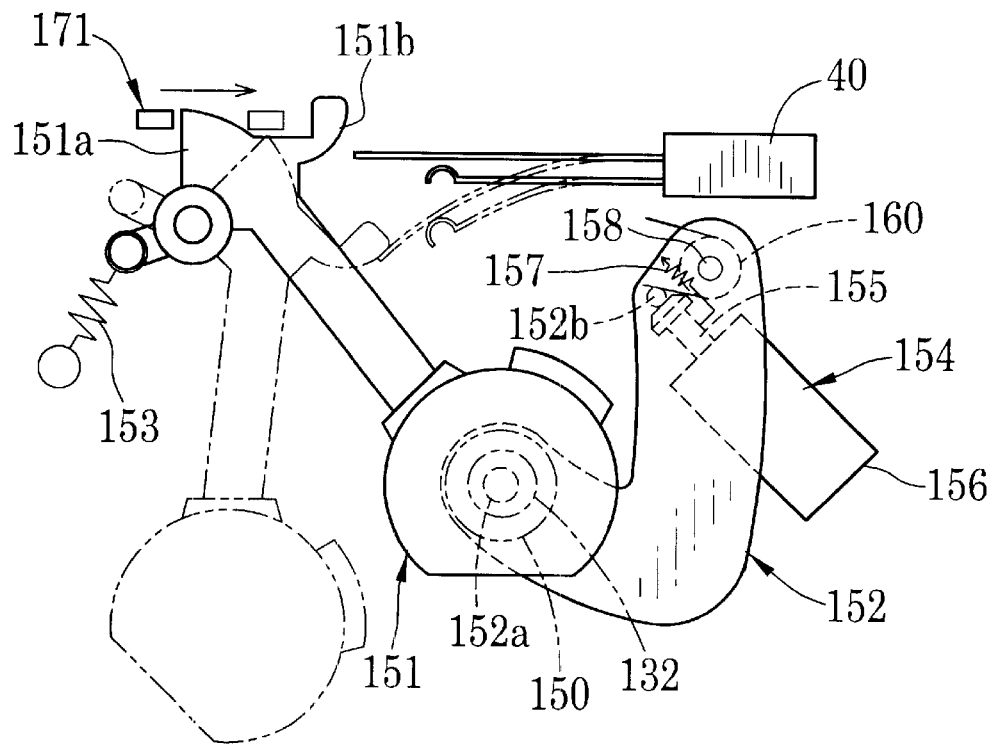
FIG. 38A is a front elevation illustrating a state of the shutter device in which an aperture stop is stopped down.

In FIG. 38A, the plate shifting solenoid 154 is constituted by a plunger or core 155 of iron, a coil (not shown) and a solenoid body 156 for accommodating those. The plate shifting solenoid 154 is a push-pull type in which the plunger 155 moves in an axial direction upon turning on and off a supply of power to the coil.

Before the plate shifting solenoid 154 is energized, a tension spring 157 causes the plunger 155 to project from the solenoid body 156 and to push a driven pin 152b behind the stop changeover plate 152. The stop changeover plate 152 is kept in the insertion position. In contrast, if the plate shifting solenoid 154 is energized, the plunger 155 is drawn back into the solenoid body 156. The driven pin 152b is released from pressure of the plunger 155.

Figure 38B:
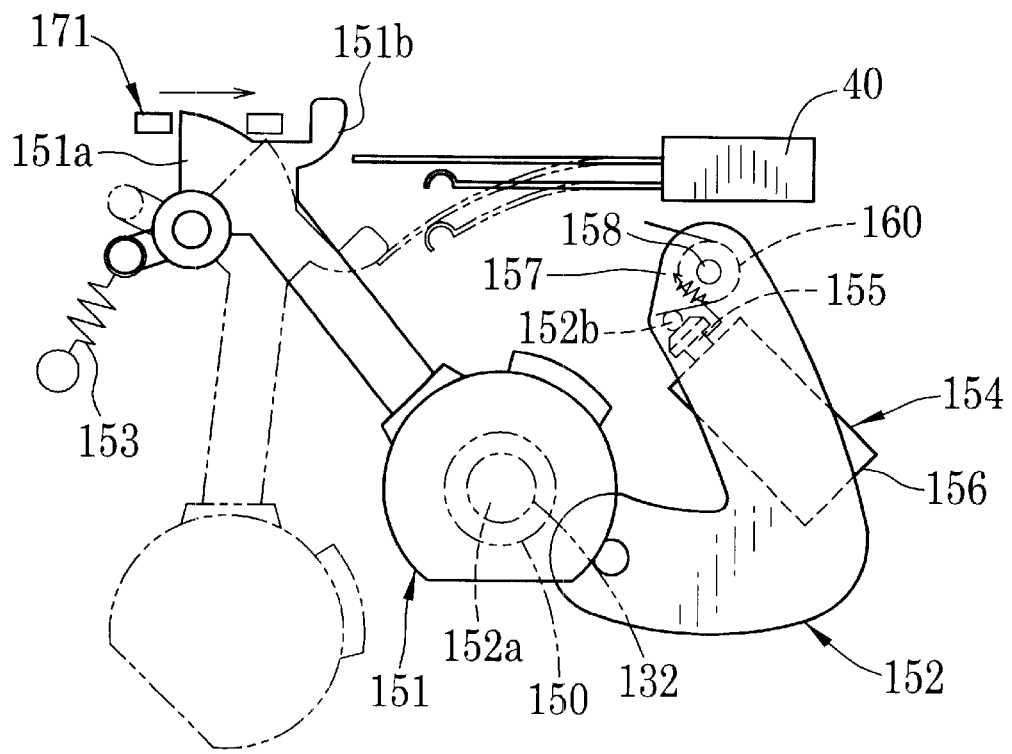
FIG. 38B is a front elevation illustrating a state of the shutter device in which the aperture stop is fully open.

A pin 158 projects from the light-shielded tunnel 42. A torsion coil spring 160 is secured to the pin 158, and has biasing force smaller than that of the tension spring 157. In FIG. 38B, the driven pin 152b is released from being pushed by the plunger 155. The bias of the torsion coil spring 160 rotates the stop changeover plate 152 toward the retracted position. The shutter opening 150 moves away from the light path to set the exposure opening 123 without being stopped down.

In FIG. 37, an upside of the light-shielded tunnel 42 has pivotal pins 161, 162 and 163 and a boss 164. A spring plate 165 of metal is secured to the light-shielded tunnel 42. A counter disk 166 is supported on the pivotal pin 161. A torsion coil spring 167 and a retention lever 170 are supported on the pivotal pin 162. A shutter drive lever 171 is supported on the pivotal pin 163. Also, a cam member 172 is inserted in a hole at the boss 164.

An upper plate 173 covers the counter disk 166, is formed from transparent plastic material, supports an upper end of the pivotal pin 162 and that of the cam member 172. A lens portion 173a is included in the upper plate 173, and magnifies at least one of numerals included in a scale formed on an upper face of the counter disk 166.

The hole at the spring plate 165 comes through in the downward direction. A lower end of the cam member 172 protrudes down from the spring plate 165. A sprocket wheel 174 is engaged with a lower end of the cam member 172, and has peripheral teeth meshed with the perforations 27a of the photo film 27. The sprocket wheel 174 is caused to make one counterclockwise rotation by movement of the photo film 27 for feeding.

The cam member 172 is a combination of elements including a toothed shaft 175, a lock notch 176, a charger cam portion 177, a bias cam portion 178 and a pivot 179 in a downward order. The bias cam portion 178 includes two projections. When the teeth of the sprocket wheel 174 are not meshed with the perforations 27a, the bias cam portion 178 is pushed by the spring plate 165 to cause the cam member 172 to rotate in the driven direction. Thus, the sprocket wheel 174 rotates to come to a phase angle where a succeeding one of the perforations 27a is engageable therewith.

Teeth 166a are formed about the counter disk 166. The toothed shaft 175 becomes engaged with the teeth 166a and rotates the counter disk 166 upon feeding of the photo film. Upon operation for shutter charging, the lock notch 176 retains the retention lever 170 in the anti-winding position. A cam follower projection 171c projects from the shutter drive lever 171. When the cam member 172 is rotated, the charger cam portion 177 pushes the cam follower projection 171c to rotate the shutter drive lever 171 to the charged position.

The shutter drive lever 171 is constituted by a boss 171a, a knocker arm 171b, the cam follower projection 171c, a pin 171d, a metal segment 171e and a driven projection 171f. The boss 171a has a hole for insertion of the pivotal pin 163. The torsion coil spring 167 has one end fitted on the pin 171d, and biases the shutter drive lever 171 toward the released position in the counterclockwise direction.

Figure 39A:
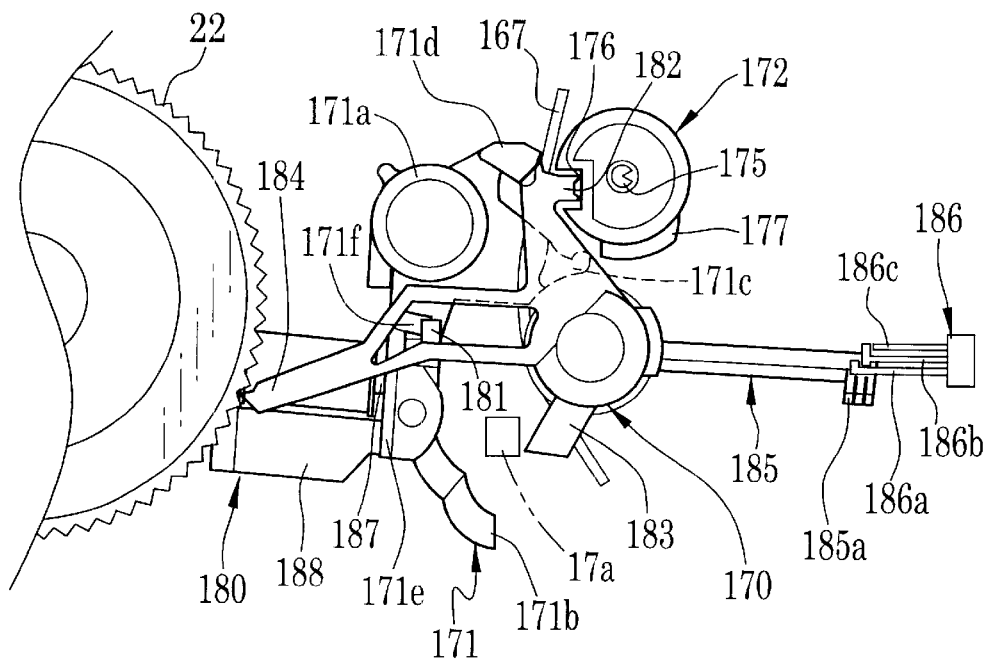
FIG. 39A is a top plan illustrating a charged state of the shutter device.
Figure 39B:
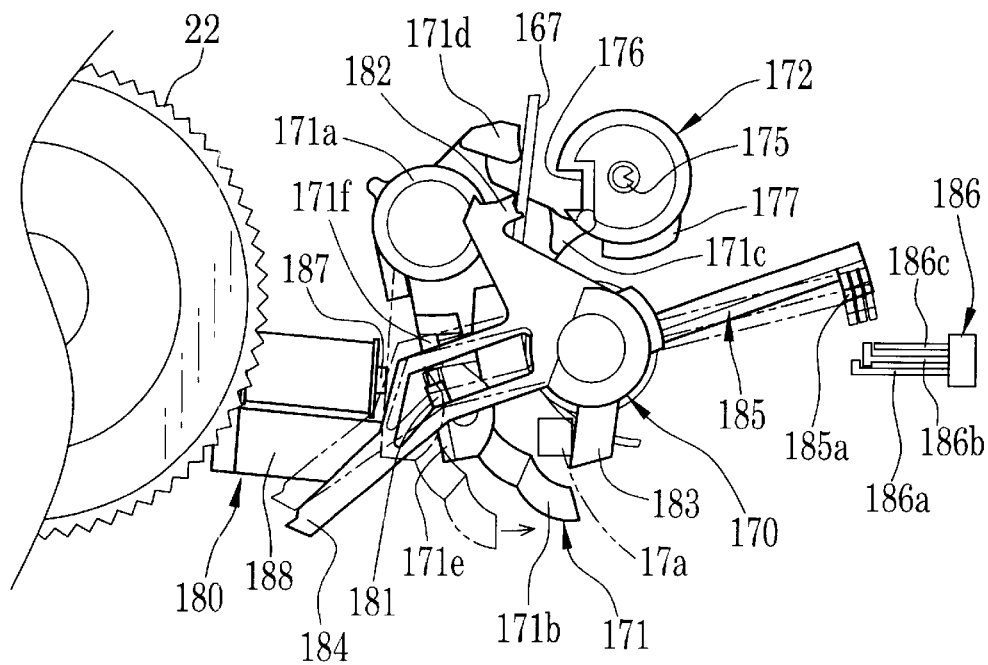
FIG. 39B is a top plan illustrating a released state of the shutter device.

An engaging projection 181 is formed with the retention lever 170, and engageable with the driven projection 171f. The retention lever 170 is biased by the torsion coil spring 167 in the clockwise direction. In FIG. 39A, the engaging projection 181 pushes the driven projection 171f toward the charged position while in the shutter charged state. The shutter drive lever 171 is kept by the retention lever 170 in the charged position.

The metal segment 171e is disposed between the knocker arm 171b and the boss 171a. A latch solenoid 180 is contacted by the metal segment 171e when the shutter drive lever 171 is in the charged position.

The latch solenoid 180 is constituted by an iron core 187, a coil (not shown) and a permanent magnet 188. The coil is wound about the iron core 187. The permanent magnet 188 magnetizes the iron core 187. While no current flows in the coil, the iron core 187 is magnetized by the permanent magnet 188, so that magnetic force occurs between the iron core 187 and the metal segment 171e. Thus, the shutter drive lever 171 in the charged position is retained on the latch solenoid 180.

Figure 40:
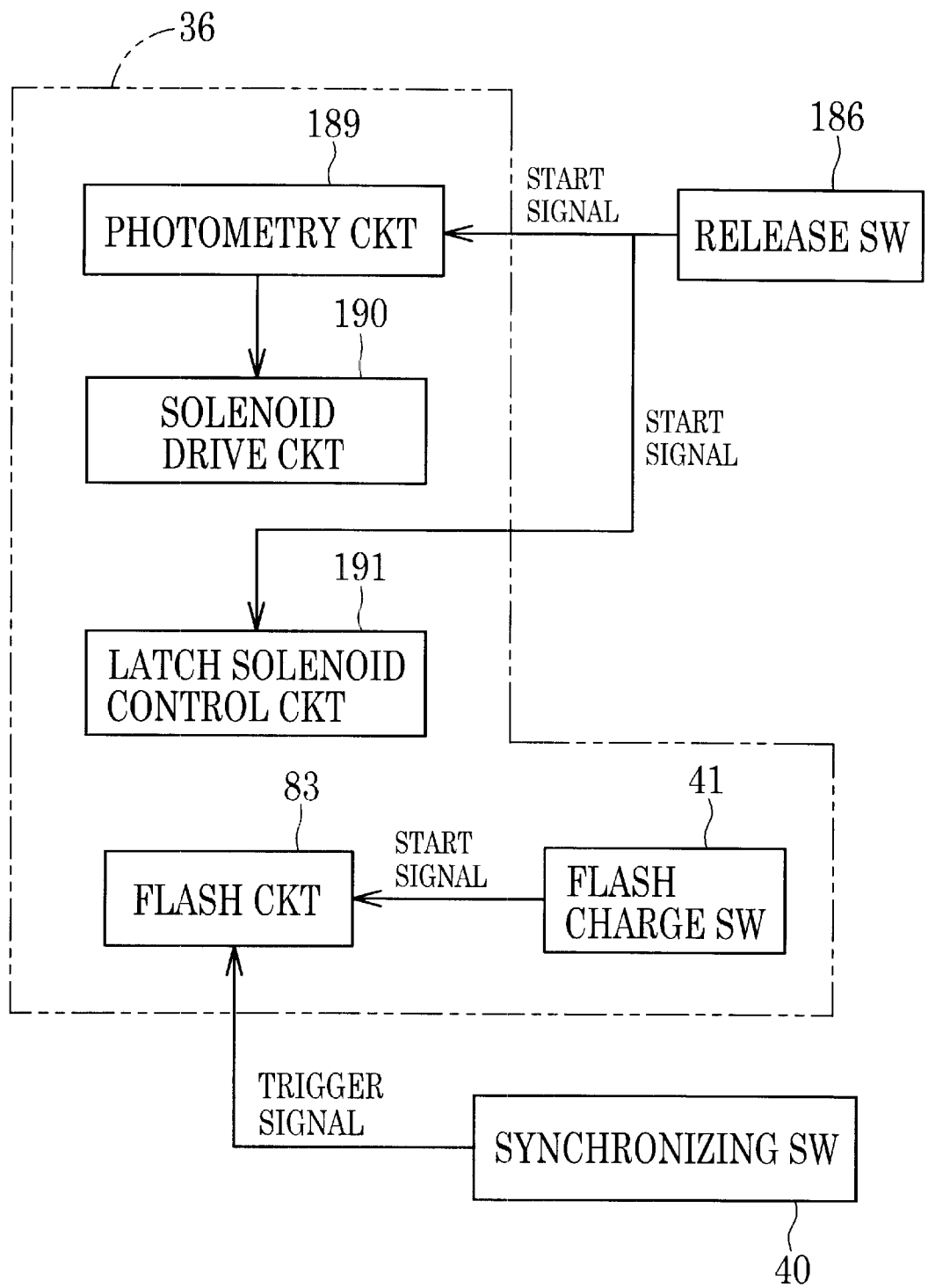
FIG. 40 is a block diagram illustrating circuits of the shutter device.

When a current is caused to flow in the coil in such a manner as to create a magnetic field reverse to that created at the iron core 187 by the permanent magnet 188, then the magnetic force of the iron core 187 is reduced. If the driven projection 171f is disengaged from the engaging projection 181 upon rotation of the retention lever 170 toward the released position, the reduction of the magnetic force of the iron core 187 allows the torsion coil spring 167 to rotate the shutter drive lever 171 toward the released position in the counterclockwise direction. Therefore, the knocker arm 171b knocks the shutter blade 151 to open and shut the shutter opening 150. In FIG. 40, a latch solenoid control circuit 191 is depicted, which causes powering to the latch solenoid 180 to start at a lapse of a predetermined time after depression of the shutter release button 17.

The retention lever 170 is constituted by the engaging projection 181, a lock claw 182, a driven projection 183, a blocking claw 184 and a switching arm 185. The lock claw 182 enters the lock notch 176 upon completing the shutter charging, and blocks rotation of the cam member 172. The blocking claw 184 comes in mesh with teeth about the winder wheel 22 upon the shutter charging, and blocks rotation of the winder wheel 22.

The driven projection 183 has an L shape, and receives a second end of the torsion coil spring 167. A transmission rod 17a pushes the driven projection 183 when the shutter release button 17 is depressed. The retention lever 170 makes a counterclockwise rotation toward the released position against the torsion coil spring 167. This rotation disengages the engaging projection 181 from the driven projection 171f and makes the shutter drive lever 171 ready for a releasing operation.

The blocking claw 184 is now retracted from the winder wheel 22 to enable the photo film to be wound or advanced. The retention lever 170 is biased by the torsion coil spring 167 toward the charged position. If a user's finger is moved away from the shutter release button 17, the retention lever 170 becomes ready to rotate toward the charged position in receiving the biasing force of the torsion coil spring 167. However, the shutter drive lever 171 rotates to the released position to enter the driven projection 171f into a rotational orbit of the engaging projection 181. Rotation of the retention lever 170 toward the charged position is restricted in the position indicated by the phantom lines of FIG. 39B. There occurs no locking of the winder wheel 22 after the shutter device is released.

A release/photometric switch 186 is disposed in a rotational orbit of the switching arm 185, which turns on or off when the retention lever 170 rotates from the charged position to the released position.

The release/photometric switch 186 is disposed at a portion for holding a viewfinder lens, and when turned on, causes photometry to start, and sends the latch solenoid control circuit 191 a signal informing that the shutter releasing operation has occurred. The release/photometric switch 186 includes first, second and third contact segments 186a, 186b and 186c. A metal brush 185a is secured to an end of the switching arm 185, and contacts the contact segments 186a–186c when passed under the release/photometric switch 186 for connection of the contact segments 186a–186c with one another.

The metal brush 185a contacts the contact segments 186a–186c when the retention lever 170 rotates to the released position and also when the retention lever 170 rotates toward the charged position in the shutter charging. The release/photometric switch 186 is constructed to be turned on only when the second contact segment 186b is connected with the third contact segment 186c after connection of the first contact segment 186a with the second contact segment 186b. If the second contact segment 186b is connected with the third contact segment 186c earlier than connection of the first contact segment 186a with the second contact segment 186b, then the release/photometric switch 186 is kept turned off.

This being so, the release/photometric switch 186 is not turned on when the retention lever 170 rotates to the charged position, but turned on when the retention lever 170 rotates to the released position. When the switching arm 185 is moved past the release/photometric switch 186, the release/photometric switch 186 is turned off.

In FIG. 40, the printed circuit board 36 includes the flash circuit 83, a photometric circuit 189 or photometric drive circuit, a solenoid drive circuit 190 and the latch solenoid control circuit 191. Any of those elements are supplied with power by the dry battery 38 in FIG. 2. The photometric circuit 189 measures the object brightness. When the release/photometric switch 186 is turned on, the photometric circuit 189 starts photometry, and sends a brightness signal to the solenoid drive circuit 190. The solenoid drive circuit 190 discerns one of bright and dark scenes according to the brightness signal from the photometric circuit 189. If the object brightness is equal to or lower than a reference brightness or stated brightness, then the plate shifting solenoid 154 is driven to shift the stop changeover plate 152 to the retracted position.

Time during which the plate shifting solenoid 154 is energized is predetermined according to opening/shutting of the shutter blade 151 for completion of an exposure. After the lapse of the time, the energization to the plate shifting solenoid 154 is discontinued. The torsion coil spring 167 returns the stop changeover plate 152 to the initial position.

When the latch solenoid control circuit 191 receives a signal upon turning on of the release/photometric switch 186, the latch solenoid control circuit 191 effects a delay operation by time required for changing over the aperture stop, and thereafter causes a current to flow to a coil in the latch solenoid 180 instantaneously for a time of approximately 50 msec. Thus, force of retention of the latch solenoid 180 is reduced. The shutter drive lever 171 is released from being retained. Note that the time of the delay is predetermined suitably.

Figure 41:
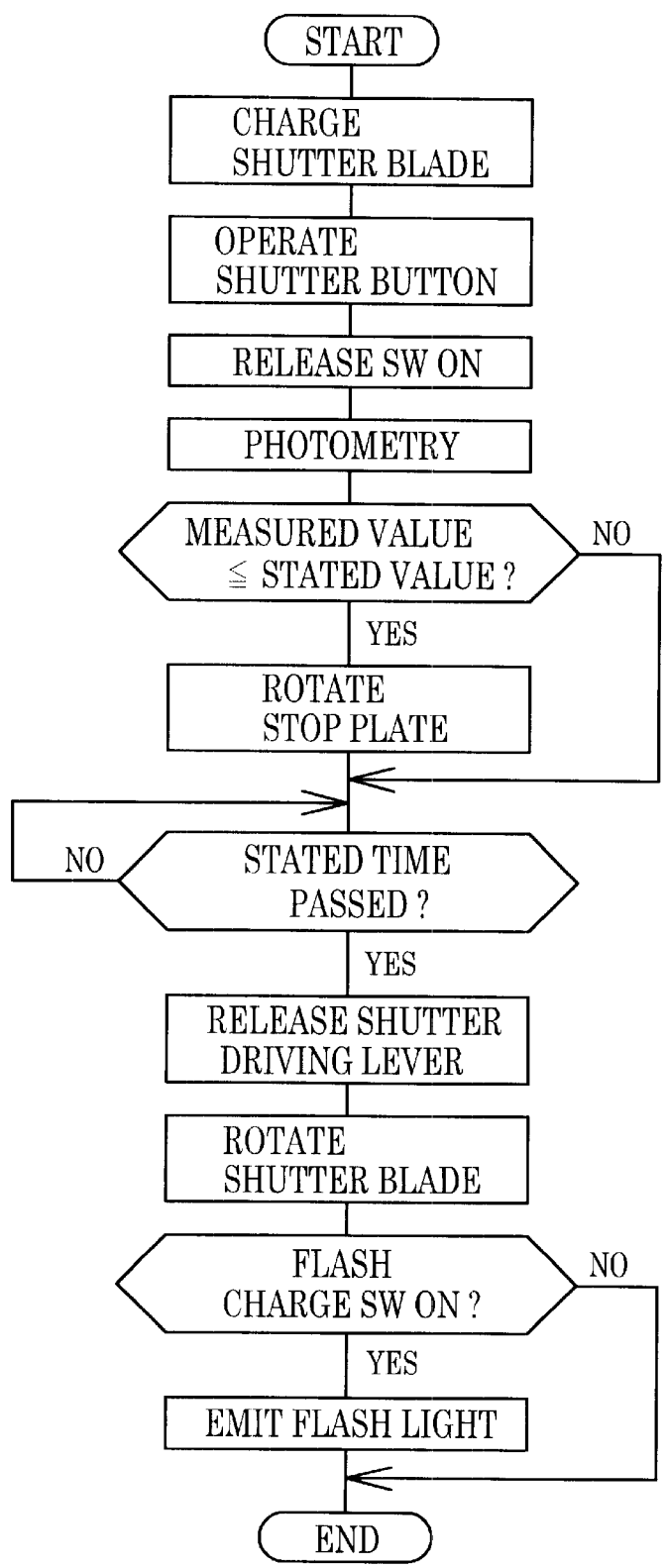
FIG. 41 is a flow chart illustrating an operation of the shutter device of FIG. 37.

The operation of the embodiment of FIGS. 37–40 is now described with reference to FIG. 41. The flash button 15 is turned on by a user if desired. The winder wheel 22 is rotated. The photo film 27 is wound, and at the same time the shutter device is charged or cocked. Movement of the photo film 27 rotates the sprocket wheel 174 and the cam member 172.

When the cam member 172 rotates, the charger cam portion 177 pushes the cam follower projection 171c. The shutter drive lever 171 rotates toward the charged position against the torsion coil spring 167. The metal segment 171e is moved close to the iron core 187. The shutter drive lever 171 is attracted by the latch solenoid 180 and retained in the charged position. Upon the start of rotating the shutter drive lever 171, the driven projection 171f comes out of a rotational orbit of the engaging projection 181. The retention lever 170 is rotated toward the charged position by the bias of the torsion coil spring 167.

When the cam member 172 further rotates, the lock claw 182 enters the lock notch 176 to block rotation of the cam member 172. Also, the blocking claw 184 comes in mesh with the winder wheel 22 to block rotation of the winder wheel 22. The photo film 27 is stopped from being wound.

While the retention lever 170 rotates toward the charged position, the metal brush 185a moves under the release/photometric switch 186 to contact the contact segments 186a–186c. At first, the second contact segment 186b is connected with the third contact segment 186c. Then the first contact segment 186a is connected with the second contact segment 186b. Consequently, the release/photometric switch 186 remains turned off.

After a framing operation for a photographic object, the shutter release button 17 is depressed. The retention lever 170 rotates, so the switching arm 185 turns on the release/photometric switch 186. When the switching arm 185 passes the release/photometric switch 186, the release/photometric switch 186 is turned off.

When the release/photometric switch 186 is turned on, a start signal is sent to the photometric circuit 189 to start photometry. If the object brightness is equal to or lower than the reference brightness, the plate shifting solenoid 154 is supplied with power to shift the stop changeover plate 152 to the retracted position. If the object brightness is higher than the reference brightness, the plate shifting solenoid 154 does not operate. The stop changeover plate 152 is kept in the insertion position.

As the release/photometric switch 186 is turned off immediately, the photometric circuit 189 does not continue operation. Once the plate shifting solenoid 154 is energized, there is no further energization. It is possible to determine the time of operating the photometric circuit 189 and the number of times of energizing the plate shifting solenoid 154 in a manner irrespective of time during which the user depresses the shutter release button 17. Thus, wasteful use of the dry battery 38 can be prevented. There is no need of keeping the shutter release button 17 depressed halfway for the purpose of photometry. The aperture stop can be adjusted by a simple operation.

When the release/photometric switch 186 is turned on, a signal is sent to the latch solenoid control circuit 191. Upon a lapse of a predetermined time after receipt of the signal, the latch solenoid control circuit 191 energizes the latch solenoid 180 instantaneously. This releases the shutter drive lever 171 from being retained, and causes knocking of the shutter blade 151 to take an exposure.

The time of energizing the latch solenoid 180 is predetermined short. Thus, wasteful use of the dry battery 38 can be reduced. Also, the start of operating the latch solenoid 180 is delayed by the time required for operation of changing over the aperture stop. There occurs no setting of the stop changeover plate 152 into the light path while the shutter is opened/shut. An exposure can be taken appropriately without failure.

Also, photometry is effected shortly before opening/shutting of the shutter. It is possible to discern existence or lack of the changeover of the aperture stop with reference to the reference brightness very near to the brightness at the same time as an exposure. Thus, the aperture stop can be adjusted exactly.

In the present embodiment, the release/photometric switch 186 is constituted by three metal segments. Alternatively, the release/photometric switch 186 may be constituted by two segments in a manner of the sync switch 40 connected with the flash device. One of the two segments may be knocked by the switching arm 185 and turned on at the time of the releasing operation. In the above embodiment, the switching arm 185 is formed with the retention lever 170. Alternatively, the switching arm 185 may be separate from the retention lever 170.

The structure of the present invention is incorporated in the lens-fitted photo film unit according to any of the embodiments, but may be used in a compact camera simply constructed for photography.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An exposure control device for a camera, including a shutter drive member for moving from a charged position to a released position upon depression of a shutter release button in a condition biased by a spring, and for knocking a shutter blade in movement to open/shut a photographic light path, said exposure control device comprising:

a photometric circuit for measuring object brightness;

a stop changeover mechanism for changing over an aperture stop according to a signal from said photometric circuit;

a photometric switch, turned on after depression of said shutter release button, for rendering active said photometric circuit; and a delay structure for delaying a knocking operation of said shutter drive member to said shutter blade until completion of a change of said aperture stop with said stop changeover mechanism after turning on said photometric switch, the delay structure being constructed so as to start operating in cooperation with operation of the shutter button.

2. An exposure control device as defined in claim 1, wherein said delay structure includes:

a delay lever, released from retention upon depression of said shutter release button, for rotating in retaining said shutter drive member in said charged position, and for releasing said shutter drive member from retention upon rotation to a predetermined position to allow said shutter drive member to move to said released position;

a governor mechanism for adjusting a rotational speed of said delay lever, to block rotation of said delay lever to said predetermined position until completion of a change of said aperture stop with said stop changeover mechanism after turning on said photometric switch.

3. An exposure control device as defined in claim 2, wherein said governor mechanism includes:

an escapement wheel for being meshed with a gear provided in said delay lever, there being a switching portion, formed with said escapement wheel, for turning on said photometric switch;

an anchor, engaged with said escapement wheel, for adjusting a rotational speed of said escapement wheel.

4. An exposure control device as defined in claim 3, wherein said stop changeover mechanism includes a stop changeover plate having at least first and second openings of which a selected one is set in said photographic light path, said first opening has a size larger than said second opening.

5. An exposure control device as defined in claim 4, wherein if said object brightness is equal to or higher than reference brightness, said photometric circuit outputs a driving signal;

said stop changeover mechanism further includes a changeover plate shifter, actuated according to said driving signal, for shifting said stop changeover plate to set said second opening in said photographic light path instead of said first opening.

6. An exposure control device as defined in claim 5, wherein said stop changeover plate is swingable about an axis.

7. An exposure control device as defined in claim 3, wherein said delay lever rotates to said predetermined position 10–60 msec after turning on said photometric switch.

8. An exposure control device as defined in claim 1, wherein said shutter drive member starts operation to knock said shutter blade upon a reach to a shutter driving position;

said photometric switch is turned on upon a reach of said shutter drive member to a photometric position disposed short of said shutter driving position;

said delay structure includes a governor mechanism for adjusting a moving speed of said shutter drive member in a section from said photometric position to said shutter driving position, and for causing said shutter drive member to reach said shutter driving position after completion of a change of said stop changeover mechanism.

9. An exposure control device as defined in claim 1, wherein said shutter drive member starts operation to knock said shutter blade upon a reach to a shutter driving position;

said photometric switch is turned on upon a reach of said shutter drive member to a photometric position disposed short of said shutter driving position;

said delay structure includes a retention lever for retaining said shutter drive member in said photometric position, and for releasing said shutter drive member from retention upon completion of a change of said stop changeover mechanism.

10. An exposure control device as defined in claim 1, wherein said delay structure includes:
   a stop lever movable between an engaged position and a disengaged position, said stop lever, when in said engaged position, retaining said shutter drive member in said charged position, and when in said disengaged position, allowing said shutter drive member to move to said released position;
   an enabling lever, driven upon depression of said shutter release button, for turning on said photometric switch, then for moving said stop lever toward said disengaged position, and for moving said stop lever to said disengaged position after completion of a change of said stop changeover mechanism.

11. An exposure control device as defined in claim 1, wherein said delay structure includes:
   an electromagnetic retainer for retaining said shutter drive member in said charged position until completion of a change of said stop changeover mechanism after depression of said shutter release button;
   a control circuit for controlling said electromagnetic retainer, for causing a delay by time required for said change of said stop changeover mechanism upon turning on of said photometric switch, and for decreasing force of retention of said electromagnetic retainer to release said shutter drive member from retention and to allow movement from said charged position to said released position.

12. An exposure control device for a camera, including a shutter drive member, started to move upon depression of a shutter release button, for opening/shutting a shutter blade upon a reach to a shutter driving position, said exposure control device comprising:
   a photometric circuit for measuring object brightness;
   a stop changeover mechanism for changing over an aperture stop according to a photometric signal from said photometric circuit;
   a photometric switch, turned on upon a reach of said shutter drive member to a photometric position disposed short of said shutter driving position, for powering said photometric circuit; and
   a governor mechanism for adjusting a moving speed of said shutter drive member in a section from said photometric position to said shutter driving position, and for causing said shutter drive member to reach said shutter driving position after completion of a change of said aperture stop.

13. An exposure control device as defined in claim 12, wherein said governor mechanism includes an escapement wheel for being meshed with a gear provided in said shutter drive member, and an anchor, engaged with said escapement wheel, for adjusting a rotational speed of said escapement wheel.

14. An exposure control device as defined in claim 13, further comprising an electronic flash device having a main capacitor, said main capacitor being inhibited from being charged when said photometric switch is turned on.

15. An exposure control device for a camera, including a shutter drive member, started to move upon depression of a shutter release button, for opening/shutting a shutter blade upon a reach to a shutter driving position, said exposure control device comprising:
   a photometric circuit for measuring object brightness;
   a stop changeover mechanism for changing over an aperture stop according to a signal from said photometric circuit;
   a photometric switch, turned on upon a reach of said shutter drive member to a photometric position disposed short of said shutter driving position, for powering said photometric circuit; and
   a retention lever for retaining said shutter drive member in said photometric position, and for releasing said shutter drive member from retention upon completion of a change of said aperture stop.

16. An exposure control device as defined in claim 15, wherein if said object brightness is equal to or higher than reference brightness, said photometric circuit outputs a driving signal;
   said stop changeover mechanism includes a stop changeover plate having a small-diameter opening and a large-diameter opening, and a changeover plate shifter, actuated according to said driving signal, for shifting said stop changeover plate from an intermediate position to one of first and second positions, said stop changeover plate, when in said intermediate position, is away from said photographic light path, and when in said first position, sets said small-diameter opening in said photographic light path, and when in said second position, sets said large-diameter opening in said photographic light path;
   said retention lever, when said stop changeover plate is in said intermediate position, is retained in a retained position for blocking movement of said shutter drive member, and when said stop changeover plate is shifted to a position where said small-diameter opening or said large-diameter opening is set in said photographic light path, is moved to a disengaging position for allowing movement of said shutter drive member.

17. An exposure control device as defined in claim 16, further comprising an electronic flash device having a main capacitor, said main capacitor being inhibited from being charged when said photometric switch is turned on.

18. An exposure control device for a camera, including a shutter release button for starting taking an exposure and an openable shutter blade, said exposure control device comprising:
   a shutter drive member for being moved forwards upon depression of said shutter release button, and for being moved backwards by a spring;
   a transmission member movable forwards and backwards upon movement of said shutter drive member, for moving forwards without knocking said shutter blade, and for moving backwards to knock said shutter blade;
   a photometric switch turned on upon movement of said shutter drive member;
   a photometric circuit for starting measuring object brightness upon turning on of said photometric switch; and
   a stop changeover mechanism for changing over an aperture stop according to a photometric signal from said photometric circuit before said transmission member starts knocking said shutter blade.

19. An exposure control device as defined in claim 18, further comprising a torsion coil spring connected between said shutter drive member and said transmission member, charged by rotation of said shutter drive member, for biasing and moving said transmission member.

20. An exposure control device for a camera, including a shutter drive member for moving from a charged position to a released position upon depression of a shutter release button, and for knocking and opening/shutting a shutter blade in movement, said exposure control device comprising:

a photometric circuit for measuring object brightness;

a stop changeover mechanism for changing over an aperture stop according to a photometric signal from said photometric circuit;

a photometric switch for powering said photometric circuit;

a stop lever movable between an engaged position and a disengaged position, said stop lever, when in said engaged position, retaining said shutter drive member in said charged position, and when in said disengaged position, allowing said shutter drive member to move to said released position; and an enabling lever, started to move from a retained position upon depression of said shutter release button, for turning on said photometric switch, then for moving said stop lever toward said disengaged position, and for moving said stop lever to said disengaged position after completion of a change of said aperture stop.

21. An exposure control device as defined in claim 20, further comprising a retention lever for retaining said enabling lever in said retained position, said retention lever being rotated upon depression of said shutter release button to release said enabling lever from retention.

22. An exposure control device as defined in claim 21, wherein said enabling lever moves to said retained position in one-frame advance of said photo film, and said shutter drive member moves to said charged position upon movement of said enabling lever.

23. An exposure control device as defined in claim 22, wherein said enabling lever is rotatable about an axis about which said shutter drive member is rotatable.

24. An exposure control device for a camera, including a shutter drive member for moving from a charged position to a released position upon depression of a shutter release button, and for knocking and opening/shutting a shutter blade in movement, said exposure control device comprising:

a stop changeover plate being movable and having a small-diameter opening and a large-diameter opening;

a photometric circuit for measuring object brightness;

a changeover plate shifter for shifting said stop changeover plate according to a signal from said photometric circuit;

a photometric switch for powering said photometric circuit upon depression of said shutter release button;

an electromagnetic retainer for retaining said shutter drive member in said charged position until completion of a change of said aperture stop after depression of said shutter release button; and a control circuit for controlling said electromagnetic retainer, for causing a delay by time required for said change of said aperture stop upon turning on of said photometric switch, and for decreasing force of retention of said electromagnetic retainer to release said shutter drive member from retention and to allow movement from said charged position to said released position.

25. An exposure control device as defined in claim 24, wherein said electromagnetic retainer includes a latch solenoid having a core, a permanent magnet and a coil, said permanent magnet magnetizes said core to generate said force of retention, and said coil is wound about said core and powered to decrease said force of retention.

26. An exposure control device as defined in claim 25, further comprising a retention member for retaining photo film by moving to said charged position upon one-frame advance of said photo film, and for releasing said photo film from retention by moving to said released position upon depression of said shutter release button;

said photometric switch being disposed in an orbit where said retention member is movable, said retention member turning on said photometric switch to start photometry in movement from said charged position to said released position, and immediately turning off said photometric switch to stop photometry.

27. An exposure control device as defined in claim 26, wherein said changeover plate shifter comprises a coil and a movable core;

said coil is powered to draw back said movable core axially, and discontinues being powered to allow said movable core to protrude axially with a spring;

while powering to said coil is discontinued, said stop changeover plate is set in a position to set said small-diameter opening in a photographic light path by said spring, and while said coil is powered, said stop changeover plate is set in a position to set said large-diameter opening in said photographic light path by movement of said core instead of said small-diameter opening.

28. An exposure control device for a camera, including a shutter drive member for moving from a charged position to a released position upon depression of a shutter release button in a condition biased by a spring, and for knocking a shutter blade in movement to open/shut a photographic light path, said exposure control device comprising:

a photometric circuit for measuring object brightness;

a stop changeover mechanism for changing over an aperture stop according to a signal from said photometric circuit;

a photometric switch, turned on after depression of said shutter release button, for rendering active said photometric circuit; and a means for delaying a knocking operation of said shutter drive member to said shutter blade until completion of a change of said aperture stop with said stop changeover mechanism after turning on said photometric switch.

29. An exposure control device for a camera, including a shutter drive member, started to move upon depression of a shutter release button, for opening/shutting a shutter blade upon a reach to a shutter driving position, said exposure control device comprising:

a photometric circuit for measuring object brightness;

a stop changeover mechanism for changing over an aperture stop according to a signal from said photometric circuit;

a photometric switch, turned on upon a reach of said shutter drive member to a photometric position disposed short of said shutter driving position, for powering said photometric circuit; and a means for retaining said shutter drive member in said photometric position, and for releasing said shutter drive member from retention upon completion of a change of said aperture stop.

* * * * *